United States Patent [19]

Nishibe et al.

[11] Patent Number: 5,062,062

[45] Date of Patent: Oct. 29, 1991

[54] TORQUE DETECTING APPARATUS

[75] Inventors: Yuji Nishibe, Gifu; Yutaka Nonomura, Aichi; Masaaki Abe, Aichi; Masaharu Takeuchi, Aichi; Kouji Tsukada, Aichi, all of Japan

[73] Assignee: Kabushiki Kaisha Toyota Chuo Kenkyusho, Aichi, Japan

[21] Appl. No.: 460,235

[22] Filed: Dec. 29, 1989

[30] Foreign Application Priority Data

Dec. 30, 1988 [JP] Japan .......................... 63-170567[U]
Dec. 30, 1988 [JP] Japan .............................. 63-335376
Dec. 30, 1988 [JP] Japan .............................. 63-335377

[51] Int. Cl.⁵ .............................................. G01B 7/24
[52] U.S. Cl. .................................. 364/559; 364/508; 364/571.01
[58] Field of Search .............. 364/556, 571.01, 571.02, 364/571.03, 571.04, 571.05, 571.06, 571.07, 506, 508, 550, 565, 557, 182; 73/862.36, 862.35, DIG. 2, 1 R, 1 B, 1 C; 324/209, 207.11, 207.12; 33/1 PT; 318/592

[56] References Cited

U.S. PATENT DOCUMENTS

| | | | |
|---|---|---|---|
| 4,669,052 | 5/1987 | Bianco | 364/556 |
| 4,697,459 | 10/1987 | Nonomura et al. | 73/862.36 |
| 4,716,773 | 1/1988 | Nonomura et al. | 73/862.36 |
| 4,750,371 | 6/1988 | Kobayashi et al. | 73/862.36 |
| 4,803,885 | 2/1989 | Nonomura et al. | 73/862.36 |
| 4,811,609 | 3/1989 | Nishibe et al. | 73/862.36 |
| 4,881,415 | 11/1989 | Hergeth | 364/571.04 |
| 4,920,809 | 5/1990 | Yoshimura et al. | 73/862.36 |
| 4,939,937 | 7/1990 | Klauber et al. | 73/862.36 |
| 4,972,354 | 11/1990 | Hauck et al. | 364/559 |

Primary Examiner—Parshotam S. Lall
Assistant Examiner—Michael Zanelli
Attorney, Agent, or Firm—Oblon, Spivak, McClelland, Maier & Neustadt

[57] ABSTRACT

A physical quantity detecting apparatus for detecting a physical quantity of an object of measurement. The position of movement of an object of measurement is divided into a given number of segments in advance. The output of a physical quantity sensor for detecting a physical quantity of the object of measurement is calculated on the basis of a correction operation expression which has an independent coefficient group for each segment so as to correct the offset component and the sensitivity. Thus, a physical quantity such as a transmitted torque is detected with high accuracy at real time without being influenced by the fluctuations of the offset output and the sensitivity depending on the position of rotation. The correction operation may also be performed using the temperature dependence function of the offset signal and the temperature dependence function of the sensitivity, thereby enabling the accurate measurement of the physical quantity without the influence of the temperature change.

20 Claims, 35 Drawing Sheets

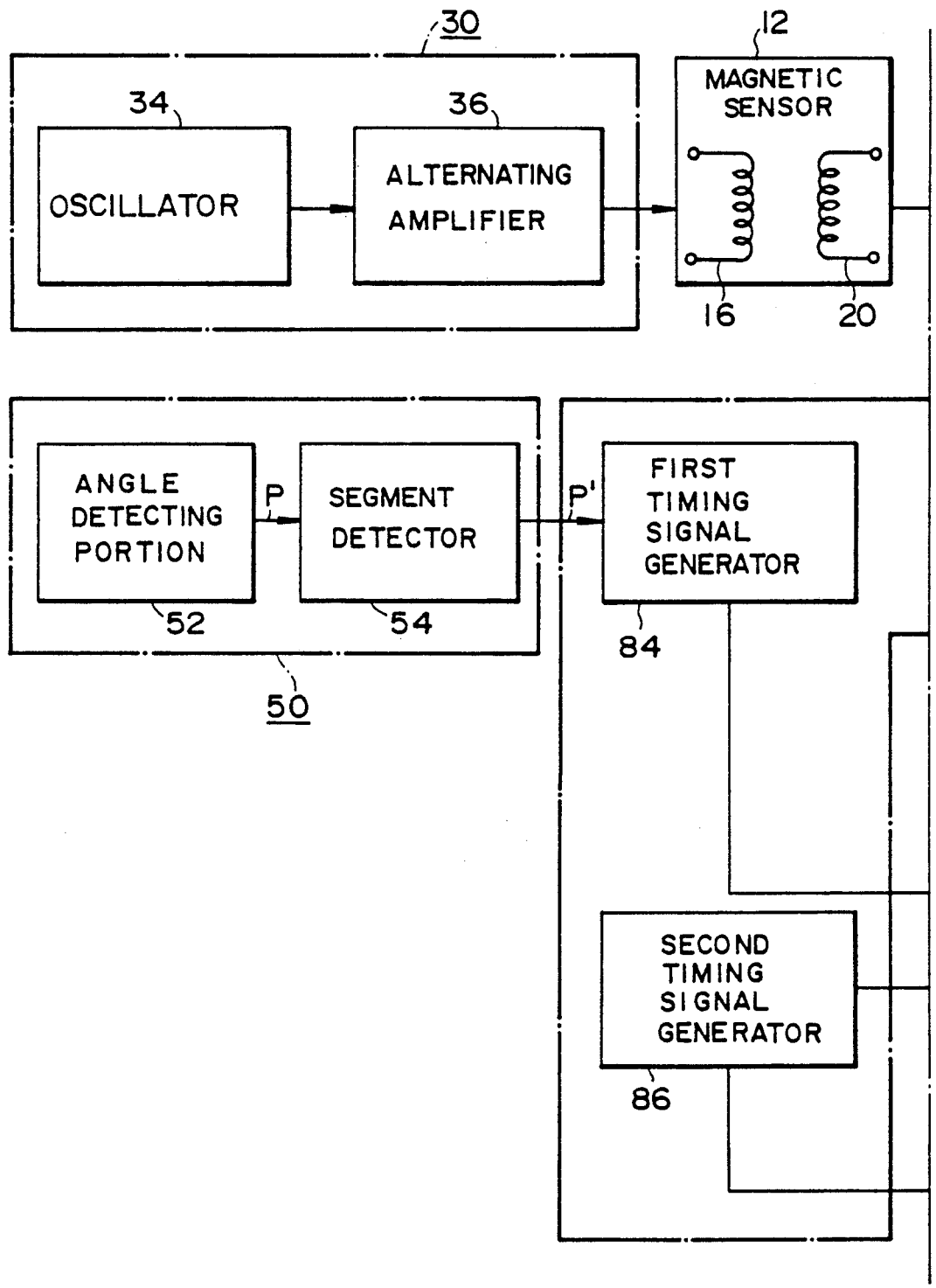

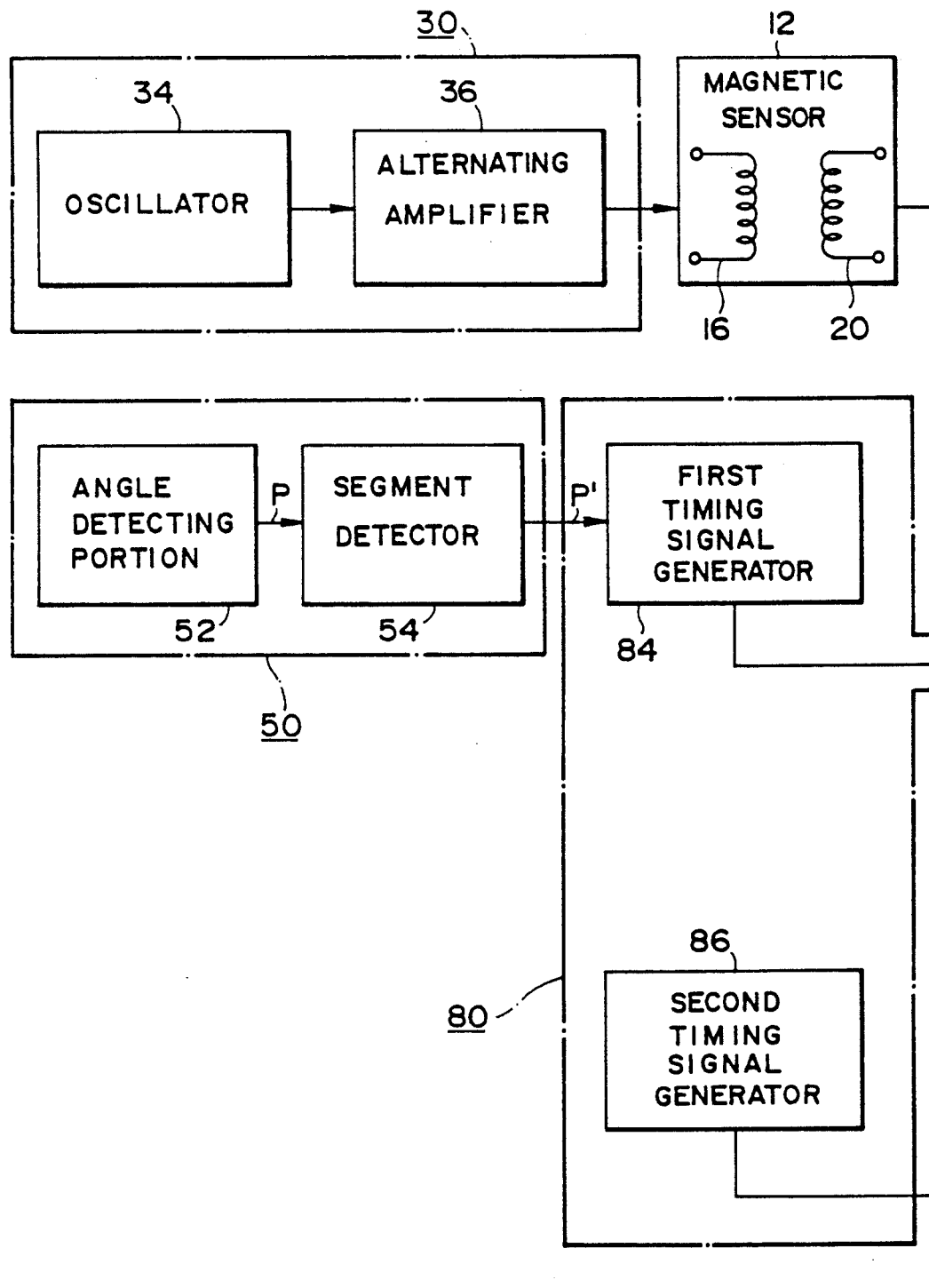

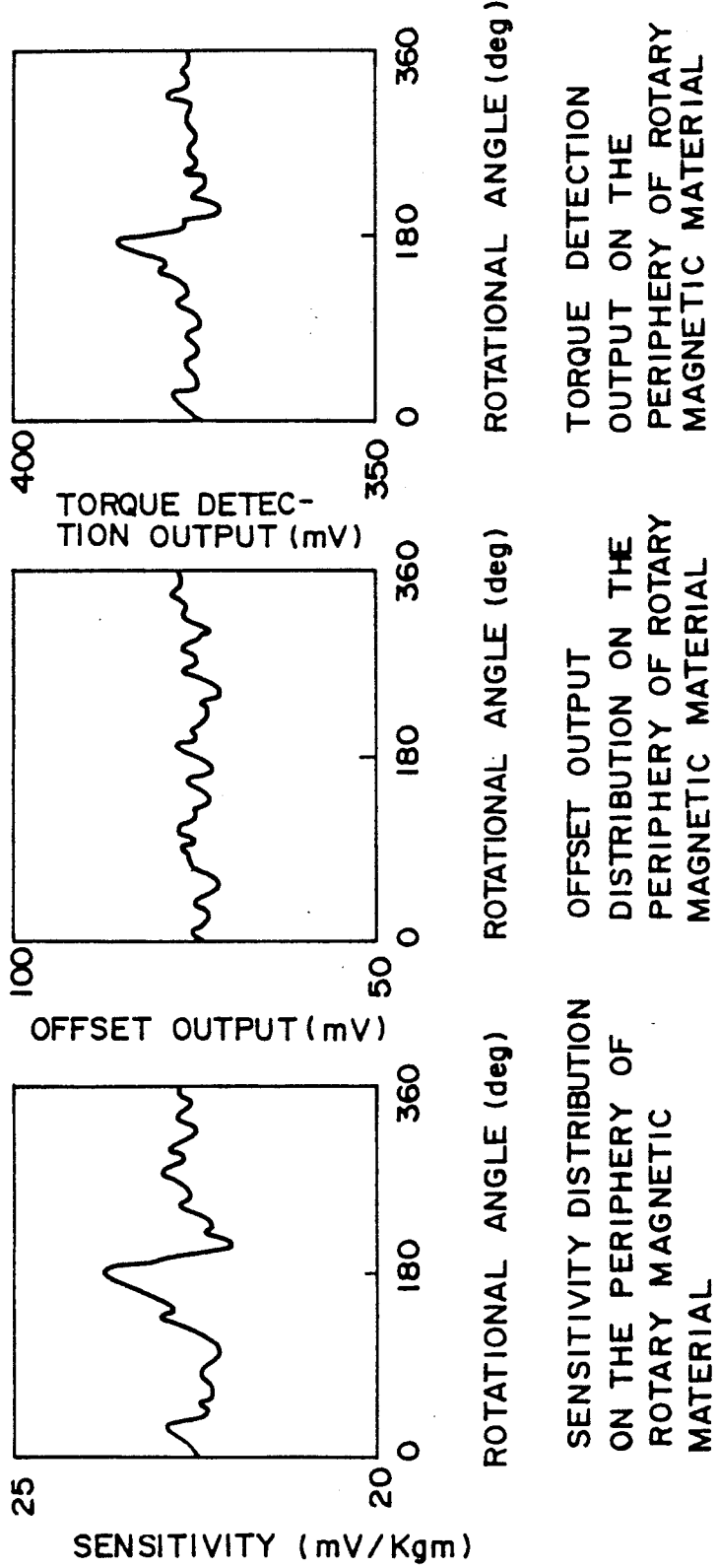

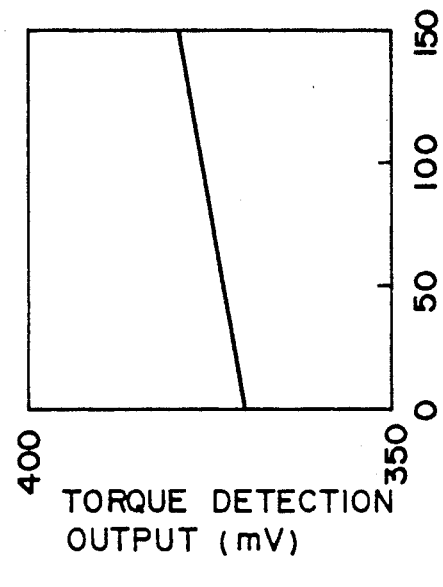
FIG.16 TEMPERATURE DEPENDENCE OF TORQUE DETECTION OUTPUT
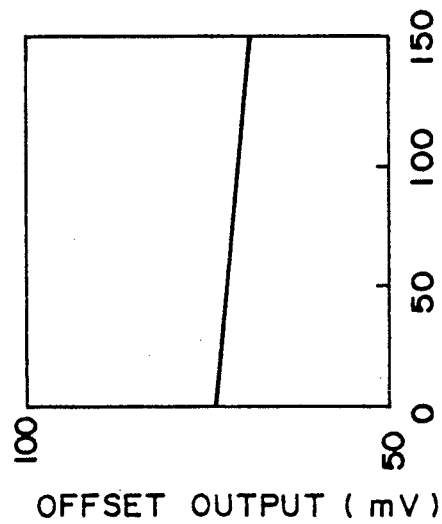
FIG.15 TEMPERATURE DEPENDENCE OF OFFSET OUTPUT
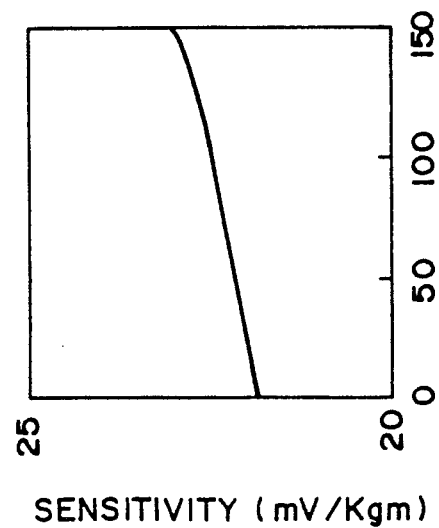
FIG.14 TEMPERATURE DEPENDENCE OF SENSITIVITY

TORQUE DETECTION ANGLE AFTER CORRECTION OPERATION OF LOCATION OF MEASUREMENT

TORQUE DETECTION ANGLE AFTER CORRECTION OPERATION OF TORQUE DETECTION OUTPUT

PHASE FREQUENCY CHARACTERISTIC
($\Delta t$ : SAMPLING RATE)

AMPLITUDE FREQUENCY CHARACTERISTIC

FIG. 21

| FIG. 21A |
|---|
| FIG. 21B |

FIG. 21A

```
┌─────────────────────────────────────────┐
│ SENSOR DETECTION SIGNAL S, TEMPERATURE  │
│ SIGNAL T, ROTATIONAL ANGLE SIGNAL θ     │──S1
│ ARE FETCHED                             │
└─────────────────────────────────────────┘
                    │
                    ▼
┌─────────────────────────────────────────┐
│ LOCATION OF MEASUREMENT IS OBTAINED     │──S2
│ FROM ROTATIONAL ANGLE SIGNAL θ          │
└─────────────────────────────────────────┘
                    │
                    ▼
┌─────────────────────────────────────────┐
│ CORRECTION COEFFICIENTS A, B            │
│ CORRESPONDING TO THE LOCATION OF        │──S3
│ MEASUREMENT ARE OBTAINED FROM CORRECTION│
│ COEFFICIENT TABLE STORED IN ROM         │
└─────────────────────────────────────────┘
                    │
                    ▼
┌─────────────────────────────────────────┐
│ SENSOR DETECTION SIGNAL IS MULTIPLIED   │──S4
│ BY CORRECTION COEFFICIENT B             │
└─────────────────────────────────────────┘
                    │
                    ▼
┌─────────────────────────────────────────┐
│ RESULT IS STORED IN RAM                 │──S5
│ (REFERRED TO AS "S·B")                  │
└─────────────────────────────────────────┘
                    │
```

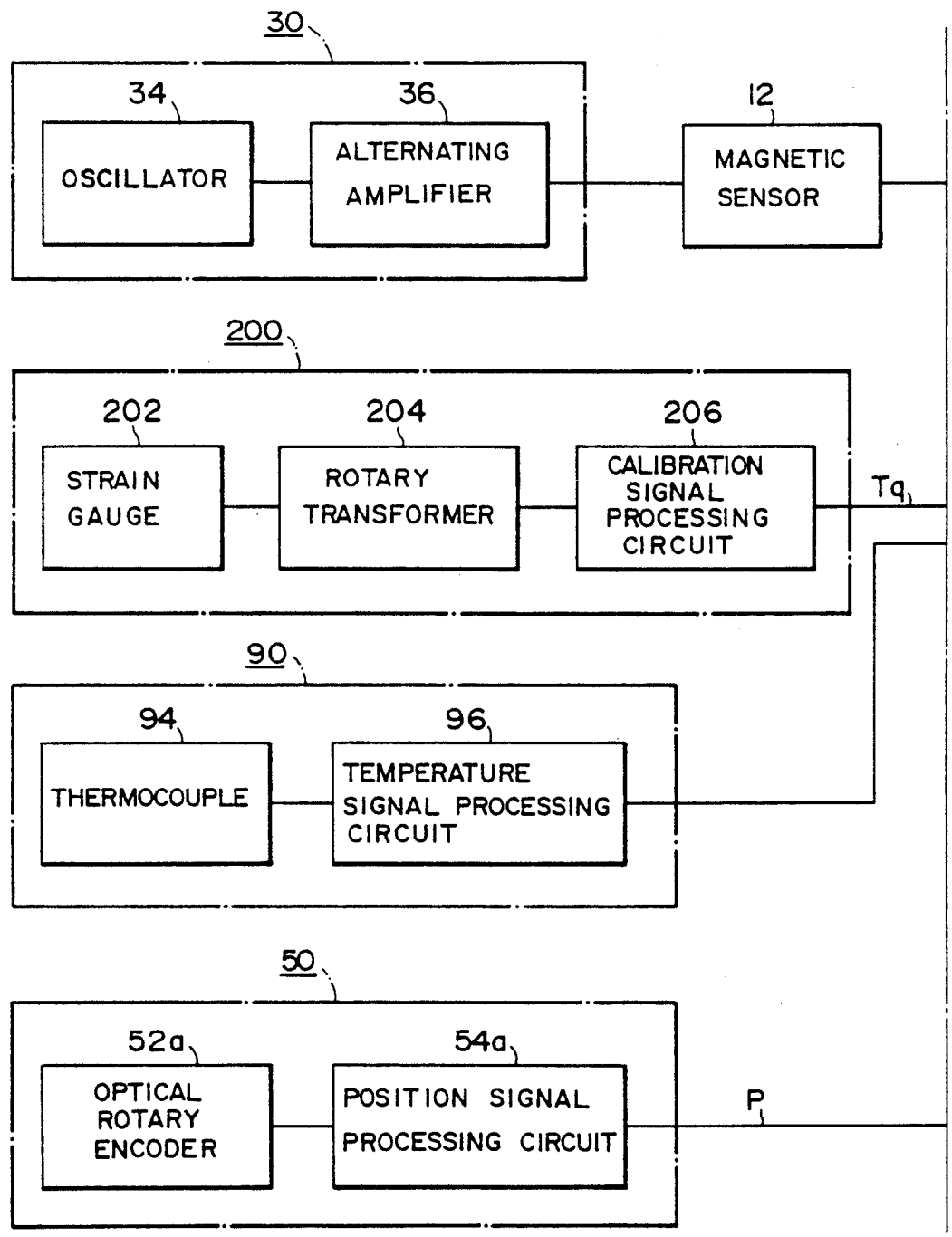

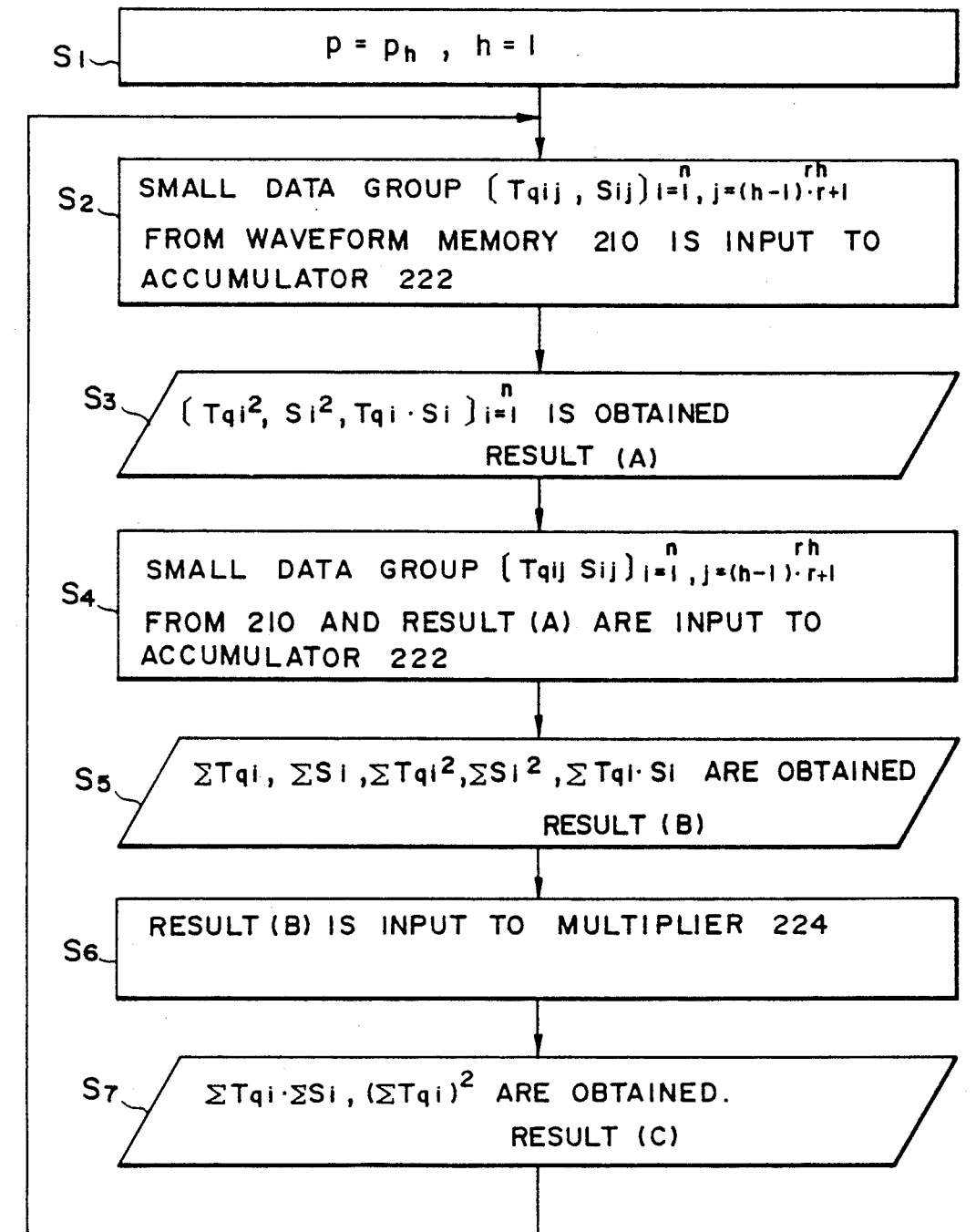

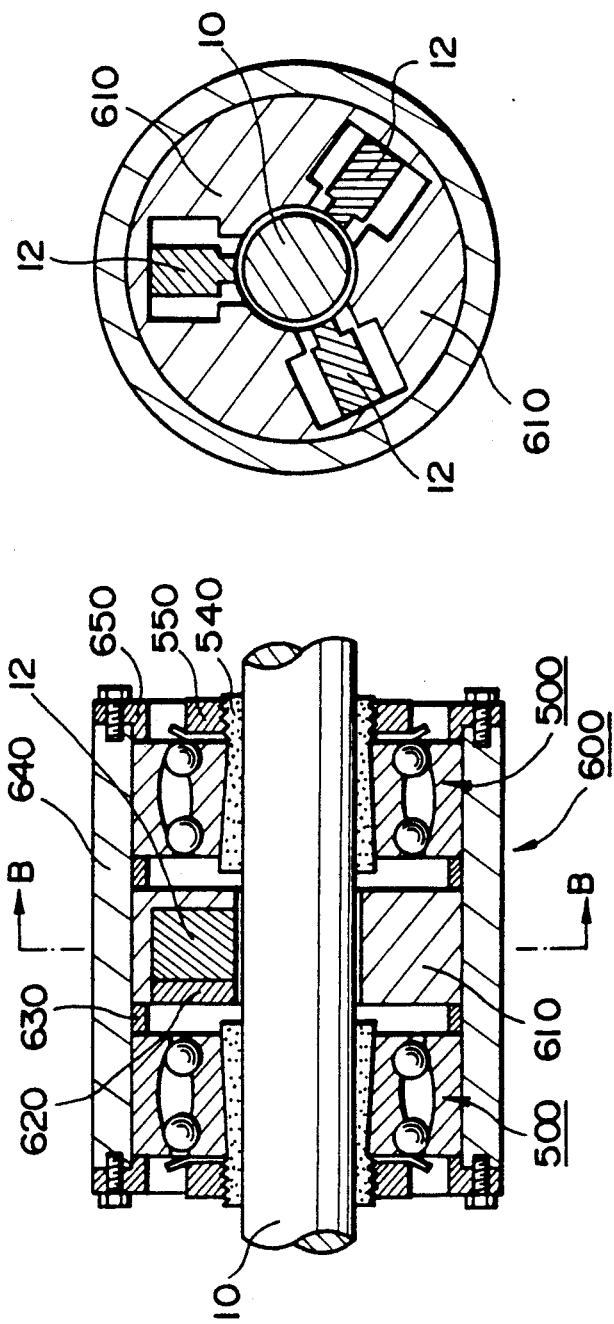

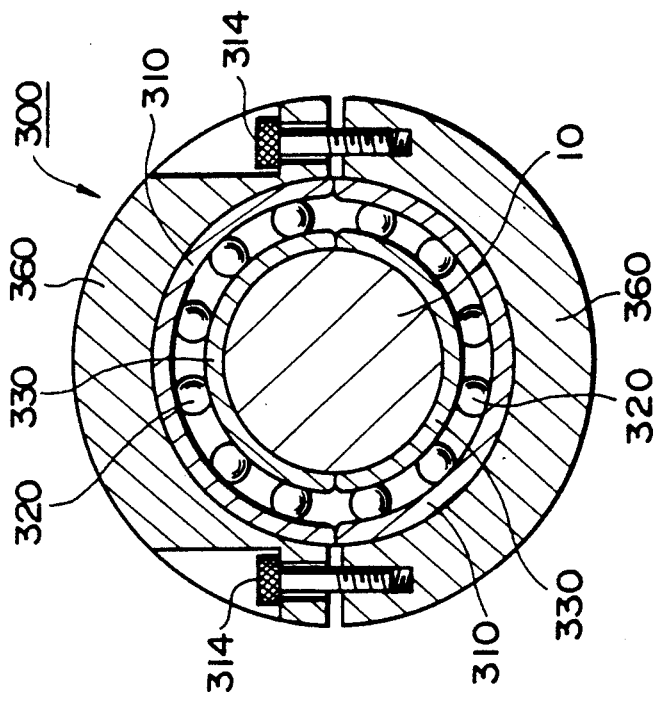

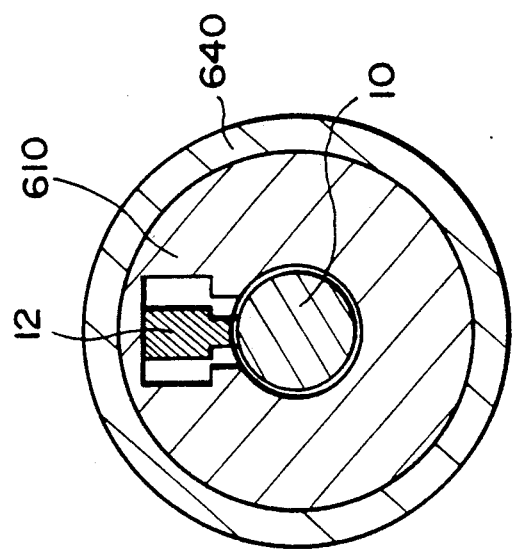
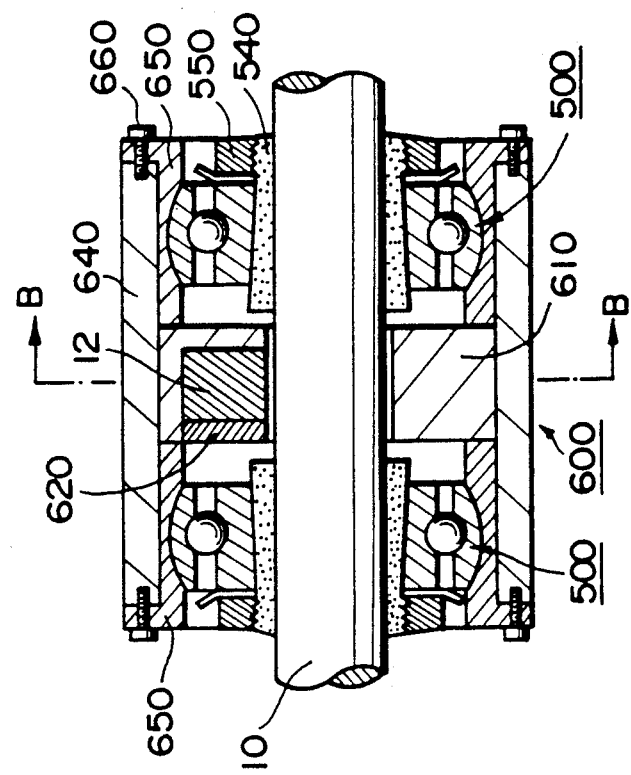

TORQUE DETECTING APPARATUS

BACKGROUND OF THE INVENTION

1. Field of the Invention

The present invention relates to a physical quantity detecting apparatus and, more particularly, to a physical quantity detecting apparatus for measuring a physical quantity (for example, transmitted torque) of an object of measurement.

2. Description of the Related Art

In various kinds of rotating drive mechanisms there is a demand for simple and accurate measurement of a physical quantity such as a transmitted torque because such measurement is exceedingly useful in a diverse range of industrial field for analyzing drive mechanisms and obtaining a better understanding of their operating condition.

Rotary drive mechanisms are used as prime movers in virtually every sector of industry, the most common types thereof being automobile engines, electric motors of electric cars and industrial motors.

In accurately obtaining and analyzing the operating condition of such mechanisms, it is as important to be able to accurately determine a transmitted torque as it is to determine the number of revolutions. Measurement of a torque is particularly important in the case of automobile engines because by measuring the torque at the engine and at the transmission, propeller shaft, differential gear and other points of the drive system it is possible to control the ignition timing for the engine, the amount of fuel injection, the timing for transmission shift, the gear ratio, etc. As a result of the optimum control of these factors, it is possible to improve fuel efficiency, driving characteristics, etc.

In the case of industrial motors, accurate torque measurement can also provide data for optimizing control and diagnosis of rotary drive systems, thereby improving energy efficiency and driving characteristics.

For these purposes, various kinds of torque detecting apparatus have conventionally been proposed, one of them being an apparatus for noncontactingly measuring the torque transmitted through a rotary magnetic material as magnetostriction.

When a torque is transmitted through a rotary drive system, strain is produced in the rotary members such as a rotating shaft and a clutch disc in proportion to the transmitted torque. Therefore, it is possible to measure the transmitted torque noncontactingly by detecting the magnetostriction of a rotary magnetic material which transmits the torque by using a magnetic sensor.

FIGS. 7 and 8 show an example of a torque transmission mechanism of a vehicle engine provided with a magnetic sensor 12 of a torque detecting apparatus. FIG. 7 is a schematic side elevational view of the magnetic sensor 12, and FIG. 8 is a schematic sectional view of the magnetic sensor 12 shown in FIG. 7, taken along the line VIII—VIII.

As is known, the torque produced in the engine is transmitted to a rotary flywheel (not shown) through a torque transmitting shaft 10, and is transmitted to the transmission through a clutch disc which comes into frictional contact with the flywheel.

When a torque is transmitted in this manner, anisotropy of strain $\epsilon$ which is proportional to the magnitude of the transmitted torque is generated on the torque transmitting shaft 10 and the rotary discs such as the clutch disc and the flywheel. If the torque transmission member is made of a ferromagnetic material, it is possible to measure the transmitted engine torque by magnetically detecting the magnitude of the anisotropy of strain $\epsilon$ generated by utilizing the magnetostrictive effect.

In the torque measuring apparatus, therefore, in order to make the rotary member to which a torque is transmitted a rotary magnetic material, the torque transmitting shaft 10 or the flywheel themselves is made of a ferromagnetic material, or a ferromagnetic material is attached to the surface of the torque transmitting shaft 10 or the flywheel, and the magnetic sensor 12 is opposed to the rotary magnetic material formed in this manner with a predetermined space therebetween.

The magnetic sensor 12 is composed of a U-shaped excitation core 14 which is disposed in parallel to the torque transmitting shaft 10, and a U-shaped detection core 18 which is disposed inside the excitation core 14 such as to be orthogonal thereto, with an excitation coil 16 wound around the excitation core 14, and a detection coil 20 wound around the detection core 18.

FIG. 10 is a block diagram of the torque detecting apparatus. To the excitation coil 16 a sine-wave voltage is applied from an AC power source 22 for alternating magnetization of the torque transmitting shaft 10, which is opposed to the magnetic sensor 12. When a torque is transmitted through the torque transmitting shaft 10, stress is produced in the torque transmitting shaft 10 and a magnetic flux component is generated in the direction orthogonal to the direction of excitation by virtue of the magnetostrictive effect. The magnetic flux component is detected by the detection coil 20 as an induced voltage. The induced voltage is amplified by an alternating amplifier 24 and is thereafter rectified by a detector 26. This rectified signal S (hereinunder referred to as "torque detection signal") is output as a torque detection signal.

The torque detection signal S is output as the sum of the component which depends upon the transmitted torque and an offset component which does not depend upon the transmitted torque. It is therefore necessary to subtract the offset component from the torque detection signal.

The magnitude of the offset component irregularly varies with the rotation of the rotary magnetic material, although the transmitted torque is zero, as shown in FIG. 12. Therefore, a technique of subtracting the offset component at each position of the rotary magnetic material is necessary for detecting the torque with high accuracy.

Japanese Patent Laid-Open Patent Publication Nos. 55533/1987 and 55534/1987 disclose apparatuses using such a technique. This apparatus measures the torque transmitted through a rotary magnetic material and having a plurality of rotational angle positions as torque inflection points at each interval between the torque inflection points. This apparatus is characterized in that an offset signal which is output from a magnetic material in dependence on the rotational angle of the rotary magnetic material is preset in each interval between the torque inflection points and the offset signal is subtracted from the detection signal output from the magnetic sensor on the basis of a timing signal which represents the rotational angle of the rotary magnetic material and the torque inflection point, thereby outputting the average torque value in each interval between the torque inflection points. In this way, it is possible to measure the torque transmitted through the rotary magnetic material in each interval between the torque inflection points without being influenced by the offset component.

This torque detecting apparatus however has the following two problems.

(a) In this apparatus, although fluctuation of the offset component with the rotation of a rotary magnetic material is taken into consideration, no attention is paid on the output which depends on the torque, namely, fluctuation of the torque detection sensitivity. Therefore, there is a limitation in enhancing the accuracy in torque detection.

More specifically, in this kind of torque detecting apparatus, since the torque is detected by utilizing a change in the magnetic characteristics produced on the surface of a rotary magnetic material, the detecting accuracy greatly depends upon the nonuniformity of the magnetic characteristics of an object of measurement. If the magnetic characteristics distribute nonuniformly in an object of measurement, namely, rotary magnetic material, the torque detection output (sensor output) disadvantageously fluctuates with the rotation of the shaft, as shown in FIG. 13, although the applied torque is constant.

The present inventors have investigated on the cause of such fluctuation of the torque detection output Torque detection output S is represented by the function of the applied torque Tq as follows:

$$S = Sens \cdot Tq + Offs \quad (1)$$

wherein Sens represents a sensitivity and Offs an offset output. The sensitivity means the increment in the detection output per unit torque, and the offset output means the sensor output obtained when the applied torque is zero.

As a result of investigation, the present inventors have confirmed that the sensitivity and the offset output shown in the equation (1) fluctuate due to the nonuniformity of the magnetic characteristic in the object of measurement.

This is represented by the following equation:

$$S(P) = Sens(P) \cdot Tq + Offs(P) \quad (2)$$

wherein P represents the rotational position (location of measurement) of the rotary magnetic material.

The sensitivity Sens(P) and the offset signal Offs(P) vary as shown in FIGS. 11 and 12, respectively. It goes without saying that when the rotary magnetic material rotates, the torque detection output S(P) fluctuates as shown in FIG. 13, even if the applied torque is constant It is therefore obvious that if the fluctuation of the offset component Offs(P) produced with the rotation of the rotary magnetic material is merely considered without taking the output depending upon the torque, namely, the torque detection sensitivity Sens(P) into any consideration, it is impossible to measure the transmitted torque Tq with high accuracy.

The following may be regarded as the cause of the nonuniformity of the magnetic characteristics in the object of measurement:
1 nonuniformity of composition,
2. nonuniformity of structure, and
3. distribution of residual stress.

Accordingly, if a rotary magnetic material having uniform composition and structure and no residual distribution is produced by improving the manufacturing process of an object of measurement, the above-described problems are solved. Actually, however, it is impossible because it requires complete control of the manufacturing process.

(b) In the torque detecting apparatus, since fluctuation of the torque detection signal in accordance with the temperature characteristic is not taken into consideration, there is also limitation in enhancing the detecting accuracy.

As a result of investigation, the present inventors have confirmed that the sensitivity and the offset output shown in the equation (1) fluctuates with a change in temperature of the detecting apparatus. FIGS. 14 and 15 show an example of the temperature dependence of the sensitivity Sens(T) and the offset output Offs(T), respectively. This will be represented by the following equation:

$$S(T) = Sens(T) \cdot Tq + Offs(T) \quad (3)$$

wherein T represents a temperature of the torque detecting apparatus.

The fluctuation is considered to be caused because the physical values of the material constituting the sensor and the object of measurement fluctuate due to change of temperature, because the clearance between the sensor and the object of measurement changes due to difference in the thermal expansion, or the like.

Accordingly, in this apparatus, the torque detection output sometimes changes with change of temperature of the detecting apparatus even if the applied torque is constant, as shown in FIG. 16, thereby making it impossible to obtain a satisfactory detecting accuracy.

As described above, since the above-described torque detecting apparatus have the problems (a) and (b), the torque detecting accuracy cannot be said to be satisfactory.

On the other hand, a sensor which is capable of detecting a torque in a low-rotation region with high response has recently been required in the rotating drive mechanism control system in automobiles, machine tools, etc. Especially, in order to effect the optimum control of an engine, a transmission, etc., a sensor which is capable of detecting a transmitted torque with high response and accuracy in a wide measuring range such as from no rotation to high-speed rotation of an engine and from low-temperature to high-temperature operation has been demanded.

Therefore, it is necessary to solve the above-described problems (a) and (b) as soon as possible.

SUMMARY OF THE INVENTION

The present invention has been achieved to eliminate the above-described problems.

It is a primary object of the present invention to provide a physical quantity detecting apparatus which is capable of detecting a physical quantity at real time without being influenced by the fluctuation of offset output and sensitivity due to the rotational or reciprocating position of an object of measurement.

It is a secondary object of the present invention to provide a physical quantity detecting apparatus which is capable of detecting a physical quantity at real time without being influenced by change of temperature by correcting the fluctuation of offset output and sensitivity due to temperature.

To achieve the primary object, the present invention provides a physical quantity detecting apparatus for measuring a physical quantity of an object of measurement which rotates or reciprocates at real time by using a physical quantity sensor, the apparatus comprising: a position detecting means for detecting the position of movement of the object of measurement which is divided into a given number of segments in advance, and outputting the detected position as a segment detection signal for the corresponding segment; an offset signal generating means for outputting an offset signal which corresponds to an offset component output from the physical quantity sensor in dependence on the position of movement of the object of measurement and which is set for each segment in advance; a sensitivity signal generating means for outputting a sensitivity signal which corresponds to the sensitivity of the physical sensor dependent on the position of movement of the object of measurement and which is set for each segment in advance; and a correction operation means for reading the offset signal and the sensitivity signal which correspond to the segment detection signal from the offset signal generating means and the sensitivity signal generating means, respectively, calculating the correction value of the offset component and the sensitivity of a detection signal output from the physical quantity sensor on the basis of a predetermined correction operation expression.

To achieve the secondary object, the present invention provides a physical quantity detecting apparatus further comprising: a temperature detecting means for detecting the temperature of the physical quantity detecting apparatus; an offset coefficient signal generating means in which a coefficient of the temperature dependence function of the offset signal is preset; and a sensitivity coefficient signal generating means in which a coefficient of the temperature dependence function of the sensitivity is preset; the correction operation means reading the coefficients from the offset coefficient signal generating means and the sensitivity coefficient generating means when the segment detection signal is input so as to correct the offset signal and the sensitivity on the basis of the temperature dependence function of the offset signal and the temperature dependence function of the sensitivity, thereby measuring the physical quantity of the object of measurement at real time without being influenced by change of temperature.

The present invention also provides a physical quantity detecting apparatus which separates the position of movement of an object of measurement which rotates or reciprocates into a given number of segments in advance, calculates the output of the physical quantity sensor for detecting the physical quantity of the object of measurement for each segment on the basis of correction operation expression which has an independent coefficient group for each segment so as to correct the offset component and the sensitivity; the apparatus comprising: a correction coefficient group calculating means for measuring the coefficient group in each segment; the correction coefficient group calculating means including: a calibration signal generating means for outputting a physical quantity calibration signal for calibrating the output of the physical quantity sensor; a waveform memory for storing the output of the physical quantity sensor and the physical quantity calibration signal output from the calibration signal generating means for each segment every time a segment detection signal is output from the position detecting means; and a coefficient calculating means for calculating the coefficient group of the correction operation expression for each segment on the basis of the output of the physical quantity sensor and the physical quantity calibration signal stored for each segment in the waveform memory.

Principle

The principle of the present invention will be explained while citing as an example the measurement of a torque transmitted through a rotary object as an object of measurement.

(a) Fluctuation of the output of a sensor depending on the rotational angle of a rotary object, namely, the location of measurement will first be explained.

It has been confirmed from experiments that a sensitivity (see FIG. 11) and an offset output (see FIG. 12) vary with the rotational position P, as described above. As described above, the physical quantity detection output $S(P)$ is represented, for example, as follows as a function of the rotational position P:

$$S(P) = Sens(P) \cdot Tq + Offs(P) \qquad (2)$$

wherein P represents the rotational angle (hereinunder referred to as "rotational position") indicating the location of measurement.

From the equation (2) it is understood that the transmitted torque is obtained from the following equation:

$$Tq = \frac{S(P)}{Sens(P)} - \frac{Offs(P)}{Sens(P)} \qquad (4)$$

As is obvious from the equation (4), if the sensitivity $Sens(P)$ and the offset signal $Offs(P)$ which correspond to the rotational position P of a rotor are obtained in advance, it is possible to correct the fluctuation of sensitivity and the fluctuation of the offset output and obtain the accurate transmitted torque $Tq(P)$ merely by substituting the torque detection signal $S(P)$ output from the physical quantity sensor into the equation (4).

(b) Another problem, namely, fluctuation of sensor output due to change of temperature will now be explained.

It has been confirmed from experiments that a sensitivity (see FIG. 14) and an offset output (see FIG. 15) vary with change of temperature, as described above. The torque detection signal S(T) shown in the equation (3) is therefore represented as follows on the assumption that the rotational position P is constant:

$$S(T) = Sens \cdot f_1(T) \cdot Tq + Offs \cdot f_2(T) \qquad (5)$$

wherein $f_1(T)$, $f_2(T)$ represent functions of a temperature (T) (for example, a simple function, a function of a high degree or an exponential function of a temperature).

It is to be noted that the fluctuation of a torque detection signal due to the nonuniform distribution of magnetic characteristics in the object of measurement and the fluctuation of an torque detection signal due to change of temperature are treated as phenomena independent of each other.

Accordingly, the sensitivity $Sens(T)$ and the offset signal $Offs(T)$ represented by a function of a temperature T are represented as the products of the sensitivity $Sens(P)$ represented by a function of the rotational position P and the temperature dependence function $f_1(T)$ and the products of the offset signal Offs(P) represented by a function of the rotational position P and the temperature dependence function $f_2(T)$, respectively:

$$Sens(T) = Sens(P) \cdot f_1(T)$$

$$Offs(T) = Offs(P) \cdot f_2(T) \tag{6}$$

When the two causes of fluctuation are taken into consideration simultaneously, torque detection signal S(P,T) is represented by the following equation:

$$S(P,T) = Sens(P) \cdot f_1(T) \cdot Tq + Offs(P) \cdot f_2(T) \tag{7}$$

When the equation (7) is rewritten with respect to the torque Tq, the following equation is obtained:

$$Tq = \frac{A(P) \cdot S(P,T)}{f_1(T)} + \frac{B(P) \cdot f_2(T)}{f_1(T)} \tag{8}$$

wherein $$A(P) = \frac{1}{Sens(P)} \tag{9}$$

$$B(P) = -\frac{Offs(P)}{Sens(P)} \tag{10}$$

Accordingly, the torque detection signal which does not depend on the location P of measurement and the temperature T is obtained by correcting the torque detection signal S(P,T) by multiplying S(P,T) by $A(P)/f_1(T)$ and adding thereto $B(P) \cdot (f_2(T)/f_1(T))$. The correction coefficients A and B are naturally functions of the location P of measurement.

If it is assumed that the sensitivity and the offset output vary with temperature simple-functionally, $f_1(T)$ and $f_2(T)$ are represented by the following equations:

$$f_1(T) = a_1 + b_1 \cdot T \tag{11}$$

$$f_2(T) = a_2 + b_2 \cdot T \tag{12}$$

wherein $a_1$, $b_1$, $a_2$ and $b_2$ are constants.

Accordingly, if the coefficients $a_1$, $b_1$ of the temperature dependence function of the sensitivity and the coefficients $a_2$, $b_2$ of the temperature dependence function of the offset signal are obtained in advance, it is possible to correct the fluctuations of the detection sensitivity and the offset component due to change of temperature on the basis of the equation (8) and meausre the transmitted torque Tq without being influenced by the change of temperature.

(c) In order to use the correction operation expression represented by the equation (4), it is necessary to obtain the coefficient group used in the correction operation expression for each segment P''.

In order to use the correction operation expression represented by the equation (8), it is further necessary to obtain the temperature coefficients $a_1$, $b_1$, $a_2$ and $b_2$ in addition to the above-described coefficient group.

One feature of the present invention lies in that the rotational position of a rotor is divided into a given number of segments in advance and the coefficient group in the correction operation expression represented by the equation (4) or (8) is obtained for each segment P'' in advance. In this way, the torque detection signal S(P'') output from the physical quantity sensor is processed on the basis of the correction operation expression having the independent coefficients for each segment P'', thereby correcting the offset component and the sensitivity to obtain the transmitted torque.

If it is assumed that the total number of segments is Np, the relationship between the segment P'' and the rotational position P is represented as follows:

$$P'' = \frac{P \times h}{Np} \quad (h = 1, 2, \ldots Np)$$

The width Wp of the uniformly divided segment is P/Np.

The principle of obtaining the coefficient group for each segment will be explained in the following while citing the case of obtaining the coefficient group A(P), B(P), $a_1$, $a_2$, $b_1$, $b_2$ used in the correction operation shown by the equations (8), (11) and (12) as an example.

(d) Principle of determining the coefficients A(P) and B(P)

A(P) and B(P) are represented by the equations (9) and (10).

$$A(P) = \frac{1}{Sens(P)} \tag{9}$$

$$B(P) = -\frac{Offs(P)}{Sens(P)} \tag{10}$$

In order to obtain A(P) and B(P), the sensitivity Sens(P) and the offset signal Offs(P) are obtained for each segment P''.

These sensitivity and offset signal are represented by the equation (8) using the output S(P) of the physical quantity sensor and the true transmitted torque Tq, as described above.

$$Tq = \frac{A(P) \cdot S(P,T)}{f_1(T)} + \frac{B(P) \cdot f_2(T)}{f_1(T)} \tag{8}$$

In order to obtain the sensitivity and offset signal for each segment, a simultaneous simple equation having sensitivity Sens(P) and an offset signal Offs(P) as two unknowns is solved.

However, if a transmitted torque is measured by using a sensor or the like, it is unavoidable that the sensor output S(P) contains an error e caused during measurement. This is represented by the following equation:

$$S(P) = Sens(P) \cdot Tq + Offs(P) + \epsilon \tag{2'}$$

Since the sensor output S(P) contains an error $\epsilon$ in this way, it is impossible to determine the sensitivity Sens and the offset signal Offs at a sufficient accuracy merely by solving the simultaneous simple equation having two unknowns of a sensitivity and an offset signal.

(e) The sensitivity and the offset signal can be determined with a minimum $\epsilon$ in the following way.

(e - 1) It is first assumed for simplification that the physical quantity sensor is fixed at a predetermined position $P_1$ and the position P of the rotor with respect to the sensor is constant.

In this case, since the sensitivity and the offset signal are not influenced by the rotation of the rotor, these values are constants, as represented by the following equations:

$$\text{Offs} = a \tag{13}$$

$$\text{Sens} = b \tag{14}$$

By using these constants a and b, the equation (2') is represented by the following equation:

$$S = a + bTq + \epsilon \tag{15}$$

It is then assumed that the transmitted torque Tq is known in advance, and the signal S output from the physical quantity sensor in correspondence with the transmitted torque Tq is measured. The signal S is measured n times while varying the value of the transmitted torque Tq. As a result of measurements, the data pair of the transmitted torque Tq and the sensor output S is represented as follows:

$$[Tq_i, S_i]_{i=1}^{n} : (Tq_1, S_1), (Tq_2, S_2) \ldots (Tq_i, S_i) \ldots (Tq_n, S_n) \tag{16}$$

By substituting the data obtained by the i-th measurement into the equation (15), the following equation is obtained:

$$S_i = a + bTq_i + \epsilon_i \tag{17}$$

The square sum Q of errors (differences) is represented by the following equation:

$$Q = \sum_{i=1}^{n} \epsilon_i^2 = \sum_{i=1}^{n} \{S_i - (a + bTq_i)\}^2 \tag{18}$$

If it is possible to obtain a and b such that the square sum Q of errors is the minimum, the constants a, b which make the error $\epsilon$ minimum are determined as fixed values.

In order to obtain these constants a and b, the equation (18) is differentiated by a and b. In order that Q takes the minimum value, the differentiated value is assumed to be 0. The differentiation operation expressions are as follows:

$$\frac{\partial Q}{\partial a} = -2 \sum_{i=1}^{n} \{S_i - (a + bTq_i)\} = 0 \tag{19}$$

$$\frac{\partial Q}{\partial b} = -2 \sum_{i=1}^{n} Tq_i \{S_i - (a + bTq_i)\} = 0 \tag{20}$$

By solving the simultaneous differential equation, a and b are obtained as follows:

$$a = \frac{\sum_{i=1}^{n} S_i}{n} - b \frac{\sum_{i=1}^{n} Tq_i}{n} \tag{21}$$

$$b = \frac{\sum_{i=1}^{n} Tq_i S_i - \frac{\sum_{i=1}^{n} Tq_i \sum_{i=1}^{n} S_i}{n}}{\sum_{i=1}^{n} Tq_i^2 - \frac{\left(\sum_{i=1}^{n} Tq_i\right)^2}{n}} \tag{22}$$

These coefficients a, b are values which make the square sum Q of errors s minimum. Therefore, a and b represent the offset signal and the sensitivity, respectively, at a sufficient accuracy, as shown by the following equation:

$$\text{Offs} = a \tag{23}$$

$$\text{Sens} = b \tag{24}$$

In order to secure the accuracy of the offset signal and the sensitivity obtained in this way, it is necessary that the number n of data is large and each data effectively covers the measuring range.

(e - 2) Although the sensitivity and offset signal are obtained with the physical quantity sensor being fixed at one point on the rotor in the case of (e - 1), when a transmitted torque is actually measured, the rotor is opposed to the physical quantity sensor with a space therebetween, and the rotational position (segment P'') of the rotor with respect to the physical quantity sensor momently varies.

The offset signal and the sensitivity are obtained for each segment P'' by the method described in detail in (e-1).

To this end, 360° at which the rotor makes one revolution is divided into p segments. The rotor is rotated r times while measuring the transmitted torque Tq and the sensor output S(P'') at each segment P''. In this way, the sensitivity and the offset signal are measured at m (m=p×r) segments in total.

Every time the rotor makes one revolution, measurement is carried out in the total segments, so that when a rotor makes r revolutions, r measurements in total are performed at the same segment.

If it is assumed such measurement is performed n times while varying the value of the transmitted torque Tq, the following data group is obtained:

$$[Tq_{ij}, S_{ij}]_{i=1, j=1}^{n \quad m} : \tag{25}$$

$$(Tq_{11}, S_{11}), (Tq_{12}, S_{12}) \ldots (Tq_{1j}, S_{1j}) \ldots (Tq_{1m}, S_{1m})$$
$$(Tq_{21}, S_{21}), (Tq_{22}, S_{22}) \ldots (Tq_{2j}, S_{2j}) \ldots (Tq_{2m}, S_{2m})$$
$$(Tq_{i1}, S_{i1}), (Tq_{i2}, S_{i2}) \ldots (Tq_{ij}, S_{ij}) \ldots (Tq_{im}, S_{im})$$
$$(Tq_{n1}, S_{n1}), (Tq_{n2}, S_{n2}) \ldots (Tq_{nj}, S_{nj}) \ldots (Tq_{nm}, S_{nm})$$

It will be understood from this result that the small data group consisting of n×r data pairs is obtained for each segment P'', as represented by the following equation:

$$[Tq_{ij}, S_{ij}]_{i=1, j=(h-1) \cdot r + 1}^{n \quad r \cdot h} : \tag{26}$$

$$(Tq_{1h}, S_{1h}), (Tq_{2h}, S_{2h}) \ldots (Tq_{i \, i \cdot h}, S_{i \, i \cdot h}) \ldots (Tq_{n \, r \cdot h}, S_{n \, r \cdot h})$$

Accordingly, it is possible to obtain the offset signal Offs($P_h$) and the sensitivity Sens($P_h$) at a given segment $P_h$ as represented by the following equation by calculating the equations (21) and (22) while using the thus-obtained small data group:

$$Offs(P_h) = \frac{\sum_{i=1}^{n} \sum_{j=(h-1)\cdot r+1}^{r\cdot h} S_{ij}}{n\cdot r} - b\frac{\sum_{i=1}^{n} \sum_{j=(h-1)\cdot r+1}^{r\cdot h} Tq_{ij}}{n\cdot r} \quad (27)$$

$$Sens(P_h) = \frac{\sum_{i=1}^{n} \sum_{j=(h-1)\cdot r+1}^{r\cdot h} Tq_{ij} S_{ij} - \frac{\sum_{i=1}^{n} \sum_{j=(h-1)\cdot r+1}^{r\cdot h} Tq_{ij} \sum_{i=1}^{n} \sum_{j=(h-1)\cdot r+1}^{r\cdot h} S_{ij}}{n\cdot r}}{\sum_{i=1}^{n} \sum_{j=(h-1)\cdot r+1}^{r\cdot h} Tq_{ij}^2 - \frac{\left(\sum_{i=1}^{n} \sum_{j=(h-1)\cdot r+1}^{r\cdot h} Tq_{ij}\right)^2}{n\cdot r}} \quad (28)$$

By repeating these calculations, the coefficient groups for all segments represented by the following equation is obtained:

$$[Offs(P_h), Sens(P_h)]_{h=1}^{P} \quad (29)$$

In this way, according to the present invention, it is possible to obtain the coefficient group which is used for the correction operation expression, namely, the offset signal and the sensitivity for each segment P" independently of another.

When the coefficients A, B shown in the equations (9) and (10) are obtained for each segment, the offset signal and the sensitivity for each segment represented by the equation (29) are substituted into the equations (9) and (10). Thus, the independent coefficient group represented by the following equation is obtained:

$$[A(P_h), B(P_h)]_{h=1}^{p} \quad (30)$$

(f) Principle of determining temperature correction coefficients

The coefficient groups (29) and (30) are values obtained when the temperature T of the detecting apparatus is constant.

In order to correct these coefficient groups in correspondence with a change in the temperature T, the following equations must be used, as described above:

$$Sens(T) = Sens(P)\cdot f_1(T)$$

$$Offs(T) = Offs(P)\cdot f_2(T) \quad (6)$$

$$f_1(T) = a_1 + b_1\cdot t \quad (11)$$

$$f_2(T) = a_2 + b_2\cdot T \quad (12)$$

It is therefore necessary to obtain each of the temperature coefficients $a_1$, $b_1$, $a_2$, and $b_2$ used in the equations (11) and (12) when the correction operation is carried out on the basis of the detected temperature T.

For this purpose, the data group represented by the equation (25) is obtained l times in the present invention with the temperature T used as a parameter. As a result, l data groups having the temperature $T_k$ as a parameter are obtained as represented by the following equation $$\left([Tq_{ij}, S_{ij}]_{i=1, j=1}^{n, m}\right)_{T_k=1}^{l} \quad (31)$$

It may be assumed that the fluctuation components Sens(P) and Offs(P) depending on the rotation of the rotor and the fluctuation components $f_1(T)$ and $f_2(T)$ depending on the temperature T are independent of each other.

Accordingly, when the temperature T is constant, if the average values $\overline{Tq}_i$, $\overline{S}_i$ are used as the values of the transmitted torque Tq and the sensor output S, respectively, the equation (5) is represented as follows:

$$\overline{S}_i = \overline{Sens}\cdot f_1(T)\cdot \overline{Tq}_i + \overline{Offs}\cdot f_2(T) \quad (32)$$

wherein $$\overline{S}_i = \frac{\sum_{j=1}^{m} S_{ij}}{m} \quad (33)$$

$$\overline{Tq}_i = \frac{\sum_{j=1}^{m} Tq_{ij}}{m} \quad (34)$$

$$\overline{Sens} = \frac{\sum_{j=1}^{m} Sens(P_j)}{m} \quad (35)$$

$$\overline{Offs} = \frac{\sum_{j=1}^{m} Offs(P_j)}{m} \quad (36)$$

In the present invention, l average values of the sensitivity and the offset signal represented by the equations (34) and (35), respectively, are obtained while using the temperature $T_k$ as a parameter. In this way, the data group consisting of the sensitivity average value and the offset average value which corresponds to each temperature $T_k$ is obtained.

By using the thus-obtained data group and the equations (11) and (12), approximate coefficients $b_{10}$, $a_{10}$, $b_{20}$ and $a_{20}$ used for the temperature dependence function (a simple function approximation) of $\overline{Sens}$ and $\overline{Offs}$ are obtained by the method described in (e-1) from the following equations:

$$\overline{Sens}_k = a_{10} + b_{10}\cdot T_k + \epsilon_k \quad (37)$$

$$Q = \sum_{k=1}^{l} \epsilon_k^2 \quad (38)$$
$$= \sum_{k=1}^{l} \{\overline{Sens}_k - (a_{10} + b_{10}\cdot T_k)\}^2$$

$$\overline{Offs}_k = a_{20} + b_{20}\cdot T_k + \epsilon_k \quad (39)$$

$$Q = \sum_{k=1}^{l} \epsilon_k^2 \quad (40)$$
$$= \sum_{k=1}^{l} \{\overline{Offs}_k - (a_{20} + b_{20}\cdot T_k)\}^2$$

-continued $$a_{10} = \frac{\sum_{k=1}^{l} \overline{Sens}_k}{l} - b_{10} \frac{\sum_{k=1}^{l} T_k}{l} \quad (41)$$

$$b_{10} = \frac{\sum_{k=1}^{l} \overline{Sens}_k \cdot T_k - \frac{\sum_{k=1}^{l} \overline{Sens}_k \cdot \sum_{k=1}^{l} T_k}{l}}{\sum_{k=1}^{l} T_k^2 - \frac{\left(\sum_{k=1}^{l} T_k\right)^2}{l}} \quad (42)$$

$$a_{20} = \frac{\sum_{k=1}^{l} \overline{Offs}_k}{l} - b_{20} \frac{\sum_{k=1}^{l} T_k}{l} \quad (43)$$

$$b_{20} = \frac{\sum_{k=1}^{l} \overline{Offs}_k \cdot T_k - \frac{\sum_{k=1}^{l} \overline{Offs}_k \cdot \sum_{k=1}^{l} T_k}{l}}{\sum_{k=1}^{l} T_k^2 - \frac{\left(\sum_{k=1}^{l} T_k\right)^2}{l}} \quad (44)$$

Since the coefficients $a_1$, $b_1$, $a_2$ and $b_2$ used for the correction operation are relative values, these values are obtained by using $a_{10}$, $b_{10}$, $a_{10}$, and $b_{10}$ from the following equations:

$$a_1 = \frac{l \cdot a_{10}}{\sum_{k=1}^{l} \overline{Sens}_k} \quad (45)$$

$$b_1 = \frac{l \cdot b_{10}}{\sum_{k=1}^{l} \overline{Sens}_k} \quad (46)$$

$$a_2 = \frac{l \cdot a_{20}}{\sum_{k=1}^{l} \overline{Offs}_k} \quad (47)$$

$$b_2 = \frac{l \cdot b_{20}}{\sum_{k=1}^{l} \overline{Offs}_k} \quad (48)$$

In this way, according to the present invention, the coefficients $a_1$, $b_1$, $a_2$, and $b_2$ used for the correction operation are obtained.

The operation of the present invention will now be explained.

(a) The torque detecting apparatus of the present invention measures a physical quantity of an object of measurement which rotates or reciprocates by using a physical quantity sensor.

As described above, in such a physical quantity sensor, the sensitivity of the physical quantity detection signal and the offset signal which are output from the physical quantity sensor vary depending upon the location of measurement due to the nonuniformity of the physical properties in the object of the measurement, as shown in FIGS. 11 and 12.

A first feature of the present invention lies in that the fluctuation of the physical quantity detection output caused by the rotation or reciprocation of an object of measurement, in other words, the fluctuations of the sensitivity of the physical quantity detection output and the offset signal are corrected at real time so as to accurately measure the physical quantity.

For this purpose, in an apparatus of the present invention, the position of rotation or reciprocation of an object of measurement is divided into a given number of segments in advance By using a position detecting means, the location of measurement of the physical quantity sensor in the object of measurement is detected, and the detected position is output as a detection signal for the corresponding segment.

An apparatus of the present invention is provided with an offset signal generating means, a sensitivity signal generating means and a correction operation means.

In the offset signal generating means, an offset signal which is output in dependence on the position of movement of the object of measurement is set for each segment in advance. In the sensitivity signal generating means, a sensitivity signal which corresponds to the sensitivity of the physical quantity sensor dependent on the position of movement of the object of measurement is set for each segment in advance.

The correction operation means reads from the offset signal generating means and the sensitivity signal generating means the offset signal and the sensitivity signal, respectively, which correspond to the detection signal for the corresponding segment output from the position detecting means, and calculates the detection signal output from the physical quantity sensor by using the offset signal and the sensitivity signal.

Owing to this structure, it is possible to eliminate the influence of the sensitivity and the offset component from the physical quantity detection signal, and to obtain a physical quantity detection signal represented by a flat characteristic curve which does not depend on the location P of measurement, as shown in FIG. 17 even when the physical quantity detection signal fluctuates in spite of a constant physical quantity, as shown in FIG. 13.

Especially, according to the present invention, since the measuring accuracy does not depend on the position of movement of an object of measurement, it is possible to measure a physical quantity on the basis of the physical quantity detection output which is output from the physical quantity sensor at real time in a wide range from the no rotation of the object of measurement, a low-speed movement region to a high-speed movement region.

(b) The detection sensitivity of a physical quantity sensor and the offset component contained in the output signal fluctuate with a change in the temperature of a detecting apparatus, as shown in FIGS. 14 and 15. Therefore, when a physical quantity is measured in an environment in which temperature change is large, the physical quantity disadvantageously varies with a change in the temperature T, as shown in FIG. 16, if correction is carried out merely on the basis of the detection sensitivity of the physical quantity sensor and the offset component contained in the output signal in correspondence with the position of movement. It is therefore impossible to detect a physical quantity with high accuracy in a wide range from a low temperature to a high temperature.

A second feature of the present invention lies in that a physical quantity is measured without being influenced by change of temperature by correcting the fluctuations of the detection sensitivity and the offset component caused by change of temperature.

For this purpose, an apparatus of the present invention further comprises a temperature detecting means, an offset coefficient signal generating means and a sensitivity coefficient signal generating means.

The temperature detecting means outputs the temperature of the physical quantity detecting apparatus. The temperature of the position suitable for correction operation is detected. As examples of the position the temperature of which is detected, a sensor and an object of measurement will be cited.

In the offset coefficient signal generating means, the coefficients (e.g., coefficients $a_2$, $b_2$ in the equation (12)) of the temperature dependence function of an offset signal is preset, and in the sensitivity coefficient signal generating means, the coefficients (e.g., coefficients $a_1$, $b_1$ in the equation (11)) of the temperature dependence function of a sensitivity is preset.

The correction operation means reads the coefficients from the offset coefficient signal generating means and the sensitivity coefficient signal generating means, and corrects the offset signal and the sensitivity in correspondence with the detected temperature. By using the thus-corrected offset signal and sensitivity, the detection signal output from the physical quantity sensor is calculated. In this way, it is possible to obtain a physical quantity detection output represented by a characteristic curve such as that shown in FIG. 18, which is flat with respect to change of temperature. It is thus possible to measure a physical quantity of an object of measurement at real time without being influenced by change of temperature.

Especially, in the present invention, the physical quantity detection signal is corrected on the basis of the equation (8). In the equation (8), the fluctuation of the physical quantity detection output with the rotation of a shaft and the fluctuation of the physical quantity detection output with change of temperature are simultaneously taken into consideration. It is therefore possible to measure a physical quantity of an object of measurement accurately without being influenced by either the fluctuation of the physical quantity detection output with the rotation of an axis or the fluctuation of the physical quantity detection output with change of temperature. (c) As described above, in a physical quantity detecting apparatus of the present invention, the position of rotation or reciprocation of an object of measurement which rotates or reciprocates is divided into a given number of segments in advance. By using a physical quantity sensor, a physical quantity of the object of measurement is detected and sensor output is processed on the basis of the correction operation expression having independent coefficients for each segment. Consequently, it is possible to correct the offset component and the sensitivity, thereby detecting the true physical quantity.

Another feature of the present invention lies in that a coefficient group used for correction operation is obtained for each segment in advance by using a correction coefficient group calculating means.

For this purpose, in an apparatus of the present invention, the position of rotation or reciprocation of an object of measurement is divided into a given number of segments in advance. By using a position detecting means, the rotational angle position or the position of reciprocation of the object of measurement is detected, and the detected position is output as a detection signal for the corresponding segment.

An apparatus of the present invention is provided with a calibration signal generating means for outputting a physical quantity calibration signal for comparing the signal with the output of the physical quantity sensor.

It is necessary that the calibration signal generating means outputs the actual physical quantity of the object of measurement as the physical quantity calibration signal.

Every time the position detecting means outputs a segment detection signal, the output of the physical quantity sensor and the physical quantity calibration signal output from the calibration signal generating means are written into a waveform memory. That is, the output of the physical quantity sensor and the physical quantity calibration signal corresponding thereto are written for each segment.

Now it is assumed that the number of segments is p per rotation or reciprocation of the object of measurement. When the object of measurement makes one revolution or one reciprocation, p pairs of sensor outputs and calibration signals are stored in the waveform memory.

(c-1) Calculation of sensitivity and offset signal

Among the coefficients used for the correction operation expression (4) or (8), the sensitivity Sens(P) and the offset signal Offs(P) are obtained in the following way.

The temperature T is first kept constant, and data for the r revolutions or r reciprocations of the object of measurement are written into the waveform memory. The waveform memory thereby stores a data group of $$[Tq_j, S_j]_{j=1}^{m}$$

wherein $m = p \times r$.

Such writing operation of a data group is carried out n times with respect to different physical quantities while using the physical quantity Tq as a parameter. As a result, $2n \times m$ items of data are written in the waveform memory, as represented by the following equation:

$$[Tq_{ij}, S_{ij}]_{i=1 j=1}^{n \quad m} : \quad (25)$$

$$(Tq_{11}, S_{11}), (Tq_{12}, S_{12}) \ldots (Tq_{1j}, S_{1j}) \ldots (Tq_{1m}, S_{1m})$$
$$(Tq_{21}, S_{21}), (Tq_{22}, S_{22}) \ldots (Tq_{2j}, S_{2j}) \ldots (Tq_{2m}, S_{2m})$$
$$(Tq_{i1}, S_{i1}), (Tq_{i2}, S_{i2}) \ldots (Tq_{ij}, S_{ij}) \ldots (Tq_{im}, S_{im})$$
$$(Tq_{n1}, S_{n1}), (Tq_{n2}, S_{n2}) \ldots (Tq_{nj}, S_{nj}) \ldots (Tq_{nm}, S_{nm})$$

When the thus-obtained data group is arranged with respect to each segment position $P_h$, the small data group is represented by the following equation:

$$[Tq_{ij}, S_{ij}]_{i=1 j=(h-1)\cdot r+1}^{n \quad r\cdot h} : \quad (26)$$

$$(Tq_{1h}, S_{1h}), (Tq_{2h}, S_{2h}) \ldots (Tq_{i\cdot h}, S_{i\cdot h}), \ldots (Tq_{n\cdot r\cdot h}, S_{n\cdot r\cdot h})$$

A small data group obtained for each segment $P_h$ is substituted into the equations (27) and (28) to obtain $Offs(P_h)$ and $Sens(P_h)$ for each segment $P_h$ as coefficients. In this way, the coefficients calculating means in accordance with the present invention obtains the coefficient group for each segment:

$$[Offs(P_h), Sens(P_h)]_{h=1}^{p}$$

By substituting the thus-obtained sensitivity and offset signal into the equations (9) and (10), the coefficients A, B of the correction operation expression are obtained as represented by the following equation:

$$[A(P_h), B(P_h)]_{h=1}^{p}$$

(c-2) Calculation of temperature coefficients

A physical quantity detecting apparatus of the present invention obtains the temperature coefficients $a_1$, $b_1$, $a_2$ and $b_2$ shown in the equations (11) and (12) in advance in the case of correction operation using the equation (8).

These temperature coefficients are calculated in the following process. The data shown in the formula (25) are repeatedly measured with respect to different l temperatures $T_k (1 \leq K \leq l)$ while using the operation temperature T of the detecting apparatus as a parameter, and the measured data are written in the waveform memory.

The thus-obtained data group is represented by the following equation:

$$\left( [Tq_{ij}, S_{ij}]_{i=1, j=1}^{n, m} \right) T_{k=1}^{l} \quad (31)$$

The correction operation means classifies the thus-obtained data group by the temperature $T_k$. The calculations of the equations (34) and (35) are carried out for each group to obtain the average values of the sensitivity and the offset signal. In this way, the average value of the sensitivity and offset signal group is obtained for each temperature $T_k$ as represented by the following equation:

$$[\overline{Sens}_k, T_k]_{k=1}^{l}, [\overline{Offs}_k, T_k]_{k=1}^{l} \quad (49)$$

By using the thus-obtained data group, the temperature coefficients $a_1$, $b_1$, $a_2$ and $b_2$ are obtained on the basis of the equations (37) to (48).

In this way, according to the present invention, it is possible to obtain the coefficient group of the correction operation expressions accurately prior to the start of the measurement of the physical quantity. Consequently, it is possible to measure a physical quantity of the object of measurement accurately without being influenced either by the position of movement of the object of measurement or by the change in the operation temperature by using the correction operation expression represented by the equation (4) or (8).

As explained above, according to the present invention, it is possible to determine the coefficient group of the correction operation expression so as to correct the variance at real time even when the detection sensitivity of the physical quantity sensor and the offset component contained in the output signal fluctuate with the rotation or reciprocation of an object of measurement. It is therefore possible to measure a physical quantity of an object of measurement at real time in a wide range from the suspension of the object of measurement, a low-speed movement region to a high-speed movement region.

In addition, according to the present invention, it is also possible to determine the temperature coefficient group of the correction operation expression in advance such that the fluctuations of the detection sensitivity of the physical quantity sensor and the offset component contained in the output signal with the change in the operation temperature of the detecting apparatus are corrected. It is therefore possible to measure a physical quantity of an object of measurement accurately even in a wide temperature condition from a low temperature to a high temperature.

The above and other objects, features and advantages of the present invention will become clear from the following description of the preferred embodiments thereof, taken in conjunction with the accompanying drawings.

BRIEF DESCRIPTION OF THE DRAWINGS

FIG. 1, comprising FIGS. 1A and 1B, is a block diagram of a first embodiment of a torque detecting apparatus according to the present invention;

FIG. 2, comprising FIGS. 2A and 2B, is a block diagram of a second embodiment of a torque detecting apparatus according to the present invention;

FIGS. 11 to 13 are explanatory views of the fluctuation of the torque detection sensitivity of a magnetic sensor due to the nonuniformity of the magnetic characteristics in a rotary magnetic material, the fluctuation of the offset component contained in the torque detection signal output from the magnetic sensor and the fluctuation distribution of the torque detection signals output from the magnetic sensor, respectively;

FIG. 14 is an explanatory view of the temperature dependence of the sensitivity of a magnetic sensor;

FIG. 15 is an explanatory view of the temperature dependence of the offset component contained in the signal output from a magnetic sensor;

FIG. 16 is an explanatory view of the temperature dependence of the torque detection signal itself output from a magnetic sensor;

FIGS. 30(A) and 30(B) are explanatory views of a first example of a magnetic sensor attaching device, wherein FIG. 30(A) is a sectional side elevational view thereof; and FIG. 30(B) is a sectional view of the example shown in FIG. 30(A), taken along the line B—B;

FIGS 33A and 3B, is an explanatory view of the data on the fluctuation of the detection outputs measured by an apparatus of the present invention and a conventional apparatus;

FIGS. 36(A) and 36(B) are explanatory views of a second example of a magnetic sensor attaching device, wherein FIG. 36(A) is a sectional side elevational view thereof; and FIG. 36(B) is a sectional view of the example shown in FIG. 36(A), taken along the line B—B;

FIGS. 37 to 39 are explanatory views of a third example of a magnetic sensor attaching device;

FIGS. 40(A) and 40(B) are explanatory views of a fourth example of a magnetic sensor attaching device, wherein FIG. 40(A) is a sectional side elevational view thereof; and FIG. 40(B) is a sectional view of the example shown in FIG. 40(A), taken along the line B—B.

DESCRIPTION OF THE PREFERRED EMBODIMENTS

Preferred embodiments of the present invention will be explained with reference to the accompanying drawings.

First Embodiment

Figure 1B:
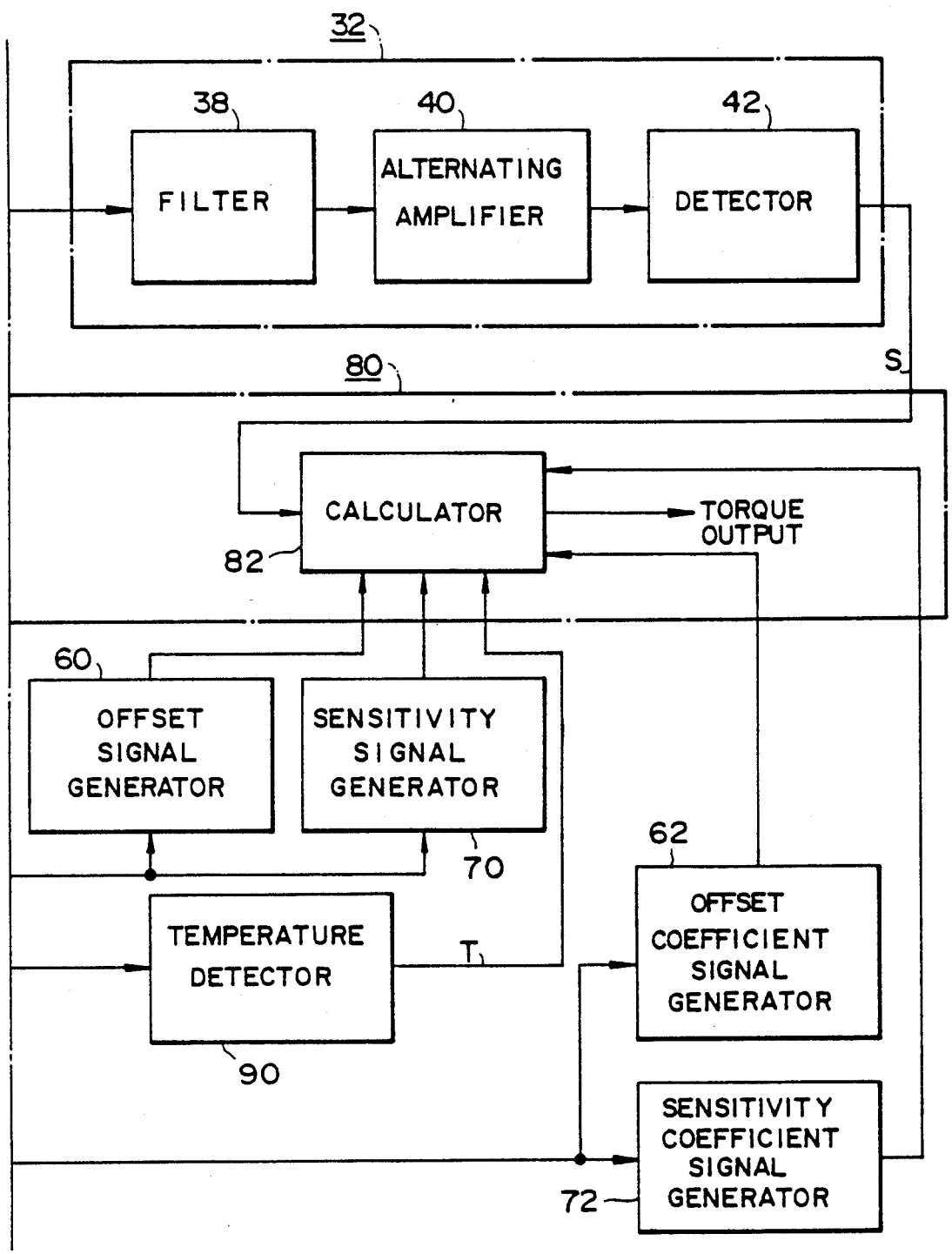
Figure 21B:
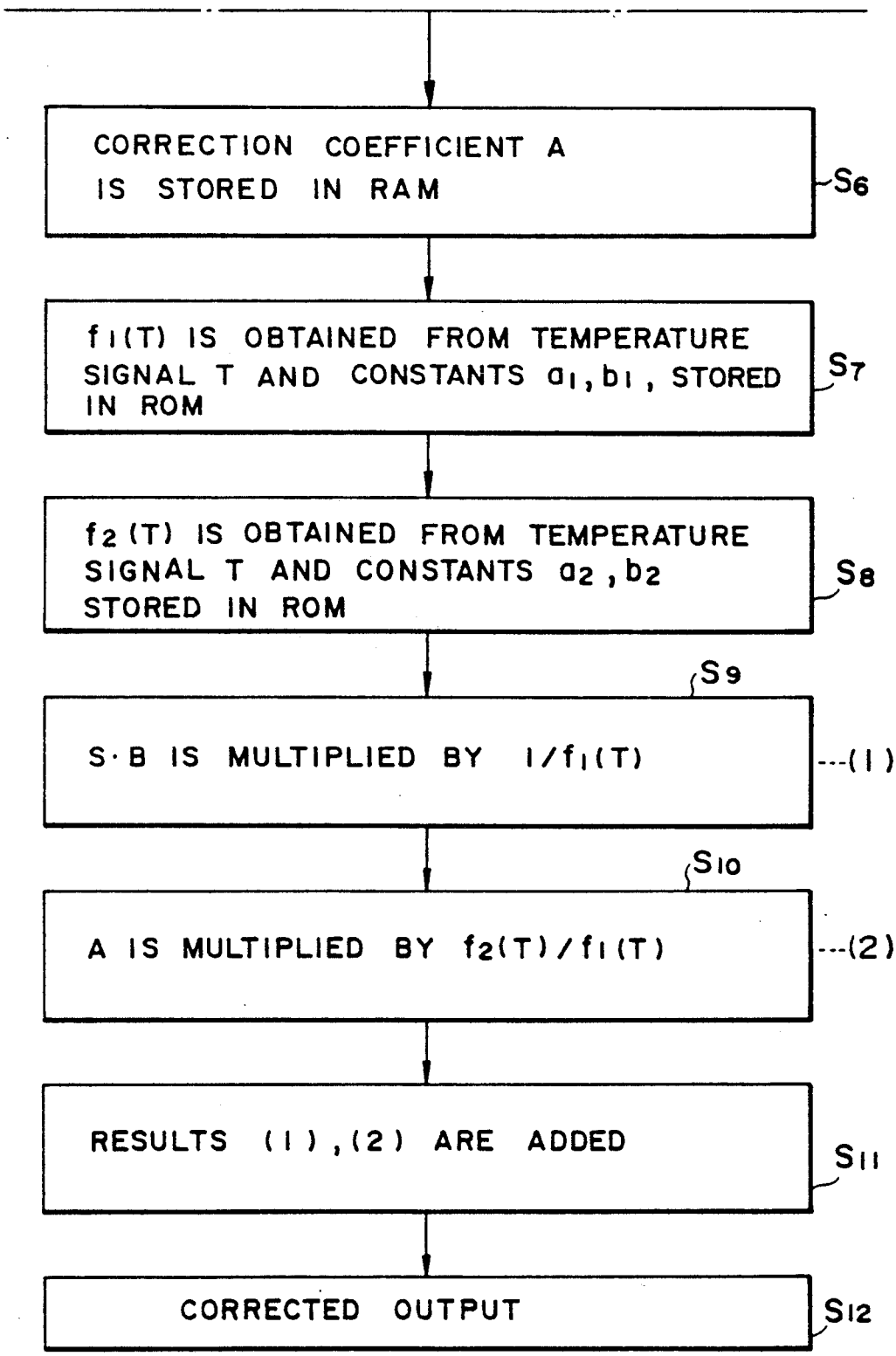
FIG. 21, comprising FIGS. 21 A and 21 B, is an explanatory view of a correction operation processing algorithm in an apparatus according to the present invention.

FIG. 1 shows a first embodiment of a physical quantity detecting apparatus according to the present invention which is applied to a torque detecting apparatus, and FIG. 21 shows the algorithm thereof.

The torque detecting apparatus in this embodiment detects a magnetostriction produced in a torque transmitting shaft 10 by using a magnetic sensor 12 opposed to the torque transmitting shaft 10 with a space therebetween.

Figure 6:
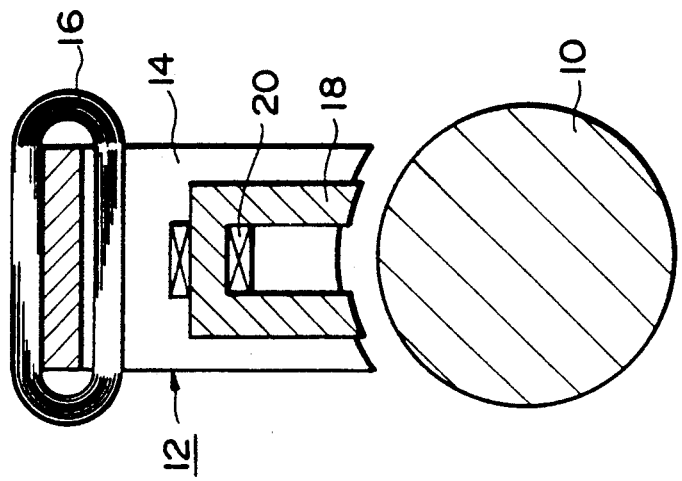
FIGS. 5 and 6 are schematic explanatory views of a magnetic sensor used for the torque detecting apparatuses shown in FIGS. 1 to 4.
Figure 5:
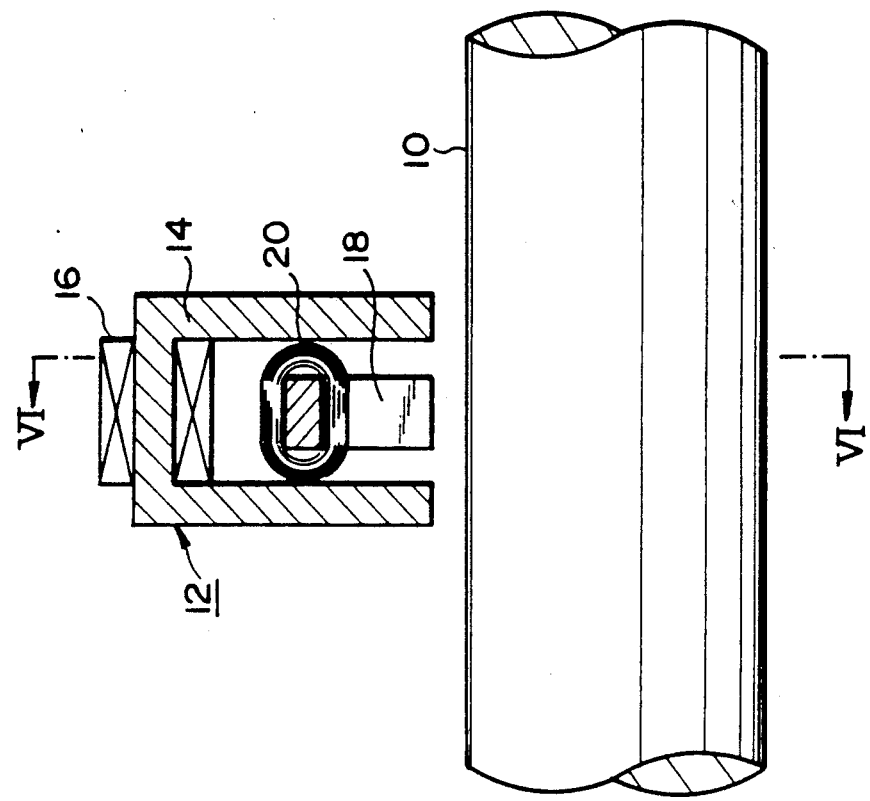
Figure 8:
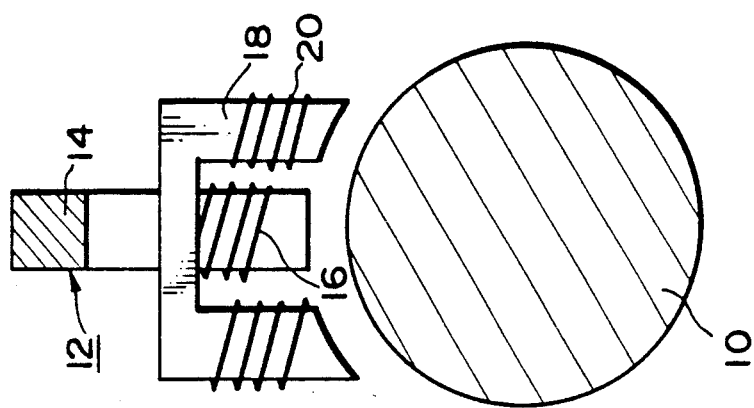
FIGS. 7 and 8 are schematic explanatory views of a magnetic sensor used in the related art.
Figure 7:
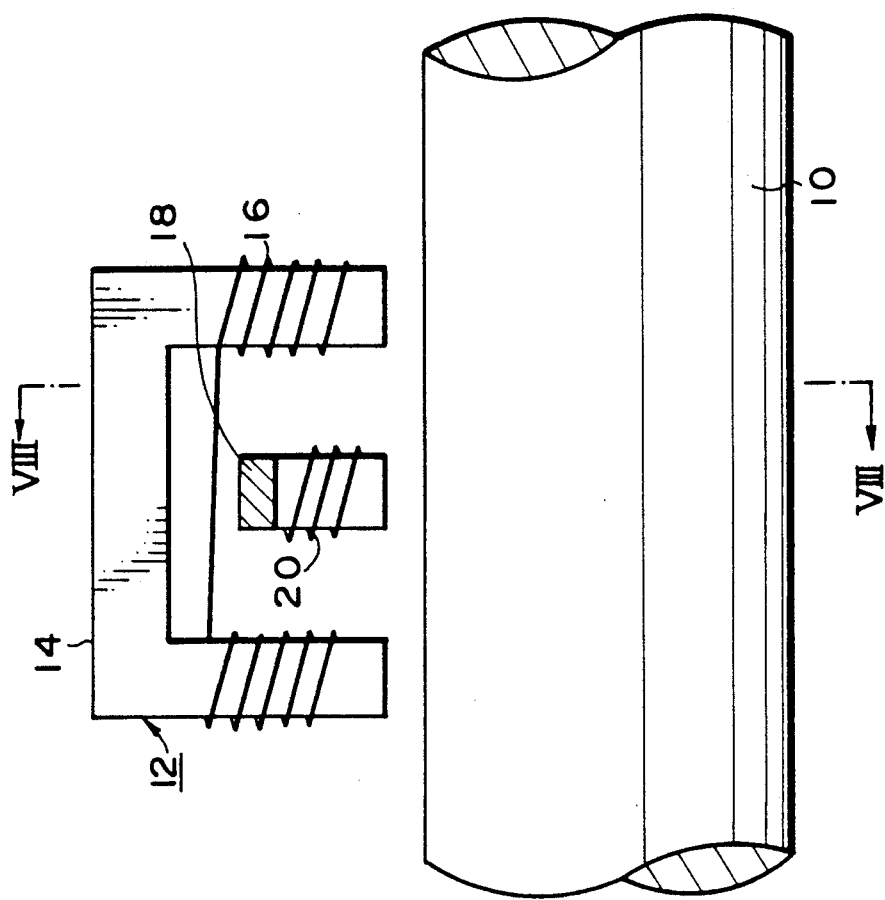

FIGS. 5 and 6 schematically show the magnetic sensor, wherein FIG. 5 is a side elevational view thereof and FIG. 6 is a cross sectional view thereof In this embodiment, the magnetic sensor 12 is composed of an excitation core 14 which is disposed in parallel to the torque transmitting shaft 10, and a detection core 18 which is disposed inside the excitation core 14 so as to be orthogonal thereto, with an excitation coil 16 wound around the excitation core 14, and a detection coil 20 wound around the detection core 18.

Figure 9:
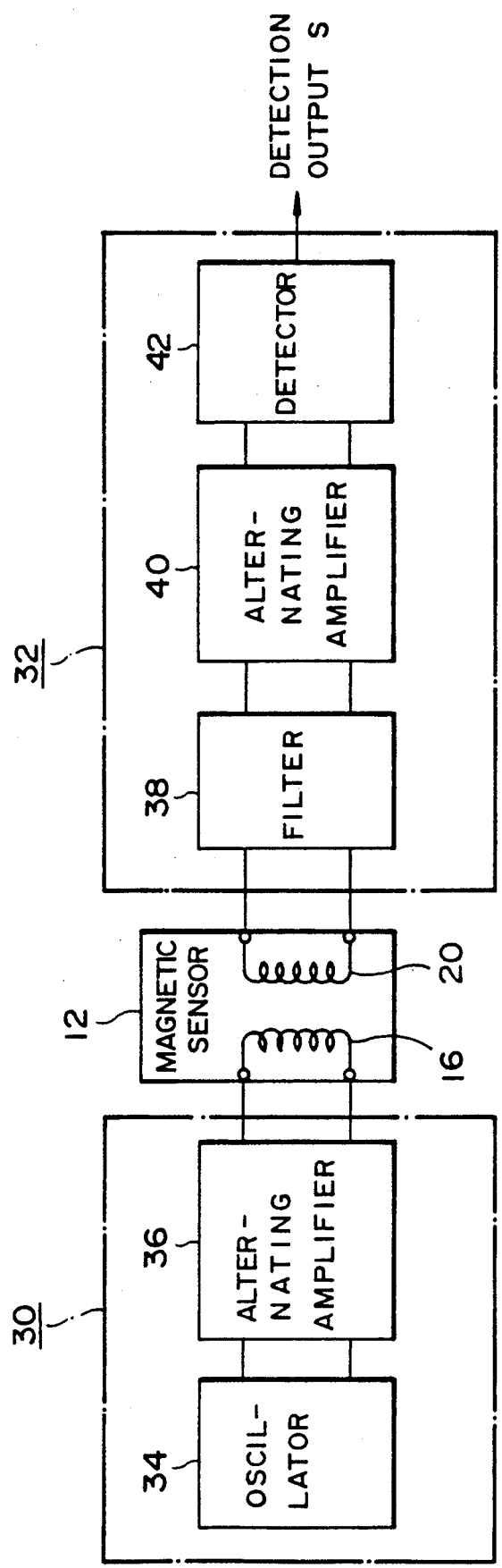
FIG. 9 is a block diagram of a driving circuit and a detection signal processing circuit for a magnetic sensor used for the torque detecting apparatuses shown in FIGS. 1 to 4.
Figure 10:
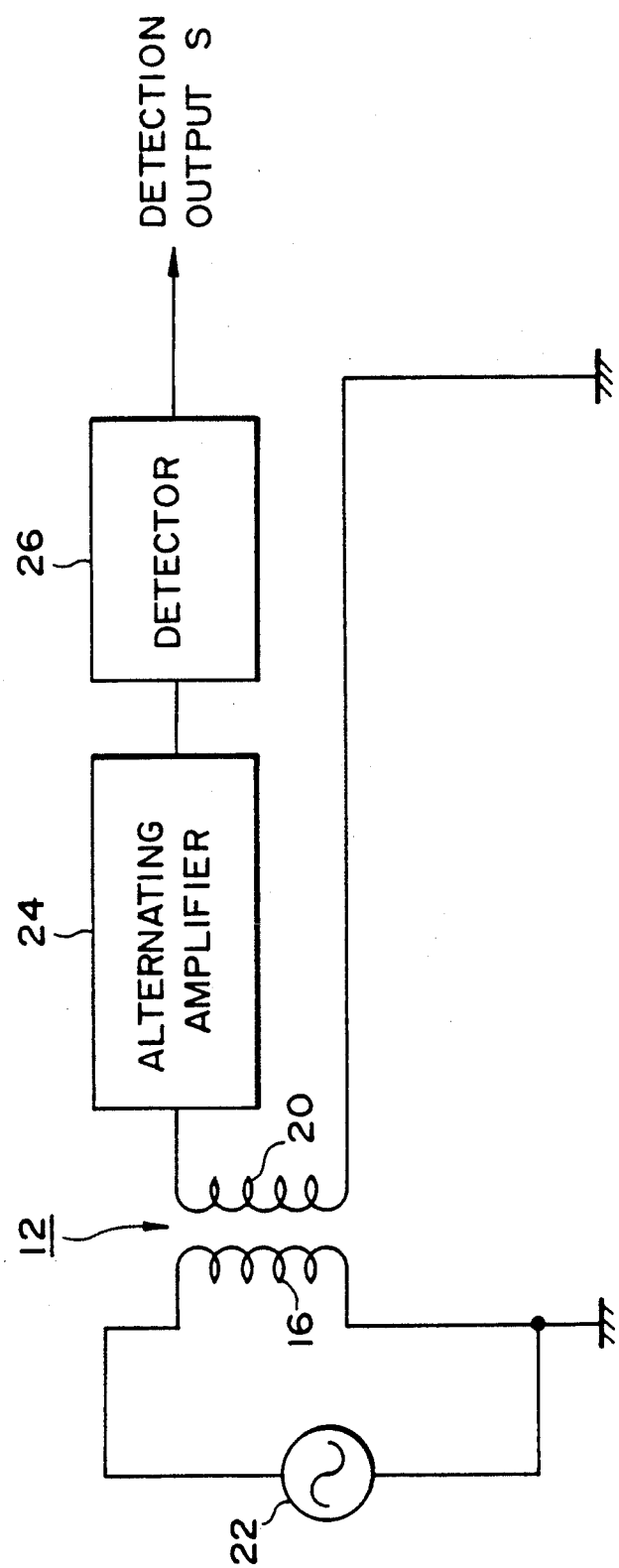
FIG. 10 is a block diagram of a torque detecting apparatus in the related art.

FIG. 9 shows an example of a driving circuit 30 connected to the excitation coil 16 of the magnetic sensor 12 and the detection signal processing circuit 32 connected to the detection coil 20.

The driving circuit 30 includes an oscillator 34 and an alternating amplifier 36, and applies the symmetric AC waveform voltage such as a sine wave or a triangle wave output from the oscillator 34 to the excitation coil 16 through the alternating amplifier 36 so as to alternatingly magnetize the torque transmitting shaft 10.

The detection coil 20 of the magnetic sensor 12 detects as electromotive force the amount of magnetostriction produced in the torque transmitting shaft 10 at the time of applying a torque to the torque transmitting shaft 10, and outputs the detection signal to a detection signal processing circuit 32.

The detection signal processing circuit 32 includes a filter 38, an alternating amplifier 40 and a detector 42, and detects the output voltage of the detection coil 20 so as to output the DC detection signal S as a torque detection signal (analog signal, in this embodiment).

The first feature of the present invention lies in that the fluctuation of the torque detection signal (FIG. 13) with the rotation of the torque transmitting shaft 10, namely, the fluctuation of the torque detecting sensitivity (FIG. 11) and the fluctuation of the offset component (FIG. 12) contained in the torque detection signal S are corrected so as to measure the transmitted torque accurately without being influenced by these fluctuations.

For this purpose, an apparatus of the present invention is provided with a rotational angle detector 50 for detecting the rotational angle of the torque transmitting shaft 10, an offset signal generator 60 in which the offset component contained in the torque detection signal S is set and registered in advance, and a sensitivity signal generator 70 in which the sensitivity of the torque detection signal S is set and registered in advance.

The rotational angle of the torque transmitting shaft 10 is divided into a given number of segments in advance, and the rotational angle detector 50 outputs the detected rotational angle $\theta$ as the detection signal P' for the corresponding segment.

In this embodiment, the rotational angle detector 50 includes an angle detecting portion 52 for detecting the rotational angle of the torque transmitting shaft 10 and a segment detector 54 for separating the rotational angle $\theta$ of the torque transmitting shaft 10 into a given number of segments in advance and outputting the detected rotational angle $\theta$ as the detection signal P' for the corresponding segment.

The angle detecting portion 52 is generally so composed as to obtain the rotational angle signal $\theta$ by using a rotary encoder. As a rotary encoder, there are a magnetic rotary encoder and an optical rotary encoder. In this embodiment, an optical rotary encoder is attached to the torque transmitting shaft 10 so as to detect the rotational angle signal $\theta$.

The segment detector 54 divides the rotational angle of the torque transmission shaft 10 into 360 segments, and outputs the segment detection signal P' on the basis of the detected rotational angle.

In the offset signal generator 60, an offset signal contained in the torque detection signal which is output from the detection signal processing circuit 32 in dependence on the detected rotational angle $\theta$ of the torque transmitting shaft 10 is preset for each segment. In this embodiment, the rotational angle of 360° is divided into 360 segments with one segment allotted to 1°. Therefore, 360 offset signals Offs(P'') are registered in the correspondence with the respective segments P''.

Similarly, in the sensitivity signal generator 70, a signal corresponding to the sensitivity of the sensor 12 which is dependent upon the rotational angle $\theta$ of the torque transmitting shaft 10 is set and registered for each segment. 360 sensitivities Sens(P'') are set and registered in advance in correspondence with the respective segments P''.

A correction operation circuit 80 reads the offset signal Offs(P'') and the sensitivity Sens(P'') for the corresponding segment from the offset signal generator 60 and the sensitivity signal generator 70 on the basis of the segment detection signal P' which is output from the rotational angle detector 50. The offset signal and the sensitivity read out in this way are substituted into the equation (4) together with the torque detection signal S so as to correct the offset component and the sensitivity and output the calculated transmitted torque Tq.

The offset signal and the sensitivity shown in the equation (4) are apt to be influenced by temperature, so that the measuring accuracy thereof varies under the condition in which the temperature varies.

The second feature of the present invention lies in that a transmitted torque is measured more accurately without being influenced by change of temperature.

For this purpose, a torque detecting apparatus according to this embodiment is provided with a temperature detector 90 for detecting the temperature of the torque detecting apparatus, a temperature correction offset coefficient signal generator 62 in which a coefficient of a temperature dependence function of an offset signal is preset, and a temperature correction sensitivity coefficient signal generator 72 in which a coefficient of a temperature dependence function of a sensitivity is preset.

The temperature detector 90 detects the temperature of the position suitable for correction operation. As a position the temperature of which is detected, the portion which exerts the greatest influence on the torque detection output characteristic is generally preferable, for example, a sensor and the torque transmitting shaft 10. In this embodiment, the temperature of the magnetic sensor 12 is detected.

The temperature detector 90 may be composed of a thermocouple, an infrared sensor or the like. Generally, if the object of measurement is a static object, a thermocouple is used, while an infrared sensor is used for a rotor such as the torque transmitting shaft 10. In this embodiment, a thermocouple is used for detecting the temperature of the magnetic sensor 12.

In the apparatus of this embodiment, it is assumed that the sensitivity and the offset output vary with respect to temperature simple-functionally, and the functions shown in the equations (11) and (12) are used as the temperature dependence functions.

In the temperature correction offset coefficient signal generator 62, the coefficients $a_2$ and $b_2$ of the offset signal temperature dependence function shown in the equation (12) are set and registered in advance. In the temperature correction sensitivity coefficient signal generator 72, the coefficients $a_1$ and $b_1$ of the sensitivity temperature dependence function shown in the equation (11) are set and registered in advance.

The correction operation circuit 80 in this embodiment reads at every predetermined timing the detected temperature T which is output from the temperature detector 90 and the coefficients which are set and registered in the coefficient signal generators 62 and 72, and calculates the temperature dependence functions shown by the equations (12) and (11).

The offset signal and the sensitivity which are read out of the offset signal generator 60 and the sensitivity signal generator 70, respectively, the temperature dependence functions which are obtained by the calculation and the torque detection signal S output from the detection signal processing circuit 32 are substituted into the equation (8) to calculate and output the transmitted torque Tq.

In this way, the fluctuation of the offset output and the fluctuation of the sensitivity depending on the rotational position P of the torque transmitting shaft 10 and the fluctuations of the offset output and the sensitivity depending on the temperature T are simultaneously corrected, thereby enabling the measurement of a transmitted torque at a very high accuracy.

The correction operation circuit 80 includes a calculator 82, a first timing signal generator 84 and a second timing signal generator 86.

The first timing signal generator 84 is operated at a predetermined time interval $\Delta t$ in synchronization with the torque detecting timing. The segment detection signal P' output from the rotational angle detector 50 is output to the offset signal generator 60 and the sensitivity signal generator 70 as a reading address, and these generators 60 and 70 output the offset signal Offs(P'') and the sensitivity Sens(P'') for the corresponding segment P'' to the calculator 82.

The second timing signal generator 86 outputs a timing signal to the temperature detector 90 and the coefficient signal generators 62 and 72 at every predetermined lapse of time. The temperature detector 90 outputs the detected temperature T to the calculator 82 and the coefficient signal generators 62 and 72 output the preset coefficients to the calculator 82.

The calculator 82 calculates the transmitted torque Tq on the basis of the equation (8) by using the signals input in this way and the torque detection signal S output from the detection signal processing circuit 32.

In this way, according to the torque detecting apparatus of this embodiment, it is possible to simultaneously correct the fluctuations of the offset output and the sensitivity depending on the rotation of the torque transmitting shaft 10 and the fluctuations of the offset output and the sensitivity depending on the temperature at real time, thereby enabling the detection of the transmitted torque with high accuracy.

Although the first timing signal generator 84 and the second timing signal generator 86 may be operated separately from each other, the timing generators 84, 86 in this embodiment are so composed to simultaneously operate in synchronization with each other. The first timing signal generator 84 is so designed as to read the offset signal and the sensitivity signal which correspond to the segment detection signal P' from the offset signal generator 60 and the sensitivity signal generator 70, respectively, and output them to the calculator 82 at a time interval of Δt. The second timing signal generator 86 is so designed as to drive the temperature detector 90 so as to output the detected temperature T and drive both coefficient signal generators 62 and 72 so as to output the corresponding coefficients to the calculator 82 at a time interval of Δt in synchronization with the operation of the first timing signal generator 84.

The calculator 82 corrects the torque detection signal S output from the detection signal processing circuit 32 on the basis of the equation (8) by using the signals input at every time interval of Δt and outputs the calculated transmitted torque Tq.

That is, if correction operation is processed and the transmitted torque Tq is output at a time $t_0$, a similar correction operation is repeated thereafter at times $t_0+\Delta t$, $t_0+2\Delta t$, $t_0+3\Delta t$ ... $t_0+100\Delta t$, ... so as to calculate and output the transmitted torque Tq.

In this way, according to the torque detecting apparatus of this embodiment, the sampling time Δt is not determined by the rotational position P of the torque transmitting shaft 10, but the offset signal generator 60, the sensitivity signal generator 70, the temperature correction coefficient signal generators 62, 72, and the temperature detector 90 are operated at a predetermined sampling time Δt. Consequently, the sampling time Δt does not depend on a change in the rotational speed such as a change from the suspension of the torque transmitting shaft 10 to a high-speed rotation, thereby enabling stable and accurate calculation of the momentary torque value.

In the apparatus of this embodiment, analog correction operation is processed on the basis of the equation (8).

In the case of analog processing of correction operation, it is preferable that each of the offset signal generator 60 and the sensitivity signal generator 70 is composed of a voltage generator which outputs the offset signal or the sensitivity signal for the corresponding segment as a voltage signal and that the offset signal generator 60 and the sensitivity signal generator 70 output the offset signal and the sensitivity signal, respectively, for the corresponding segment as analog voltages on the basis of the segment detection signal P' which is output from the first timing signal generator 84 at a predetermined timing.

In this case, it is preferable that each of the temperature correction offset coefficient signal generator 62 and the temperature correction sensitivity coefficient signal generator 72 is also composed of a voltage generator such that they output the offset coefficient signal and the sensitivity coefficient signal as analog voltages on the basis of the timing signal output from the second timing signal generator 86.

Second Embodiment

A second embodiment of the present invention will be explained with reference to FIG. 2. The same reference numerals are provided for the elements which are the same as those in the first embodiment, and explanation thereof will be omitted.

The torque detecting apparatus of this embodiment is characterized in that the torque detection signal S is corrected by digital processing in the correction operation circuit 80.

For this purpose, the torque detecting apparatus of this embodiment is provided with A/D converters 44 and 92 which convert the torque detection signal S output from the detection signal processing circuit 32 and the detected temperature signal T output from the temperature detector 90, respectively, into digital signals and output the digital signals to the calculator 82.

The timing for the converting operation of the A/D converter 44 is synchronous with the operation timing of the first timing signal generator 84 and the timing for the converting operation of the A/D converter 92 is synchronous with the operation timing of the timing signal output from the second timing generator 86.

The offset signal generator 60 and the sensitivity signal generator 70 are composed of memories in which the corresponding offset signal and the sensitivity signal are stored as digital signals in advance. The temperature correction offset coefficient signal generator 62 and the temperature correction sensitivity coefficient signal generator 72 are also composed of memories in which the corresponding offset coefficient signal and the sensitivity coefficient signal are stored as digital signals in advance.

In the case of digital processing of correction operation at real time, it is necessary that the throughput rate determined by the operation time of the A/D converters 44, 92 and the calculator 82 is smaller than the required output time interval. Consequently, it is necessary to pipeline the A/D converters 44, 92, the calculator 82 and a sample holder, if necessary. It is also important that the calculator 82 is composed of a multiplier, an arithmetic logic processor, a multiply accumulator, etc., exclusively for the respective purposes so as to increase the operation speed.

In this embodiment, the correction operation circuit 80 is composed of a microcomputer. As a correction operation microcomputer, either a general purpose microcomputer or a special purpose IC (ASIC, custom IC) may be used. Alternatively, a DSP (digital signal processor) which is an intermediate between the above-described two microcomputers may be used. A DSP is an IC which is widely used in the field of communication and the acoustic field, and is characterized by high-speed multiply accumulate operations.

The first timing signal generator 84 drives the A/D converter 44 at every predetermined time interval Δt so as to convert the torque detection signal S output from the detection signal processing circuit 32 into a digital signal and output the digital signal to the calculator 82. Simultaneously, the first timing signal generator 84 drives the offset signal generator 60 and the sensitivity signal generator 70 so as to output the offset signal and the sensitivity signal corresponding to the segment detection signal P' to the calculator 82.

The second timing signal generator 86 drives the the A/D converter 92 at a predetermined time interval $\Delta t$ in synchronization with the timing signal generator 84 so as to convert the detected temperature signal T into a digital signal and output the digital signal to the calculator 82. Simultaneously, the second timing signal generator 86 drives the coefficient signal generators 62 and 72 so as to output the corresponding coefficients of the temperature dependence functions to the calculator 82.

The calculator 82 processes the correction operation represented by the equation (8) by using the signals input in the above-described way, and outputs the transmitted torque Tq.

In this way, according to the present invention, it is possible to correct the torque detection signal S input at a time interval of $\Delta t$ by digital processing and to output the calculated transmitted torque Tq at real time in the same way as in the first embodiment.

Examples of the torque detecting apparatuses of this embodiment which adopt a general purpose microcomputer or a DSP as the correction operation circuit 80 will be explained, respectively, hereinunder.

FIRST EXAMPLE

Figure 3:
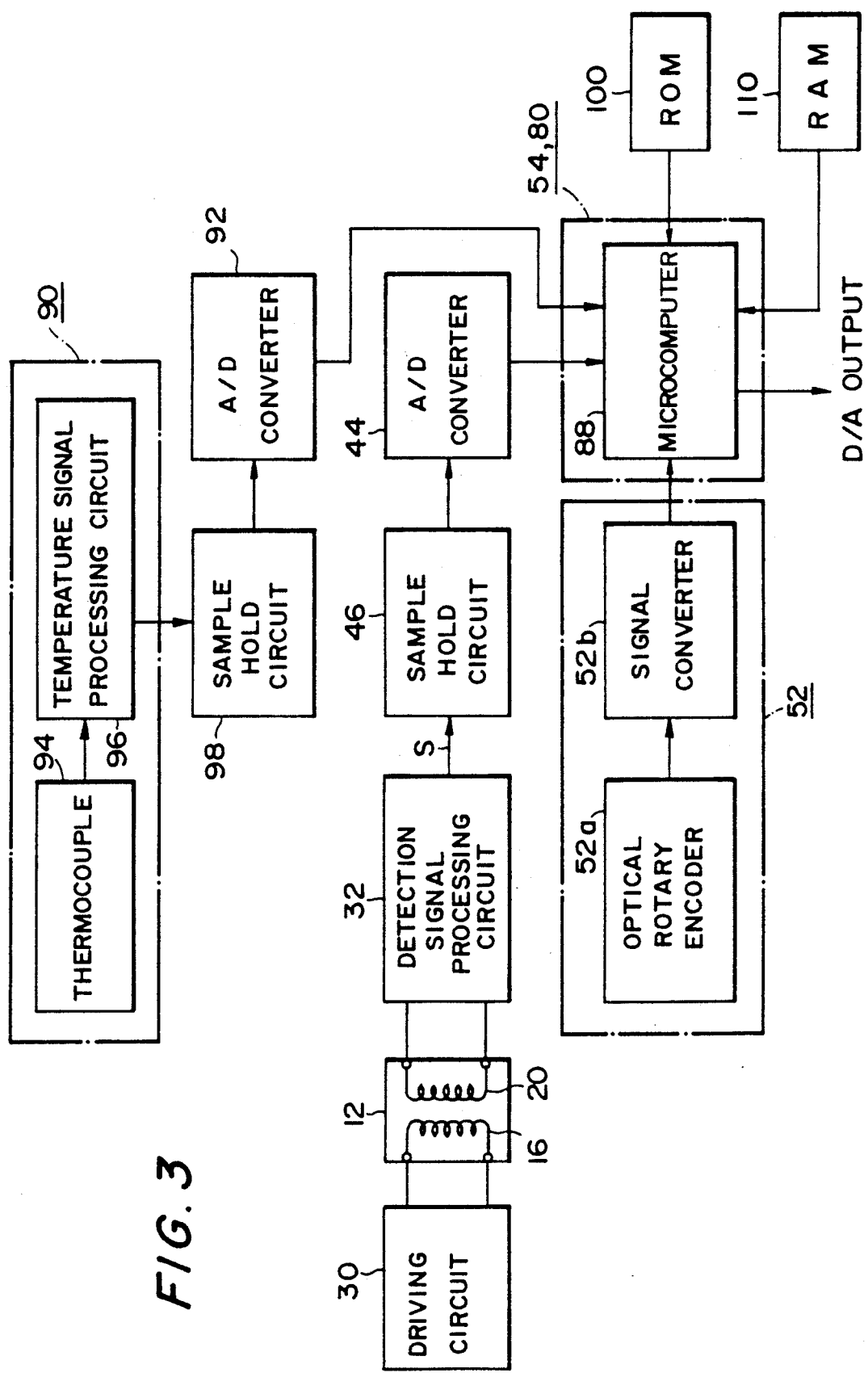
FIGS. 3 and 4 are block diagrams of torque detecting apparatuses according to the present invention in which the correction operation circuit is composed of a microcomputer and a DSP, respectively.

FIG. 3 shows an example of a detecting apparatus which adopts a microcomputer 88 as the correction operation circuit 80.

The apparatus includes a ROM 100 and a RAM 110. The ROM 100 is provided with a microcomputer driving program which is so designed as to operate the microcomputer 88 as both the correction operation circuit 80 and the segment detector 54. In the ROM 100, the coefficients A, B in the correction operation expression represented by the equation (8) are set in correspondence with each segment, and the coefficients $a_1$, $b_1$, $a_2$ and $b_2$ shown in the equations (11) and (12) are further set and registered.

Figure 2B:
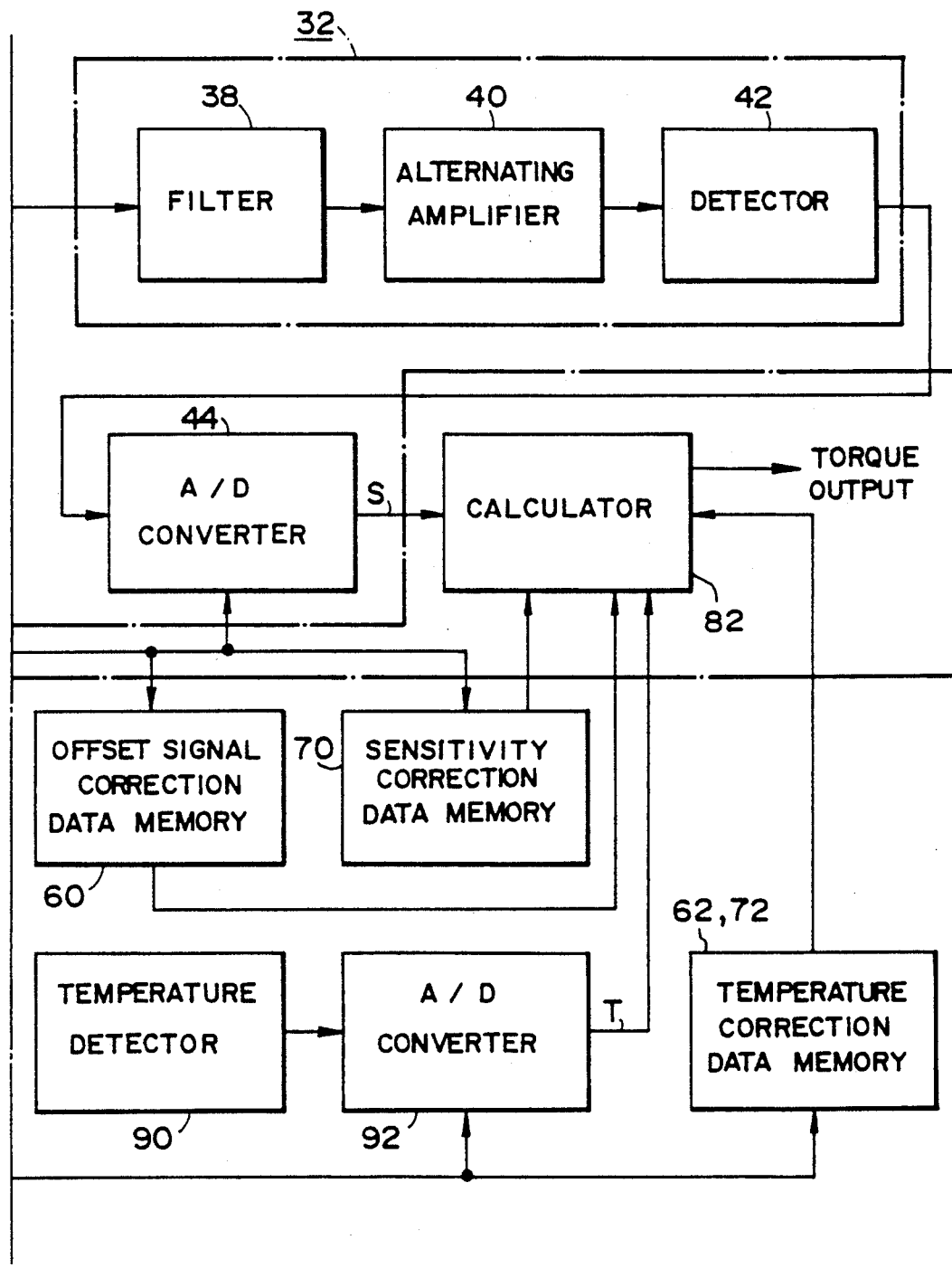

That is, the ROM 100 functions as the offset signal generator 60, the sensitivity signal generator 70, the temperature correction offset coefficient signal generator 62 and the temperature correction sensitivity coefficient signal generator 72 in the apparatus shown in FIG. 2.

In this embodiment, since correction operation is processed at a resolution of one degree of the rotational angle of the torque transmitting shaft 10, the number of the coefficients A is 360 and the number of the coefficients B is also 360. These coefficients A, B are set and registered in the ROM 100 as the coefficient tables corresponding to the respective segments.

In this example, the torque detection signal S output from the detection signal processing circuit 32 is input to the microcomputer 88 through a sample hold circuit 46 and the A/D converter 44.

The temperature detector 90 includes a thermocouple 94 and a temperature signal processing circuit 96 so as to detect the temperature of the magnetic sensor 12. The detected temperature T which is output from the temperature signal processing circuit 96 is input to the microcomputer 88 through a sample hold circuit 98 and the A/D converter 92.

The angle detecting portion 52 includes an optical rotary encoder 52a provided on the torque transmitting shaft 10 and a signal converter 52b for outputting the output detected by the rotary encoder 52a as an angle signal $\theta$. The microcomputer 88 also functions as the segment detector 54 for converting the detected angle $\theta$ into the corresponding segment detection signal P'.

FIG. 21 shows the correction operation algorithm executed by the microcomputer 88. The microcomputer in this example repeats the correction operation represented by the equation (8) at a predetermined sampling time interval $\Delta t$ and outputs the transmitted torque Tq at real time.

The correction operation algorithm will now be explained with reference to FIG. 21.

The microcomputer 88 first fetches the torque detection signal S, the detected angle signal $\theta$ and the detected temperature signal T (step $S_1$). The detected angle $\theta$ is converted to the corresponding segment detection signal P' (step $S_2$).

In order to correct the fluctuation of the detected output depending on the location of measurement, the microcomputer 88 reads the correction coefficients A, B corresponding to the input segment detection signal P' from the ROM 100 (step $S_3$).

The torque detection signal S is multiplied by the coefficient B (step $S_4$) and the value obtained is stored in the RAM 110 (step $S_5$). The coefficient A read from the ROM 100 is also stored in the RAM 110 (step $S_6$).

The fluctuation of the torque detection signal S depending on the temperature T of the detecting apparatus is then corrected.

The correcting operation is carried out by using the temperature T output from the temperature detector 90. In this example, it is assumed that the sensitivity and offset outputs vary simple-functionally with respect to the temperature T. In this case, the temperature dependence functions $f_1(T)$ and $f_2(T)$ are represented as follows, as described above:

$$f_1(T) = a_1 + b_1 \cdot T \ldots \quad (11)$$

$$f_2(T) = a_2 + b_2 \cdot T \ldots \quad (12)$$

The microcomputer 88 reads the coefficients $a_1$, $b_1$, $a_2$ and $b_2$ of the temperature dependence functions from the ROM 100 and calculates $f_1(T)$ and $f_2(T)$ on the basis of the equations (11) and (12) by using the detected temperature T and the thus-read coefficients (steps $S_7$, $S_8$).

The value S·B written in the RAM 110 at the step $S_5$ is read out and multiplied by $1/f_1(T)$ (step $S_9$).

The coefficient A written in the RAM 110 at the step $S_6$ is read out and multiplied by $f_2(T)/f_1(T)$ (step $S_{10}$).

The values obtained at the steps $S_9$ and $S_{10}$ are added, thereby completing the correction operation represented by the equation (8) and obtaining the transmitted torque Tq (step $S_{11}$). The thus-obtained transmitted torque Tq is output (step $S_{12}$).

In this way, it is possible to simultaneously process the correction operation with respect to the rotational angle P and the temperature T of the torque transmitting shaft 10 and to obtain the transmitted torque Tq with high accuracy.

As described above, the torque detecting apparatus repeats the correction operation shown in FIG. 21 at a time interval of $\Delta t$. The sampling time $\Delta t$ is not determined by the rotational angle of the torque transmitting shaft 10 but is predetermined The operations of the sample hold circuits 46, 98, the A/D converters 44, 92, the segment detector 54 and the microcomputer 88 are processed within the sampling time $\Delta t$. That is, the sampling time $\Delta t$ is therefore not dependent on a change of rotational speed such as a change from the no rotation to the rotation of the torque transmitting shaft 10, thereby enabling stable and accurate detection of a momentary torque.

In order to control each element within the predetermined sampling time $\Delta t$, it is preferable to use the timing signal generators 84, 86 as in the first and second embodiments. In this example, however, timing signals which are output after the analog-digital conversion by the A/D converters 92, 44 are used themselves as timers. This is because the time required for analog-digital conversion is the longest in the correction operation, and the processing time therefore determines the sampling time $\Delta t$.

Alternatively, the timer function of the microcomputer 88 may be used as the timer function for obtaining the sampling time $\Delta t$, or the time necessary for executing one loop of a predetermined routine is used as the sampling time $\Delta t$.

Figures 17, 18:
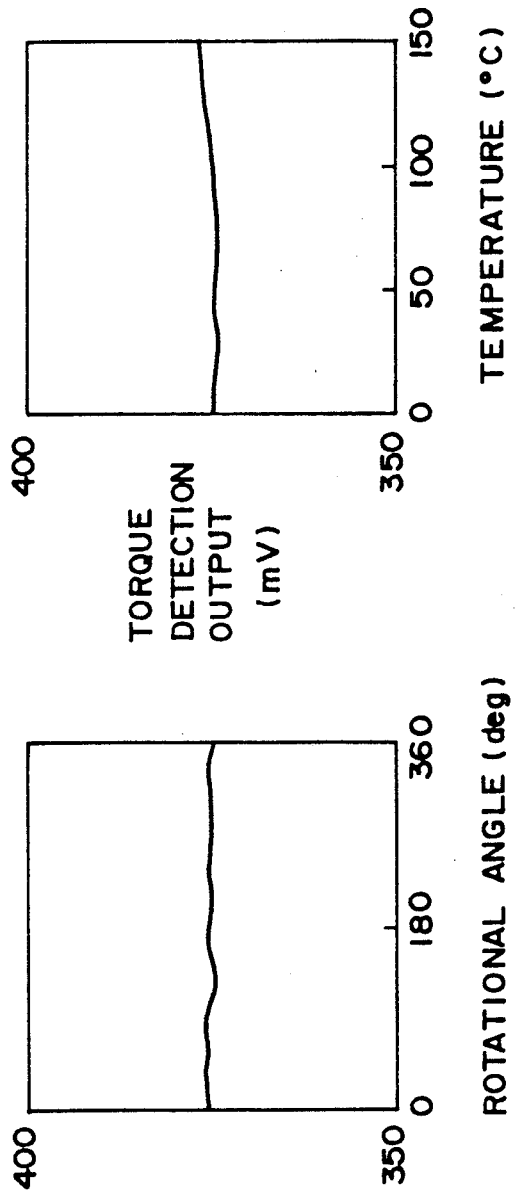
FIG. 17 is a characteristic curve of the torque detected when the position correction operation is processed by using an apparatus according to the present invention.
FIG. 18 is a characteristic curve of the torque detected when the temperature correction operation is processed by using an apparatus according to the present invention.

FIGS. 17 and 18 show the experimental data of the torque detecting apparatus of the present invention.

It has been confirmed that it is possible to obtain a detection signal having a flat characteristic, as shown in FIG. 17 by processing correction operation for each segment by using the apparatus of the present invention even when the torque detection signal S output from the detection signal processing circuit 32 during the rotation of the rotary magnetic material greatly fluctuates in spite of a constant transmitted torque of the torque transmitting shaft 10, as shown in FIG. 13.

It has also been confirmed that it is possible to obtain a detection signal having a flat characteristic, as shown in FIG. 18 by processing correction operation in correspondence with a change in the temperature by using the apparatus of the present invention even when the torque detection signal S greatly fluctuates with change of temperature, as shown in FIG. 16.

From these data it will be understood that the apparatus of the present invention is capable of simultaneously correcting the fluctuations of the offset output and the sensitivity depending on the rotational position of the torque transmitting shaft 10 and the fluctuations of the offset output and the sensitivity depending on the temperature, thereby enabling the detection of a momentary transmitted torque with high accuracy at real time in a wide range from the no rotation to a high-speed rotation of the object of measurement, and from a low temperature to a high temperature.

SECOND EXAMPLE

Figure 4:
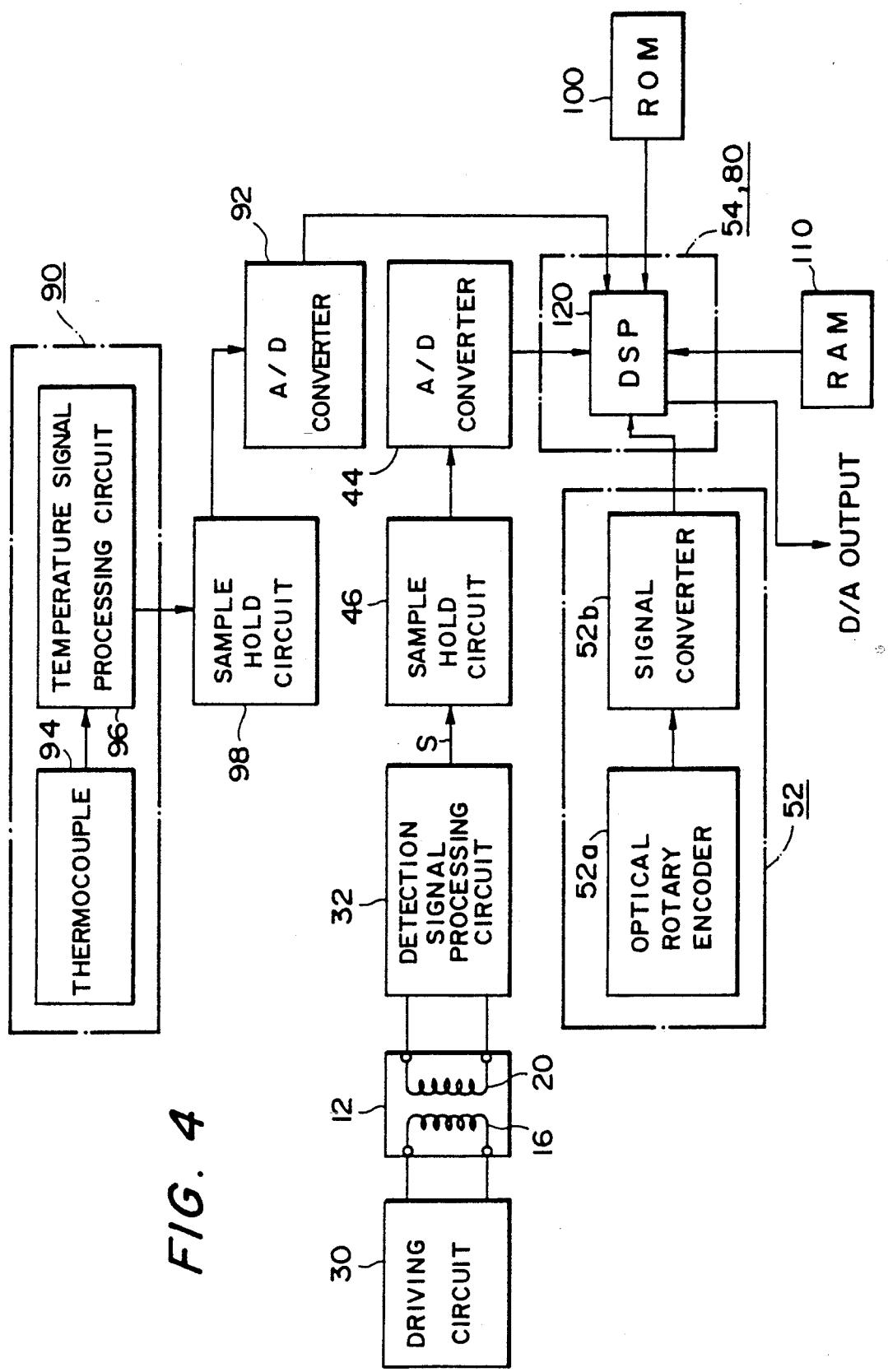

FIG. 4 shows an example of a torque detecting apparatus which adopts a DSP (digital signal processor) 120 as a microcomputer constituting the correction operation circuit 80.

Since the structure of this apparatus is the same as in the first example except for the DSP, the same reference numerals are provided for the elements which are the same as those in the first example, and explanation thereof will be omitted.

Since the DSP 120 has a high processing speed and can execute, especially, multiply/accumulate operations at a high speed, it is possible to further add a high-degree digital signal processing to the correction operation executed in the first example.

The high-degree digital signal processing generally means FFT (fast Fourier transform), digital filter, etc. A higher learning function may be incorporated into the DSP 120 so as to enable more intelligent processing. In this example, averaging processing is adopted as the digital signal processing.

The concept of general averaging processing will first be explained.

It is now assumed that at a certain time $t_0$, the sensor detection signal is $S_{t0}$, the rotational angle signal is $P_{t0}$ and the temperature signal is $T_{t0}$. It is next assumed that at a time $t_0+\Delta t$ after the elapse of time $\Delta t$, the sensor detection signal is $S_{t0+\Delta t}$, the rotational angle signal is $P_{t0+\Delta t}$ and the temperature signal is $T_{t0+\Delta t}$. Similarly, it is assumed that at a time $t_0+2\Delta t$, the sensor detection signal is $S_{t0+2\Delta t}$, the rotational angle signal is $P_{t0+2\Delta t}$ and the temperature signal is $T_{t0+2\Delta t}$, ... and at a time $t_0+24\Delta t$, the sensor detection signal is $S_{t0+24\Delta t}$, the rotational angle signal is $P_{t0+24\Delta t}$ and the temperature signal is $T_{t0+24\Delta t}$. At each of these times, each signal is fetched in the microcomputer and the correction operation is processed on the basis of the correction coefficient corresponding to each rotational angle and the detected temperature. The 25 items of data obtained as a result are written in a memory in the microcomputer in the order of time series. Finally, the averaging operation is processed.

The averaging processing in this example will be explained in detail.

The system adopted in this example is called a pool system. This system will be explained in the following.

It is assumed that at a time $t_0$ the sensor detection signal $S_{t0}$ is fetched in the memory in the DSP 120, correction operation is processed thereafter and the detected torque $S_{t0}$ after the correction operation is stored. It is also assumed that the total sum of 25 detection torque signals obtained during the period from the time $t_0-25\Delta t$ to the time $torque_0 - \Delta t$ is stored in the register of the DSP 120. The register is updated when the detected torque $S'_{t0}$ at the time $t_0$ is added to the total sum stored in the register and the detected torque $S'_{t0-25\Delta t}$ after the correction operation processed at the time $t_0-25\Delta t$ is subtracted from the total sum stored in the register.

As a result, the total sum of the 25 detected torque signals $S'$ after the correction operations processed during the period from the time $t_0$ to the time $t_0-24\Delta t$ is stored in the register. This processing is repeated at the times $t_0+\Delta t$, $t_0+2\Delta t$, $t_0+3\Delta t$, ..., so that the register constantly stores 25 items of data from the current time to the time 24 $\Delta t$ before. By dividing the value in the register by a constant of 25, the average value of 25 items of data is obtained, thereby completing the averaging processing. This system is advantageous in that the number of steps in the program is small and the processing time is short.

This system is represented by the following recursive equation:

$$Y_n = Y_{n-1} + S'_n - S'_{n-25}$$

$$Z_n = Y_n/25$$

wherein $S'_n$: detected torque signal after the correction operation processed at time $t_0$ $S'_{n-25}$: detected torque signal after the correction operation processed at time $(t_0-25\Delta t)$ $Y_n$: total sum of the detected torques after the correction operations processed during the period from the time $(t_0-24\Delta t)$ to the time $t_0$ $Y_{n-1}$ total sum of the detected torques after the correction operations processed during the period from the time $(t_0-25\Delta t)$ to the time $(t_0-\Delta t)$ $Z_n$: average value of the 25 detected torques after the correction operations processed during the period from the time $(t_0-24\Delta t)$ to the time $t_0$ $\Delta t$: sampling time, 40 $\mu$s in this example.

Figure 20:
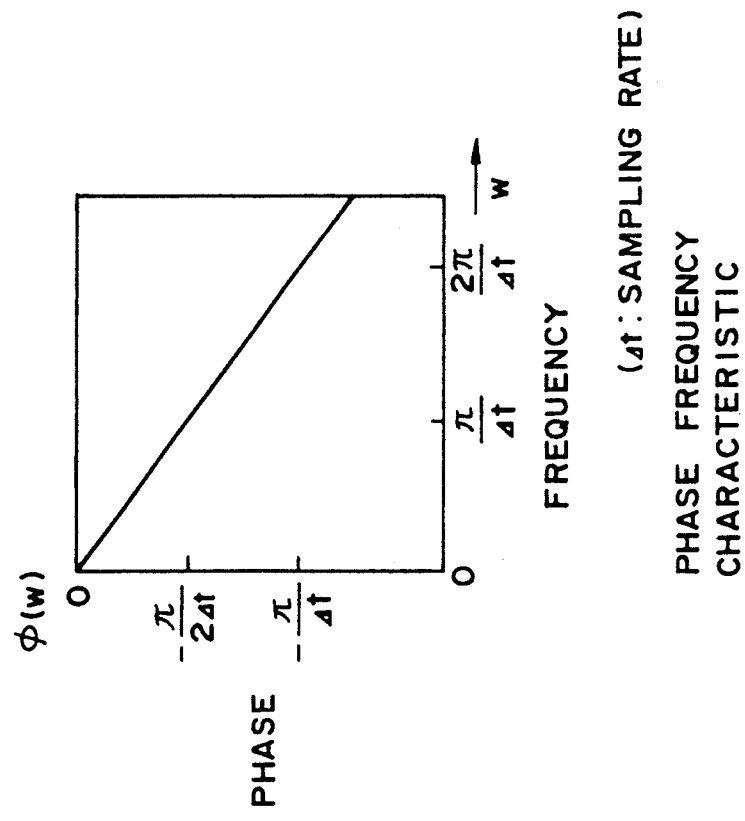
FIG. 20 is an explanatory view of the frequency phase characteristic of averaging processing (digital filter) added to the apparatus shown in FIG. 4.
Figure 19:
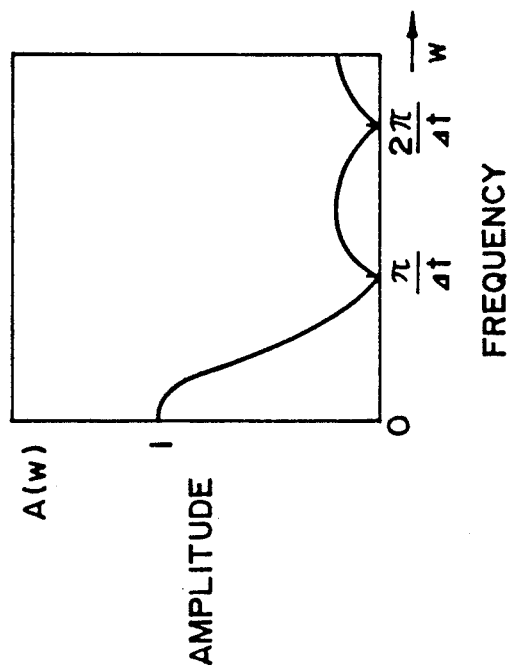
FIG. 19 is an explanatory view of the frequency amplitude characteristic of averaging processing (digital filter) added to the apparatus shown in FIG. 4.

Such averaging processing is regarded as a kind of digital filter. FIGS. 19 and 20 show the frequency characteristics thereof.

Other digital filters (FIR type, IIR type) may naturally be adopted in place of the averaging processing.

When the above-described operations are processed, the response of the torque detecting apparatus as a whole is several ms, which fact shows the effectiveness of use of the DSP.

In these examples, the sensor output from the detection signal processing circuit 32 is corrected with respect to the position and the temperature, but it is also possible to add a linearization correction function.

In the measurement of a torque, a phenomenon frequently observed is that the detected torque output is apt to be saturated on a high torque side. To solve this problem, a linearization correction function may be added by utilizing the microcomputer, thereby improving the linearity. In this case, for example, a correction conversion table may be utilized.

In the above-described embodiments, the torque transmitting shaft which rotates is used as an object of measurement, but the present invention is not restricted thereto and is naturally applicable to a torque transmission body which translationally reciprocates. In this case, the position of reciprocation of the object of measurement is divided into a given number of segments, and the position detecting means outputs the location of measurement of the object as the corresponding segment signal.

In the above-described embodiments, a head type magnetic sensor is used, but it goes without saying that the present invention can adopt an annular magnetic sensor and a physical quantity sensor other than a magnetic sensor.

The present invention is applied to a torque detecting apparatus in the above-described embodiments, but it is obvious that the present invention is not restricted thereto and that when a physical quantity sensor for detecting a physical quantity other than a torque, for example, force, strain, pressure, temperature and reflectivity is used, the influence of the position of the object of measurement and change of temperature is also corrected in the same way.

Correction Coefficient Group Calculation Circuit

For processing such correction operation, it is necessary to calculate the coefficient group in the correction operation expression represented by the equation (8) in advance, and set and register the coefficient group in the offset signal generator 60, the sensitivity signal generator 70, the temperature correction offset coefficient signal generator 62 and the temeperature correction sensitivity coefficient signal generator 72.

Figure 22:
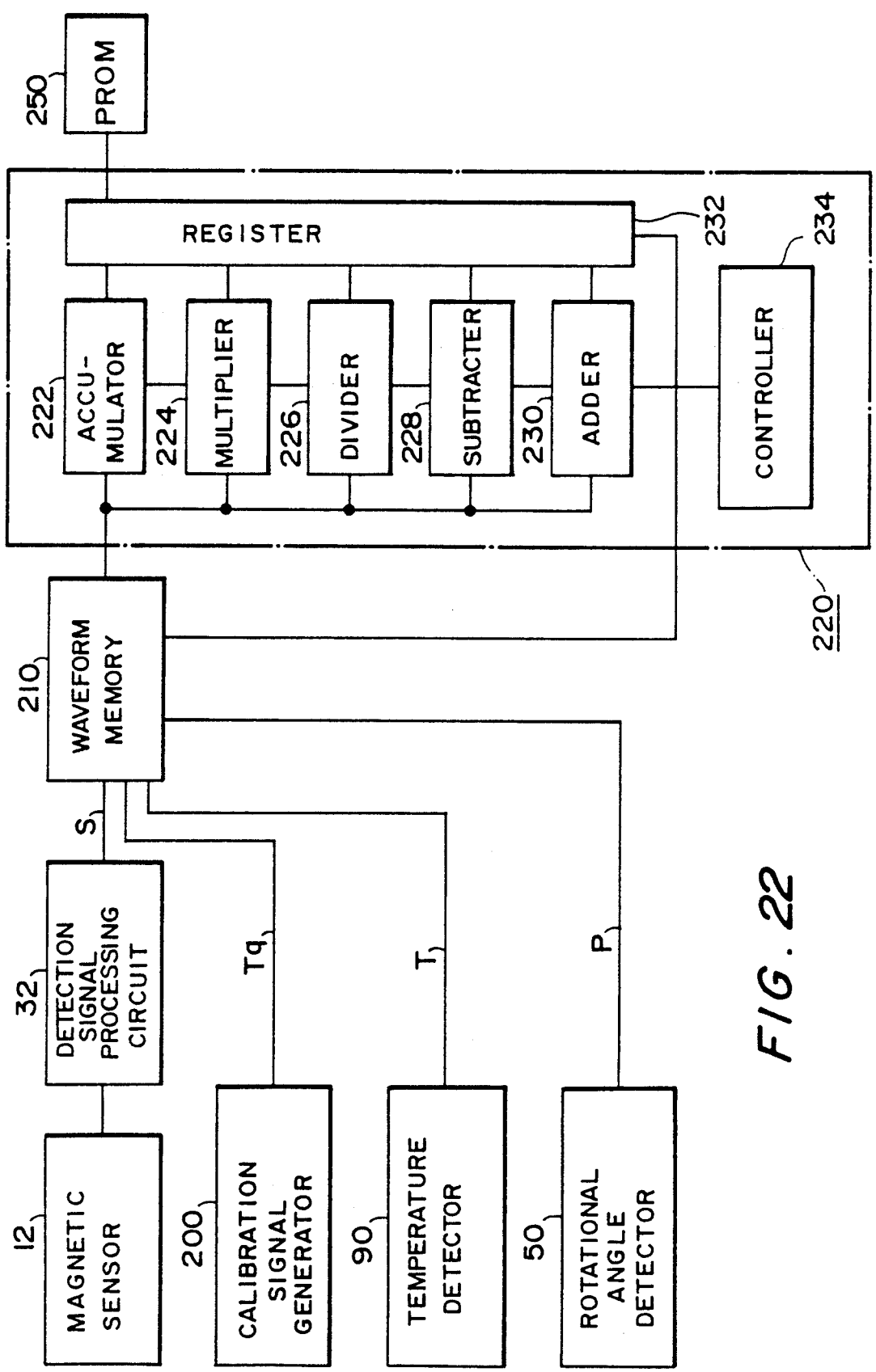
FIG. 22 is a block diagram of an example of a correction coefficient group calculation circuit used in a torque detecting apparatus according to the present invention.

FIG. 22 shows an example of a correction coefficient group calculation circuit for calculating such a coefficient group.

In this example, since the sensor 12, the detection signal processing circuit 32, the rotational angle detector 50 and the temperature detector 90 are the same as in the apparatus shown in FIG. 1, detailed explanation thereof being omitted here.

The correction coefficient group calculation circuit includes the rotational angle detector 50 for outputting the rotational position of the torque transmitting shaft 10 as the corresponding segment detection signal, the temperature detector 90 for detecting the operation temperature T of the detecting apparatus and a calibration signal generator 200 for outputting the physical quantity calibration signal as a calibration signal.

The rotational angle detector 50 and the temperature detector 90 are the same as those shown in FIG. 1, and the signals output therefrom are supplied to a waveform memory 210.

The calibration signal generator 200 outputs the torque Tq actually transmitted through the torque transmitting shaft 10 as a calibration signal for calibrating the output signal S of the magnetic sensor 12. It is necessary that the calibration signal generator 200 outputs a calibration signal having sufficient accuracy and response for calibrating the sensor output S in a torque measuring range from the no rotation to a high-speed rotation of the shaft, and from a low temperature to a high temperature. To this end, a torque meter composed of a strain gauge and a telemeter is used so as to directly measure the torque Tq transmitted through the torque transmitting shaft 10 and output the measured torque as a calibration signal Tq.

The waveform memory 210 converts the torque detection signal S output from the magnetic sensor 12, the calibration signal Tq output from the calibration signal generator 200 and the temperature signal T output from the temperature detector 90 into digital signals and stores these digital signals every time the segment detection signal P' is output from the rotational angle detector 50. In this way, the waveform memory 210 stores the input data (S, Tq, T) synchronously with the segment detection signal P' output from the rotational angle detector 50 without depending on the rotational speed of the torque transmitting shaft 10. In this example, the angle of one revolution is divided into 360 segments. Consequently, when the torque transmitting shaft 10 makes one revolution, 360 data groups (S, Tq, T) are stored.

As described above, the data group represented by the equation (25) is measured l times at different temperatures $T_k$ while using the operation temperature T as a parameter, and the measured data are written into the waveform memory 210 in series. In this way, the data group represented by the equation (36) is stored in the waveform memory 210.

The waveform memory 210 in this example stores the data group input in this way for each segment.

A coefficient calculator 220 calculates the coefficient group of the correction operation expression represented by the equation (4) or (8) for each segment on the basis of the data stored for each segment in the waveform memory 210.

The coefficient calculator 220 in this example includes an accumulator 222, multiplier 224, a divider 226, a subtracter 228, an adder 230, a register 232 and a controller 234. The data read out of the waveform memory 210 is supplied to each of the calculators 222 to 230, wherein predetermined calculation is carried out, and the output of each calculator is written into the register 232.

Figure 24B:
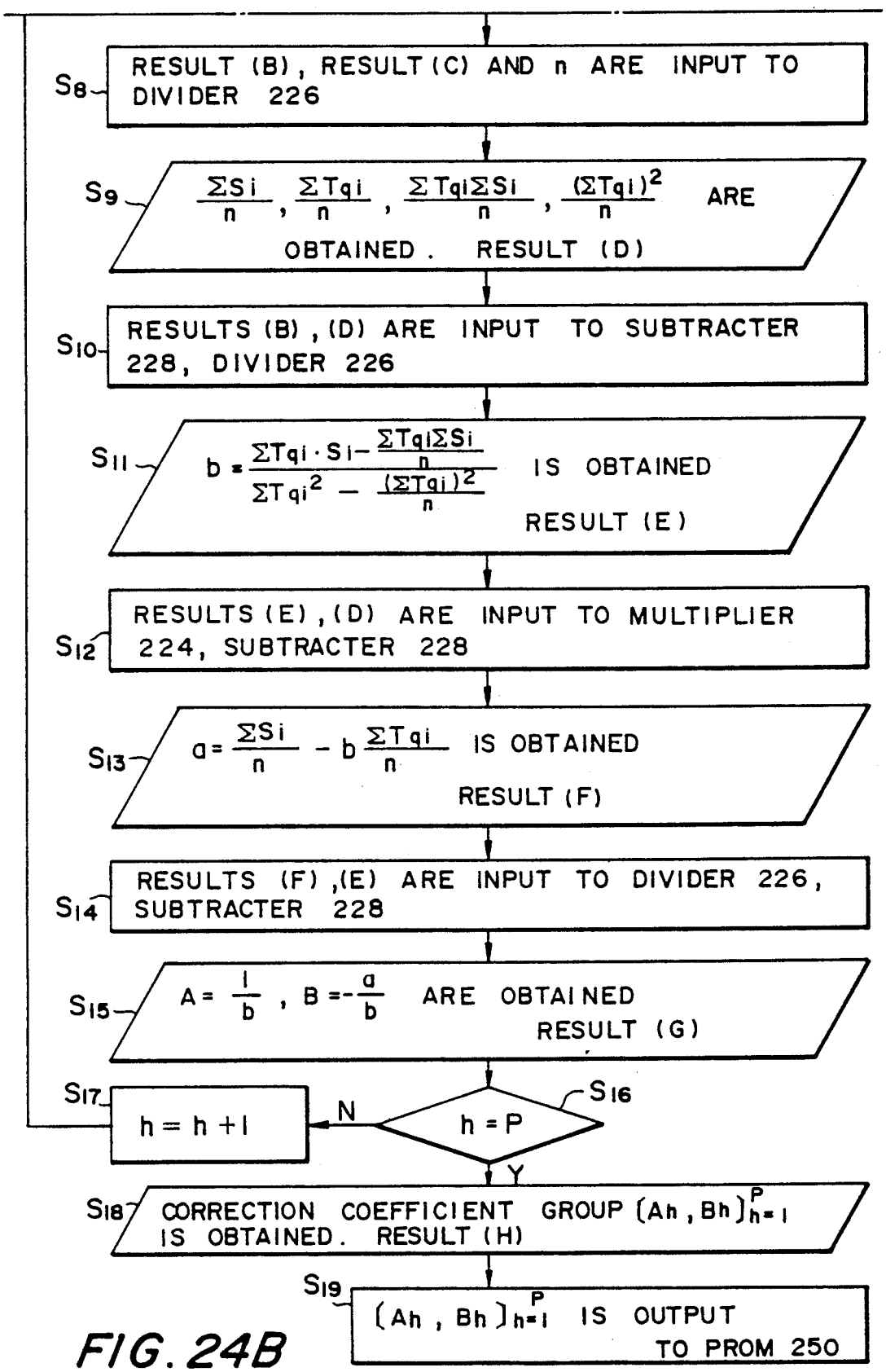
FIG. 24, comprising FIGS. 24A and 24B and FIG. 25, comprising
Figures 25, 25A, 25B:
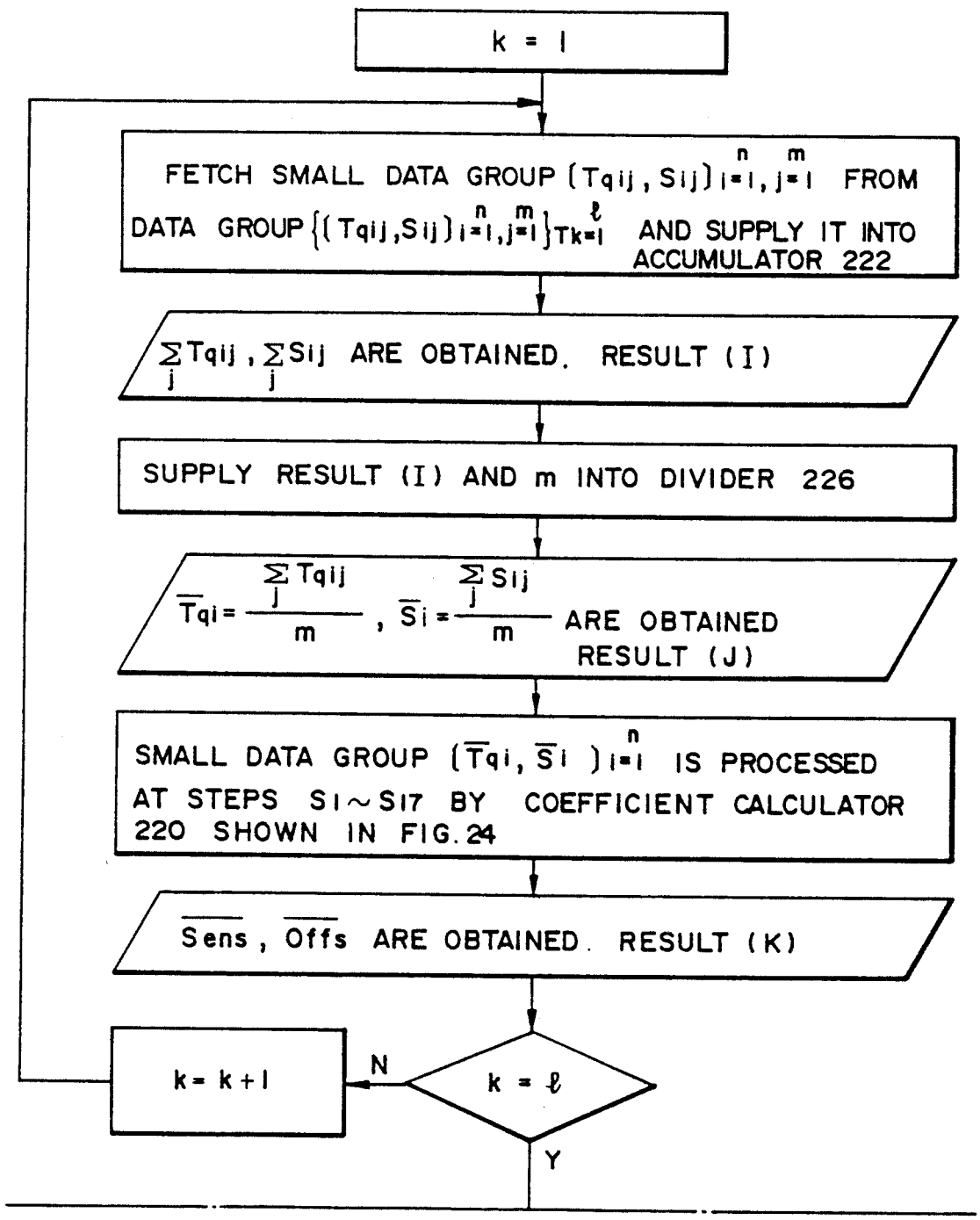
FIGS. 25A and 25B, are flowcharts of the operation of the correction coefficient group calculation circuit shown in FIGS. 22 and 23.
Figure 25B:
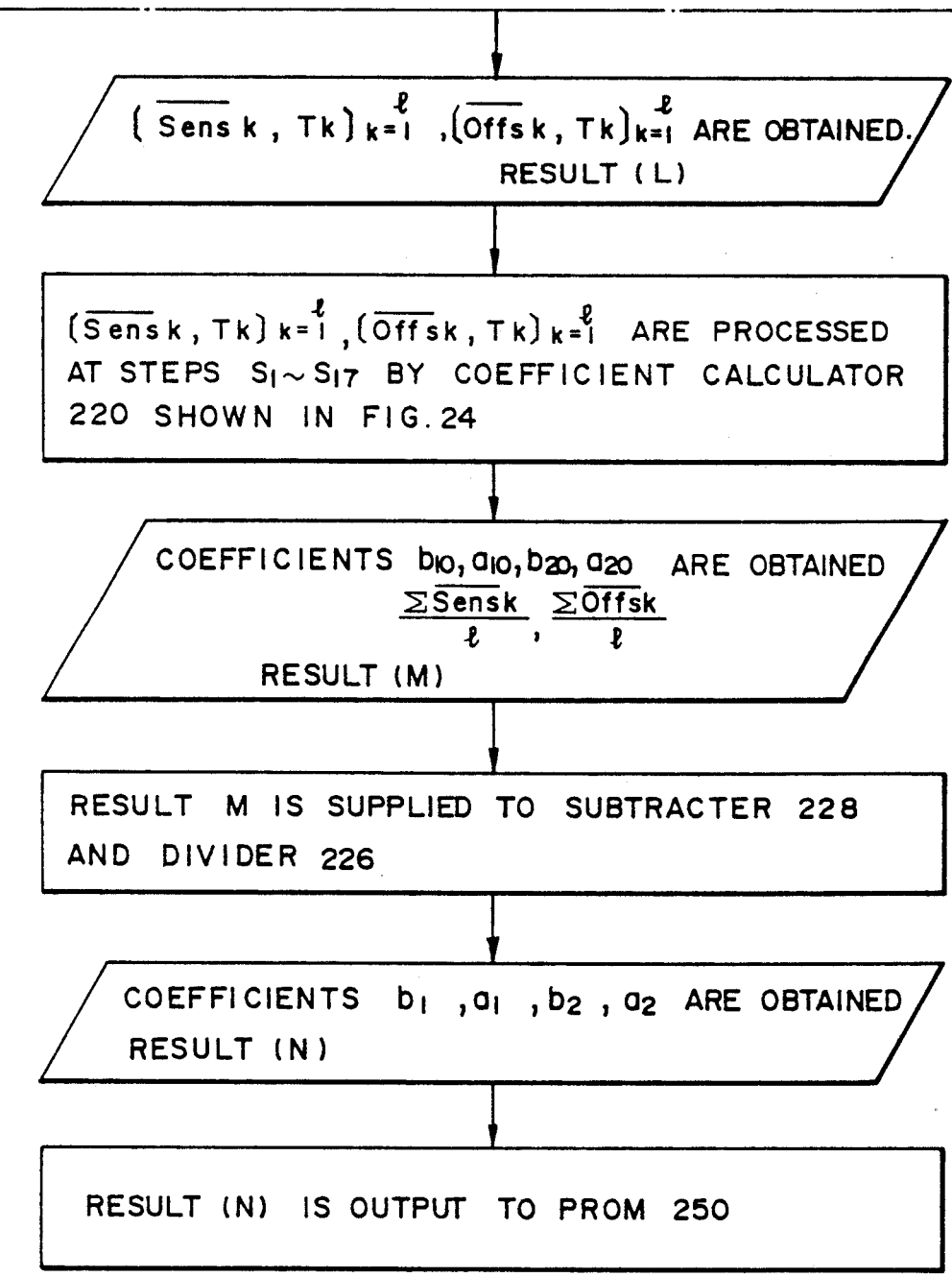

The controller 234 inputs/outputs the data in the register 232 and the data in the waveform memory 210 to each of the calculators 222 to 230 on the basis of the flowcharts shown in FIGS. 24 and 25 so that these calculators process the operations shown by the equations (27), (28), (35), (36) and (41) to (48). As described above, the coefficient group for each segment represented by the following equation is obtained:

$$[\mathit{Offs}(P_h), \mathit{Sens}(P_h)] \begin{array}{c} p \\ \\ h=1 \end{array} \quad (50)$$

$$[A(P_h), B(P_h)] \begin{array}{c} p \\ \\ h=1 \end{array}$$

and the temperature correction coefficients $a_1$, $b_1$, $a_2$ and $b_2$ are further obtained.

The thus-obtained coefficient group is stored in a PROM (programmable read only memory) 250.

By using the PROM 250 for the offset signal generator 60, the sensitivity generator 70, the temperature correction offset coefficient generator 62 and the temperature correction sensitivity coefficient generator 72 in this way, it is possible to process the correction operation represented by the equation (8) for each segment, and to measure the momentary torque with high accuracy in a wide range from the no rotation to a high-speed rotation of the torque transmitting shaft 10 and from a low temperature to a high temperature.

The measurement of a torque with high accuracy is conventionally impossible when the torque transmitting shaft 10 is replaced, but this example is very convenient because it is easy to measure a torque simply by replacing the PROM 250 for correction coefficients.

Example of circuit structure

Figure 23B:
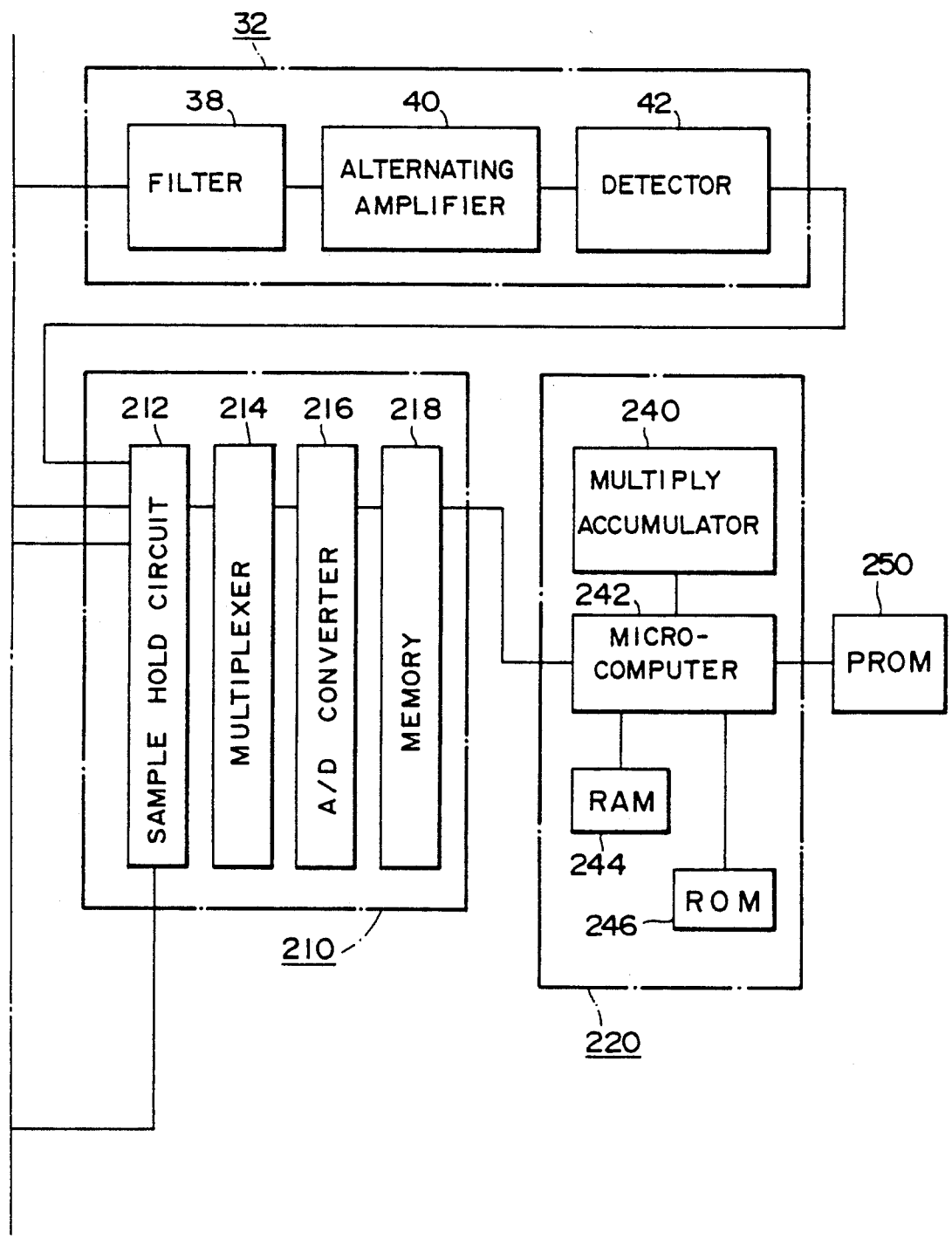
FIG. 23, comprising FIGS. 23A and 23 B, is a block diagram of a concrete circuit structure of the correction coefficient group calculation circuit shown in FIG. 22.

FIG. 23 shows the circuit structure of the correction coefficient group calculation circuit shown in FIG. 22.

In this example, the calibration signal generator 200 includes a strain gauge 202, a rotary transformer 204 and a calibration signal processing circuit 206. The strain gauge 202 is pasted on the torque transmitting shaft 10 as a bridge circuit so as to detect the strain of the torque transmitting shaft 10 due to the transmitted torque Tq. The strain gauge 202 and the calibration signal processing circuit 206 are rotatably connected by the rotary transformer 204, and the output of the strain gauge 202 is output to the calibration signal processing circuit 206 through the rotary transformer 204. The calibration signal processing circuit 206 outputs the transmitted torque detected by the strain gauge 202 to the waveform memory 210 as the calibration signal Tq for calibrating the sensor output.

The temperature detector 90, which includes the thermocouple 94 and the temperature signal processing circuit 96, detects the temperature of the magnetic sensor 12 and outputs the detected temperature T to the waveform memory 210.

The temperature signal processing circuit 96 compensates the temperature detected by the thermocouple 94 with room temperature and amplifies the temperature so as to output the detected temperature T as a signal of an optimum voltage level for being stored in the waveform memory 210.

The rotational angle detector 50 includes the optical rotary encoder 52a as an angle detecting portion and a position signal processing circuit 54a as the segment detector. The optical rotary encoder 52a is provided on the torque transmitting shaft 10. The position signal processing circuit 54a outputs a reference position detection signal at every revolution of the torque transmitting shaft 10 on the basis of the output of the optical rotary encoder 52a, and outputs the segment detection signal P' to the waveform memory 210 at every revolution of the torque transmitting shaft 10.

As the angle detecting portion 52, for example, a magnetic rotary encoder or an absolute encoder for detecting the absolute position may be used in place of the optical rotary encoder 52a.

The waveform memory 210 includes a sample hold circuit 212, a multiplexer 214, an A/D converter 216 and a memory 218. The torque detection signal S output from the detection signal processing circuit 32, the calibration signal Tq output from the calibration signal generator 200, the detected temperature T detected by the temperature detector 90 are simultaneously held as a sample synchronously with the segment detection signal P' output from the rotational angle detector 50. These three items of data held as a sample are input to the A/D converter 216 through the multiplexer 214, and after they are converted into digital signals by the A/D converter 216, they are stored in the memory 218.

The A/D converter 216 executes 12-bit A/D conversion in order to provide the waveform memory 210 with an analog-digital converting accuracy of 0.1% as a correction coefficient.

The operation speed of the waveform memory 210 is an important factor in determining the data storing speed. For example, if data are stored every time the torque transmitting shaft 10 which rotates at a rate of 6,000 rpm rotates 1°, a data processing speed of $100 \times 360 \times 3 = 108$ kHz is necessary. This is because the number of revolutions per sec of the torque transmitting shaft 10 is 6,000 rpm$\times(1/60) = 100$, the number of segments per revolution is 360, and analog-digital conversion for three channels is simultaneously carried out in this example.

If data are stored in the waveform memory 210 at a rate of 1,000 rpm by rotational speed, it is generally sufficient. Therefore, the analog-digital conversion speed of the A/D converter 216 is sufficiently maintained by using a conversion frequency of about 18 kHz. In this example, the A/D converter 216 having a conversion frequency of not less than 100 kHz is used with an allowance.

Since the synchronism of data is important in this example, the sample hold circuit 212 is so designed as to enable simultaneous sample holding of data for three channels.

If the waveform memory 210 is especially required to have a high-speed operation, three A/D converters 216 are preferably used so as to enable simultaneous and parallel analog-digital conversion of the data for three channels output from the sample hold circuit 212.

The coefficient calculator 220 includes a multiply accumlator 240, a microcomputer 242, a RAM 244 and a ROM 246.

The operation program of the microcomputer 242 is written in the ROM 246, and the RAM 244 functions as the register 232 shown in FIG. 22.

The multiple accumulator 240 has the same function as the calculators 222 to 230 and, in addition, executes each calculation in parallel in a pipelining manner.

The microcomputer 242 operates in the same way as the controller 234 shown in FIG. 22 on the basis of the operation program stored in the ROM 246, so as to transfer data from the memory 218 to the RAM 244, receive and supply data from and to the multiply accumulator 240 and receive the result of calculation from the calculator 240 and store the result to the RAM 244. The microcomputer 242 writes and stores the coefficient group of the correction operation expression obtained by such calculation into the PROM 250.

The operation of this example having the above-described structure will now be explained.

The operation of obtaining the coefficients A, B used in the equation (4) or (8) for each segment will first be explained.

FIG. 24 shows an example of operation of obtaining the coefficients A, B. In this example, the temperature of the detecting apparatus and the average applied torque Tq are first kept constant. The signals S, Tq, T input to the waveform memory 210 are stored in the memory 218 for r revolutions of the torque transmitting shaft 10 synchronously with the segment detection signal P'.

Figure 26:
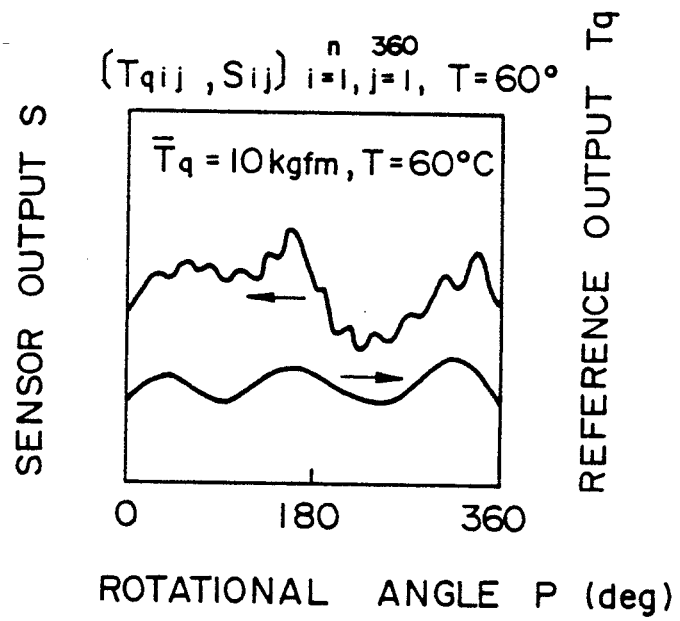
FIGS. 26 to 28 are explanatory views of the formats of the data stored in the waveform memory and the data processed in the coefficient calculation in the circuit shown in FIGS. 22 and 23.

FIG. 26 shows the data on the sensor output S and the momentary torque Tq output from the calibration signal generator 200 written in the memory 218 in this way for one revolution of the torque transmitting shaft 10. When the data were measured, the temperature T was 60° C. and the average applied torque $\overline{Tq}$ was 10 kgfm.

In this measurement, the average applied torque $\overline{Tq}$ is constant but the momentary applied torque Tq varies. Therefore, the sensor output S varies in correspondence with the momentary applied torque Tq and becomes the value containing the fluctuation of the sensitivity and the fluctuation of the offset component depending on the rotation of the torque transmitting shaft 10.

Although the data for one revolution are shown in FIG. 26, the data for r revolutions are stored in this example. In this example, r was 22.

The data for r revolutions were measured n times while varying the average applied torque $\overline{Tq}$ and the measured data were written in the waveform memory 210.

Figure 27:
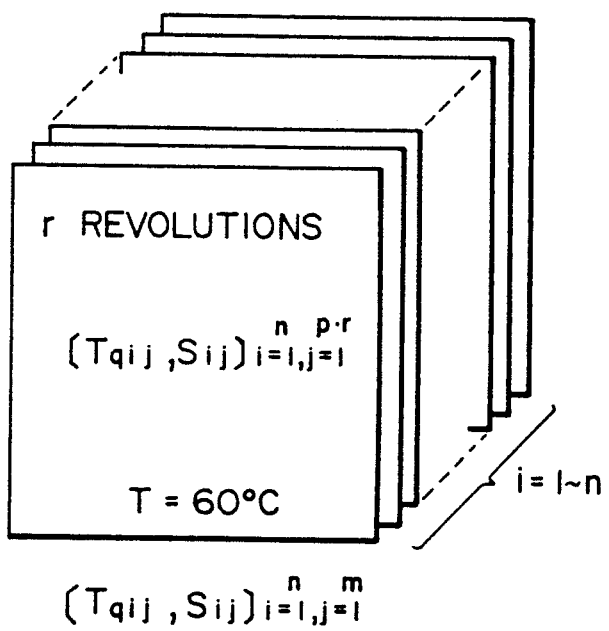

FIG. 27 shows n data groups obtained by varying the average applied torque $\overline{Tq}$ as a parameter.

Figure 28:
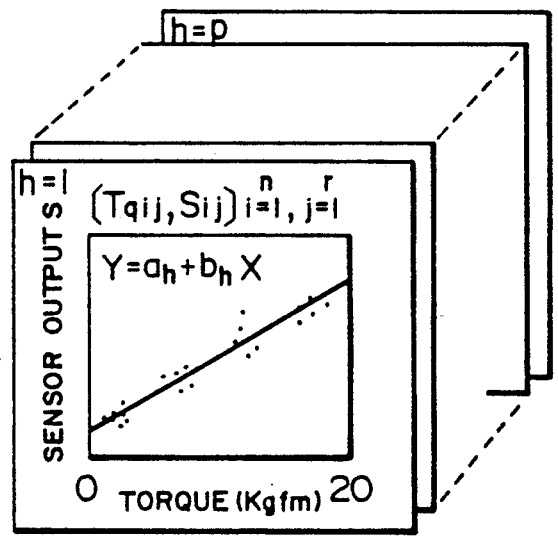

The thus-obtained data group is divided into a small data group for each segment P", as shown in FIG. 28, and a table of a torque and a sensor output is formed for each segment P"$_h$.

The thus-formed small data group for each segment is substituted into the equations (27) and (28) to obtain the offset signal Offs(P") and the sensitivity Sens(P") for each segment. The sensitivity and the offset signal obtained in this way are shown in FIGS. 11 and 12, respectively. The thus-obtained sensitivity and offset signal are written into the PROM 250 for each segment.

As described above, the sensor output S which is output from the magnetic sensor 12 is varied by the fluctuation of the sensitivity (FIG. 11) and the fluctuation of the offset output (FIG. 12) depending on the rotation of the torque transmitting shaft, as shown in FIG. 16, even when the applied torque Tq is constant. It is therefore impossible to detect the momentary torque Tq transmitted through the torque transmitting shaft 10 with high accuracy by a conventional apparatus.

According to the present invention, however, the sensitivity Sens(P") and the offset signal Offs(P") which correspond to the rotational position P of the torque transmitting shaft 10 are calculated for each segment and stored in the PROM 250 in advance. It is therefore possible to correct the sensitivity and the offset component of the output signal S of the magnetic sensor 12 by processing the correction operation expression having the independent coefficient group for each segment P", e.g., represented by the equation (4).

When the momentary torque Tq is kept constant in this way, as shown in FIG. 17, the magnetic sensor 12 outputs the detection signal S having a substantially flat characteristic without being dependent upon the rotational position of the torque transmitting shaft 10. Thus, it is possible to detect the momentary torque Tq with high accuracy in a wide range from the suspension to a high-speed rotation of the torque transmitting shaft 10.

FIG. 25 shows an example of operation for obtaining the temperature coefficients $a_1$, $b_1$, $a_2$ and $b_2$ shown in the equation (8).

Figure 29:
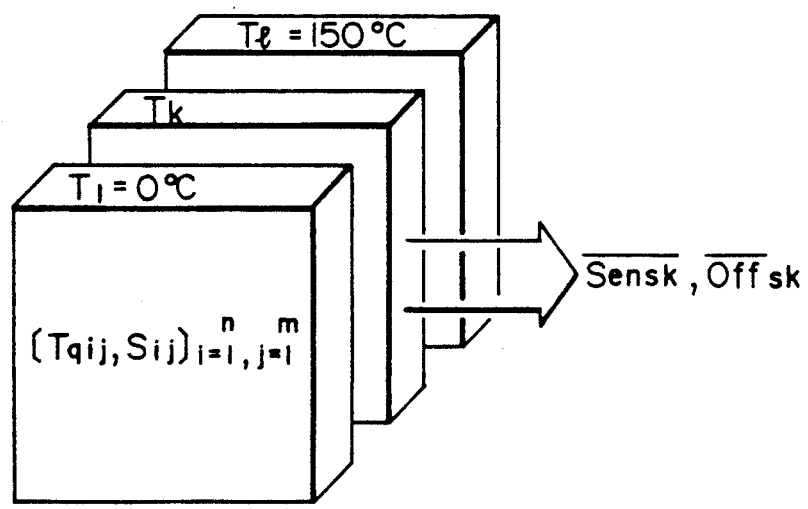
FIG. 29 is an explanatory views of the format of the data stored in the waveform memory and processed by the coefficient calculator for calculating the temperature correction coefficients.

The data group shown in FIG. 27 is the one obtained under the condition of a constant temperature. In order to obtain these temperature coefficients $a_1$, $b_1$, $a_2$ and $b_2$, the data group shown in FIG. 27 is measured ; times at different temperatures with the temperature T as a parameter, thereby obtaining the data group shown in FIG. 29. The thus-obtained data group is stored in the waveform memory 210.

The coefficient calculator 220 calculates the average sensitivity and the average offset signal of the data group on each temperature T from the equations (34) and (35), as shown in FIG. 24.

FIGS. 14 and 15 show the temperature dependence characteristics of the average sensitivity and the average offset signal, respectively, obtained in this way. It will be understood from these drawings that the average sensitivity and the average offset signal vary as the functions of the temperature T.

For this reason, the signal S output from the magnetic sensor 12 varies with a change in the temperature T in a conventional apparatus, as shown in FIG. 16, thereby making accurate torque detection impossible. In contrast, according to the apparatus of the present invention, the temperature coefficients $a_1$, $b_1$, $a_2$ and $b_2$ are obtained on the basis of the equations (41) to (48) by using the average sensitivity and the average offset signal obtained with the temperature T as a parameter, as shown in FIGS. 14 and 15, and these coefficients are stored in the PROM 250. That is, the average sensitivity and the average offset signal obtained as the functions of the temperature T, as shown in FIGS. 14 and 15, are approximated by the following equations and the coefficients $a_1$, $b_1$, $a_2$ and $b_2$ are obtained by the coefficient calculator 220:

$$Sens(T) = \overline{Sens} \cdot f_1(T) \qquad (51)$$
$$= \overline{Sens} \cdot (a_1 + b_1 T)$$

$$offs(T) = \overline{Offs} \cdot f_2(T) \qquad (52)$$
$$= \overline{Offs} \cdot (a_2 + b_2 T)$$

and these temperature coefficients $a_1$, $b_1$, $a_2$ and $b_2$ are written into the PROM 250. By using the thus-obtained temperature coefficient group and the coefficient group for each segment obtained in the above-described way, the sensor output S of the magnetic sensor 12 is corrected on the basis of the equation (8). It is therefore possible to accurately measure the average torque $\overline{Tq}$ transmitted through the torque transmitting shaft 10 without being influenced either by the rotational position of the torque transmitting shaft or by the change in the temperature T.

FIG. 18 shows the temperature dependence characteristic of the thus-obtained momentary torque Tq. In FIG. 18, the average torque Tq is assumed to be kept constant.

As is obvious from FIG. 18, according to the apparatus of the present invention, it is possible to obtain a substantially flat detection output in a wide temperature range from 0° to 150° C., which shows that the apparatus of the present invention enables the measurement of the momentary torque Tq with high accuracy without being influenced by the temperature T.

In this example, the coefficient calculator 220 is composed of the microcomputer 242 and the RAM 244 provided separately from each other. Alternatively, a 1-chip microcomputer with integrated RAMs may be used. It is also possible to separate the data region from the program region and to use a DSP (digital signal processor) which has a multiply accumulator and is capable of high-speed calculation.

It is possible to provide a plurality of accumulators 222, multipliers 224, dividers 226, subtracters 228 and adders 230, and combine these calculators with each other so as to enable parallel calculation, thereby calculating the coefficient group at a higher speed.

Magnetic Sensor Attaching Device

A magnetic sensor attaching device will now be explained which enables the magnetic sensor to be rotatably attached to a given position of the rotor for transmitting a torque and which enables torque measurement with good reproducibility and high accuracy by keeping the positional relationship between the magnetic sensor and the rotor with high accuracy.

The magnetic sensor attaching device includes a swivel bearing secured to a given position of a rotor which transmits a torque in a torque detecting apparatus for measuring the magnetostriction of the rotor by using a magnetic sensor and detecting the transmitted torque on the basis of the measured magnetostriction, so as to allow the adjustment of the position; and a sensor housing rotatably secured to the rotor through the swivel bearing so as to hold the magnetic sensor in such a manner that the sensor is opposed to the rotor with a predetermined minute clearance therebetween. The magnetic sensor attaching device is characterized in that the magnetic sensor is rotatably secured to a given position of the rotor while maintaining the positional relationship between the magnetic sensor and the rotor with high accuracy.

As the swivel bearing, a taper bearing which can be secured to any position of the rotor due to the wedging effect or a separable bearing including at least two inner race divisions and at least two outer race divisions are preferably used.

A magnetic sensor attachment will be explained in detail in the following.

First example

Figure 30:
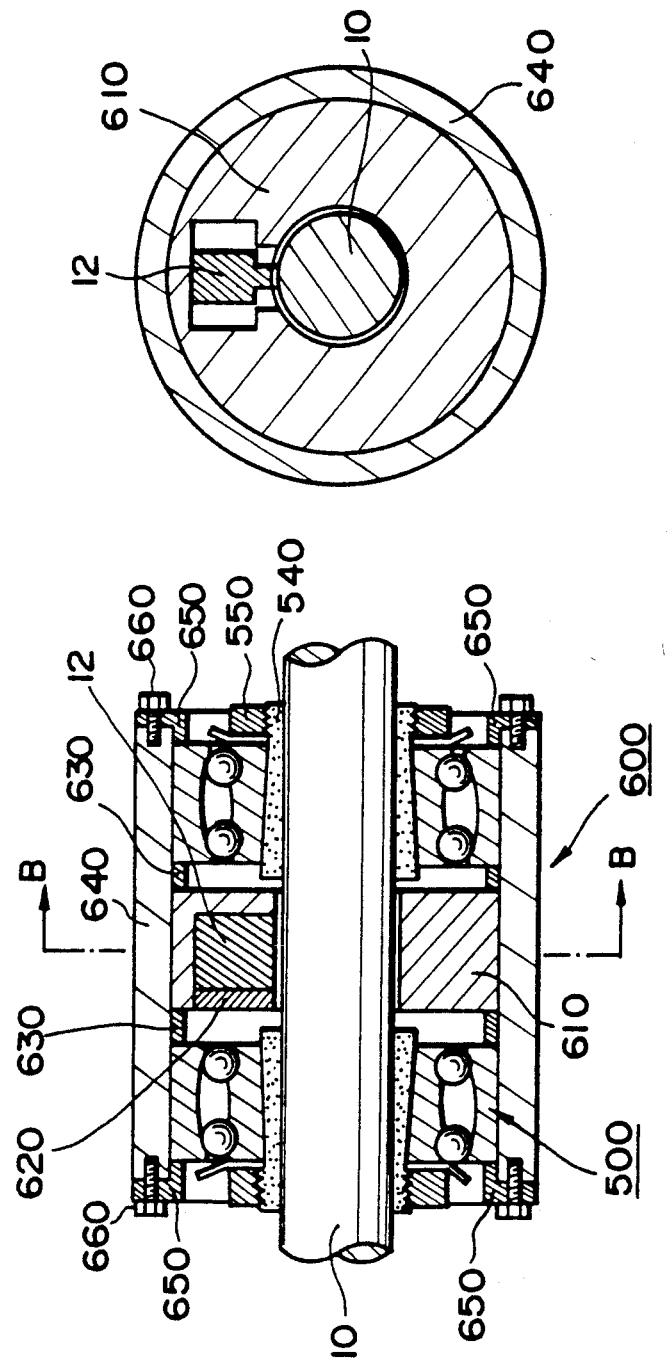

FIG. 30 shows a first example of a magnetic sensor attaching device.

The magnetic sensor attaching device in the first example includes a taper bearing 500 which is secured to a given position of the torque transmitting shaft 10 so as to allow the adjustment of position, and a sensor housing 600 rotatably attached to the torque transmitting shaft 10 through the taper bearing 500. The magnetic sensor 12 is attached to the torque transmitting shaft 10 so as to be opposed to the torque transmitting shaft 10 with a predetermined minute clearance therebetween.

The magnetic sensor 12 detects the magnetostriction produced in the torque transmitting shaft 10 and a transmitted torque is measured noncontactingly on the basis of the detected magnetostriction.

As shown in FIGS. 5 and 6, the magnetic sensor 12 includes the excitation core 14 disposed in parallel to the torque transmitting shaft 10 and the detection core 18 provided on the inside of the excitation core 14 orthogonally thereto. The excitation coil 16 and the detection coil 20 are wound around the cores 14 and 18, respectively.

Figure 31:
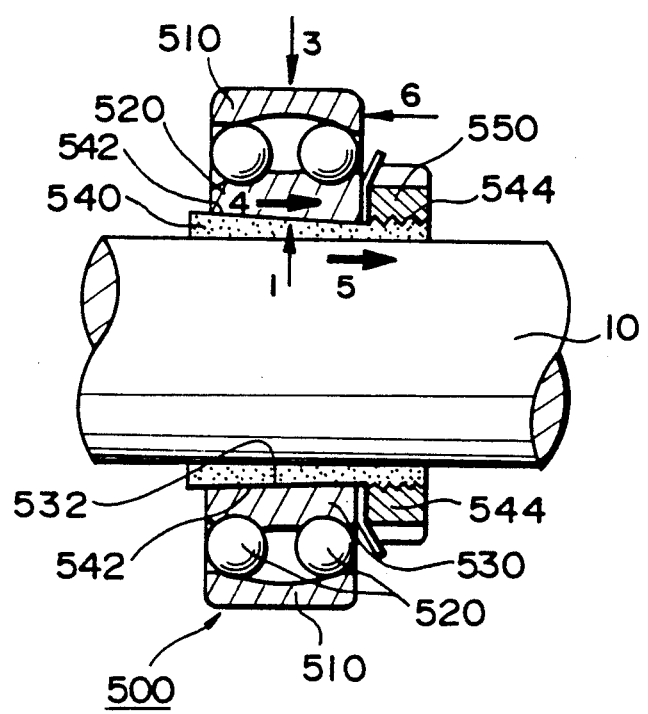
FIG. 31 is an explanatory view of a taper bearing used in the apparatus shown in FIGS. 30(A) and 30(B)

FIG. 31 shows the taper bearing 500 used in this device.

The taper bearing 500 includes an annular outer race 510, an annular inner race 530, balls 520 provided therebetween and a taper adapter 540 fitted over the outer periphery of the torque transmitting shaft 10.

The balls 520 are arranged in a plurality of rows in the direction of the rotation of the bearing, and constitute a double row self aligning bearing.

The taper adapter 540 is provided on the outer periphery thereof with an inner race attaching taper portion 542 which is tapered inward from one end side and on the other side thereof with a threaded groove 544 for fixing a taper ring 550 which will be described later.

The inner race 530 is provided on the inner peripheral surface thereof with a taper portion 532 which engages with the taper portion 542 provided on the taper adapter 540

The taper bearing 500 is secured to the torque transmitting shaft 10 by engaging the taper portion 532 of the inner race 530 with the taper portion 542 of the taper adapter 540 which is placed over the torque transmitting shaft 10. More specifically, when the inner race 530 of the bearing 500 is fitted to the taper portion 542 of the taper adapter 540, the taper portions 532 and 542 are engaged with each other by the wedging effect. At this time, the taper adapter 540 is deformed in the direction of the inner diameter, thereby being secured to the torque transmitting shaft 10. As a result, the taper bearing 500 is also secured to the torque transmitting shaft 10.

The taper ring 550 is provided in order to control the wedging force produced between the taper adapter 540 and the inner race 530. The taper ring 550 is engaged with the threaded groove 544 of the taper adapter 540. By tightening or loosening the taper ring 544, the wedging force is controlled, thereby constituting a gap adjusting mechanism which is capable of securing the taper bearing 500 to the torque transmitting shaft 10.

As shown in FIG. 30, the sensor housing 600 includes a sensor holder ring 610 as a sensor holder for holding the magnetic sensor 12, a presser plate 620, a spacer ring 630, a sensor housing cylinder 640 for accommodating these members and the bearing 500 therewithin, and a sensor housing cover 650 provided on both ends of the sensor housing cylinder 640.

The magnetic sensor 12 is fitted into the sensor holder ring 610 and is fixed by the presser plate 620.

The sensor holder ring 610 is fitted into the sensor housing cylinder 640 and the spacer rings 630 are disposed on both sides thereof.

Over the outer peripheries of the spacer rings 630, the taper bearings 500 are fitted, and the sensor housing covers 650 are secured to both ends of the sensor housing cylinder 640 by bolts 660. In this way, the taper bearing 500 and the sensor holder ring 610 are secured to the sensor housing 600.

The magnetic sensor 12 is rotatably secured to the torque transmitting shaft 10 with good accuracy by using the taper bearing 500 and the sensor housing 600 in this way.

The magnetic sensor 12 is rotatably secured to the torque transmitting shaft 10 with a clearance of 600 $\mu$m in this example.

As the material of the taper bearing, an iron material is generally used. In order to reduce the influence of temperature as much as possible, it is preferable that all the parts of the sensor housing 600 are made of an iron material and the thermal expansion coefficients of the parts are made uniform as much as possible. The magnetic shielding effect is obtained by using the sensor housing 600 of an iron material.

The operation of the attaching device of the first example having the above-described structure will now be explained.

According to the magnetic sensor attaching device, the taper adapter 540 is fitted over the torque transmitting shaft 10 at a given position, and the taper portion 532 of the taper bearing 500 is engaged with the taper portion 542 of the taper adapter 540. As a result, the bearing 500 and the taper adapter 540 are engaged with each other by the wedging effect, and due to the deformation of the taper adapter 540 produced in the direction of the inner diameter, the taper adapter 540 is fixed on the torque transmitting shaft 10. As a result, the magnetic sensor 12 is rotatably secured to the torque transmitting shaft 10 through the sensor holder ring 610, the sensor housing cylinder 640, the covers 650, the bearings 500 and the taper adapters 540.

In this way, according to this example, a conventional press-fitting type bearing is not used, and since the bearing 500 is fixed by the engagement between the tapered inner race 530 and the taper adapter 540, it is easy to fix the magnetic sensor 12 to the torque transmitting shaft 10 at a given position.

At this time, since the degree of bond between the taper adapter 540 and the inner race 530 is adjusted by tightening or loosening the taper ring 550 which is screwed into the threaded groove 544, it is possible to greatly reduce the loose fitting of the taper bearing 500.

Figure 32:
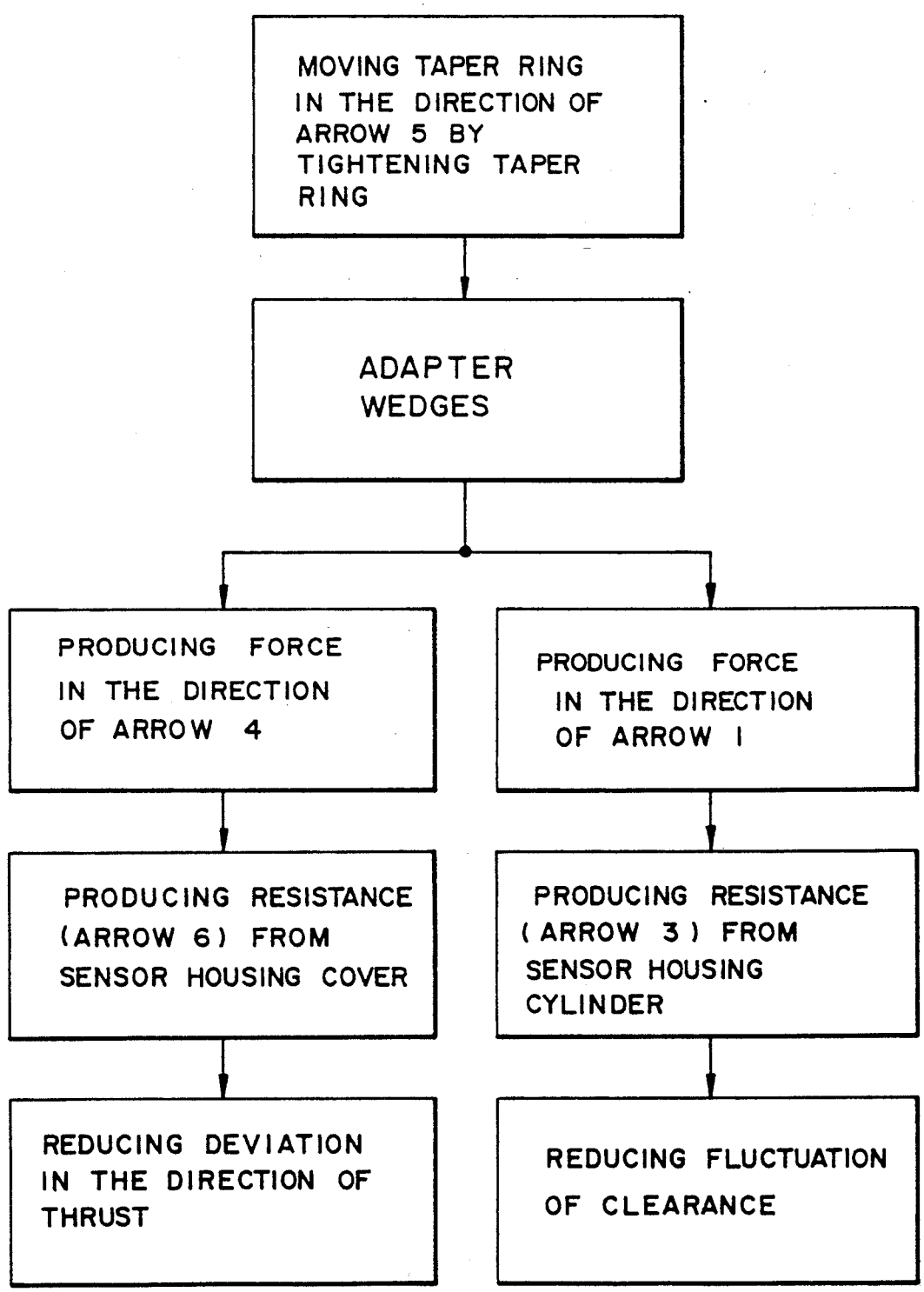
FIG. 32 is an explanatory view of the principle of attaching the taper bearing shown in FIG. 31.

FIG. 32 shows the principle of adjusting the degree of bond between the taper adapter 540 and the inner race 530 by the taper ring 550.

When the taper ring 550 is tightened, as shown in FIG. 31, the wedging force of the taper adapter 540 is applied to the torque transmitting shaft 10 and the bearing 500, thereby producing force in the direction indicated by the arrow 1.

On the other hand, since the outer race 510 is restrained from being deformed in the radial direction by the sensor housing cylinder 640, force is produced as reaction in the direction indicated by the arrow 3, resulting in the reduction of the fluctuation of the balls 520 in the radial direction.

The wedging force simultaneously presses the inner race 540 in the direction indicated by the arrow 4. On the other hand, since the outer race 510 is fixed by the sensor housing covers 650, reaction acts in the direction indicated by the arrow 6. As a result, the fluctuation of the balls 520 in the direction of thrust is also reduced In this way, since the fluctuation of the balls 520, namely, the loose fitting of the bearing 500, in the two directions is reduced, it is possible to maintain the position of the magnetic sensor 12 with respect to the torque transmitting shaft 10 with high accuracy and to detect the transmitted torque with high accuracy Generally, when a shaft is fixed to the housing by two bearings, the shaft can be fixed in such a manner as to be rotatable around a predetermined axis. In this case, it is necessary that the axes of the shaft are coincident with each other and the axis of the housing is also coincident with the axis of the shaft at two bearing fixing portions. If they are not coincident, bending stress and shear stress act on the shaft, thereby deforming the shaft. If this deformation is small, there is no mechanical problem. However, since the magnetic sensor detects the stress of the shaft, the stress other than the torque is inconveniently detected, thereby lowering the accuracy. Therefore, it is necessary that the axes are coincident with each other on both the rotating side and the fixing side, namely, at four portions in total. This requires a very high machining accuracy, resulting in rise in cost.

As a countermeasure, in this example, a double row self aligning bearing is used as the taper bearing 500. This bearing has an aligning function. Therefore, even if the axes of the torque transmitting shaft 10 and the sensor housing cylinder 640 are slightly deviated from each other at the two portions for fixing the bearings 500, the bearing 500 can adjust effectively to the situation, thereby greatly facilitating machining of each part.

The inner peripheral portion of the outer race 510 is machined into a curved surface having a curvature of r in the direction of thrust. The curvature r is equal to the inner diameter of the outer race 510. When the axes are slightly deviated from each other, for example, because the shaft is bent, the bearing 500 inclines in the direction of thrust along the curvature of the inner peripheral portion of the outer race, so that the axis of the inner race coincides with the axis of the bearing and the axis of the outer race coincides with the axis of the sensor housing cylinder 640. Therefore, neither bending stress nor shear stress acts on the shaft. When the position of the magnetic sensor is adjusted in the direction of thrust, the thickness of the spacer ring 630 is changed.

RESULTS OF EXPERIMENTS

The results of experiments carried out by using the device of this example will be explained.

In this example, the magnetic sensor 12 was rotatably fixed with easiness at a given position of the torque transmitting shaft 10 with a clearance of 200 $\mu$m therebetween. By varying the degree of bond between the taper ring 550 and the threaded groove 544 by using the gap adjusting mechanism, the gap between the balls 520 and the inner race 530 and the gap between the balls 520 and the outer race 510 were eliminated, thereby preventing loose fitting. In order to measure the fluctuation of the clearance, vibration and shock were applied from the outside. As a result, in a conventional device, the fluctuation of the clearance was ±20 $\mu$m and the fluctuation in the direction of thrust was about +10 $\mu$m. In contrast, in the device of the present invention, the magnetic sensor 12 was held such that the fluctuation of the clearance was within ±1 $\mu$m and the fluctuation in the direction of thrust was within ±2 $\mu$m. It was confirmed that the device of this example enables stable and highly accurate torque measurement.

Figure 33:
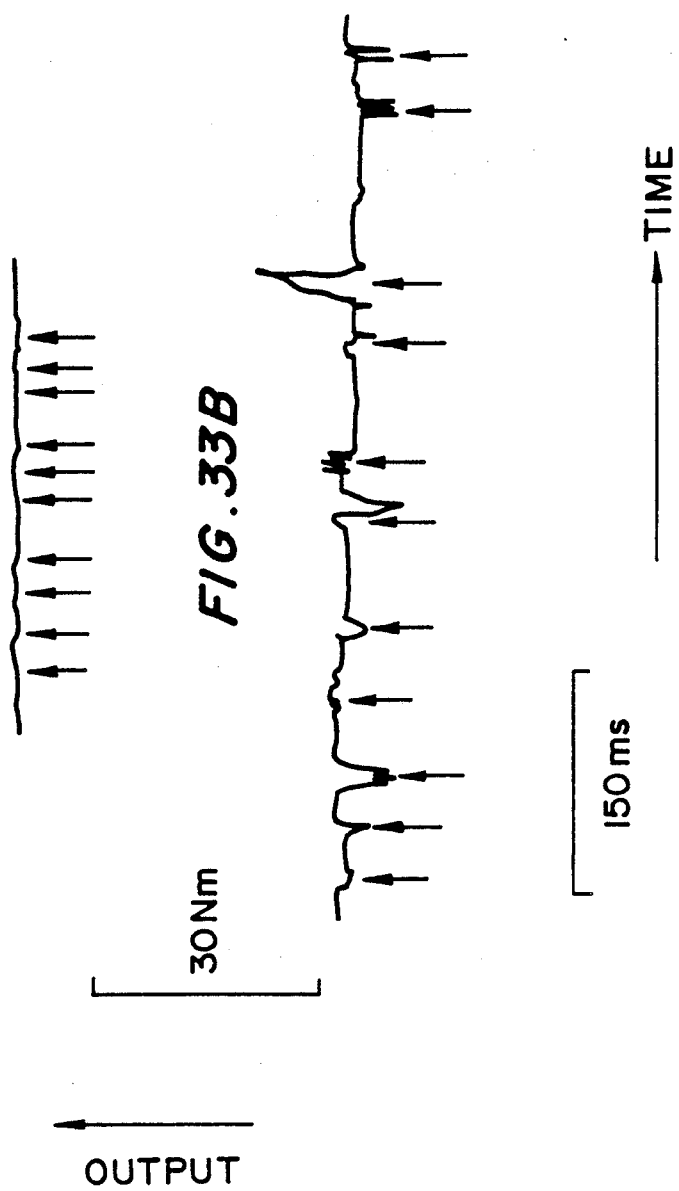
FIG. 33, comprising

FIG. 33 shows the actually measured output data of the magnetic sensor 12.

In this experiment, external force or shock was applied in the radial, vertical and horizontal directions and in the direction of thrust at timings indicated by the arrows.

The curve B shows the measured data on a conventional magnetic sensor attaching device, and the curve A the measured data on this example.

It was confirmed from this experiment that in this example, the fluctuation of the output due to the external force applied is greatly improved and a very stable output is obtained. This is because loose fitting of the bearing is reduced by the gap adjusting mechanism in the magnetic sensor attaching device of this example.

It was also confirmed from the experiment that due to the magnetic sensor attaching device of this example, the magnetic sensor can display a sufficient detection capability in such a wide temperature range as that of 0° to 150° C.

Figure 34:
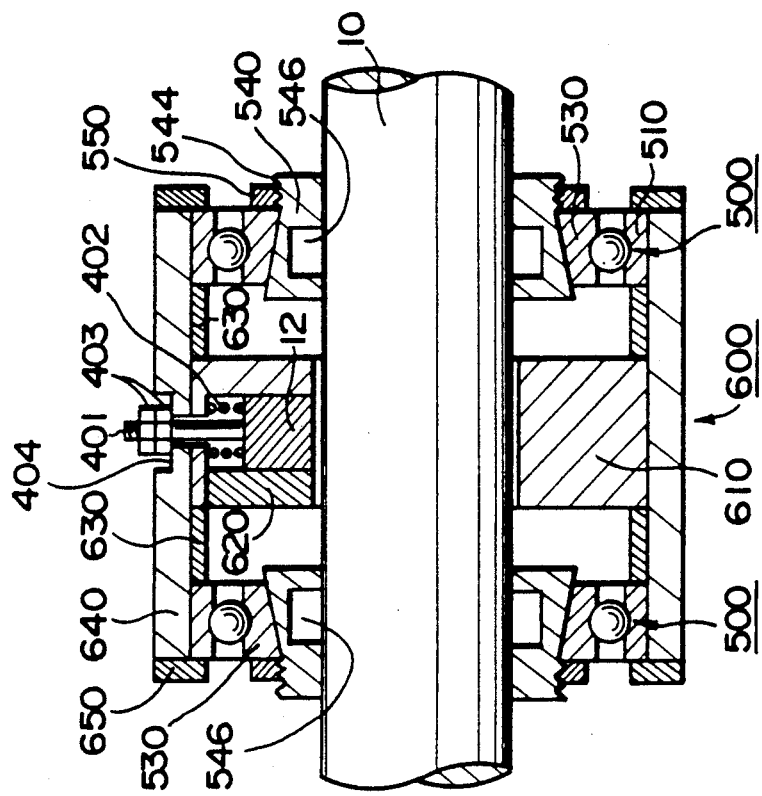
FIGS. 34 and 35 are explanatory views of a magnetic sensor attaching device for attaching a magnetic sensor to torque transmission shafts having different diameters.
Figure 35:
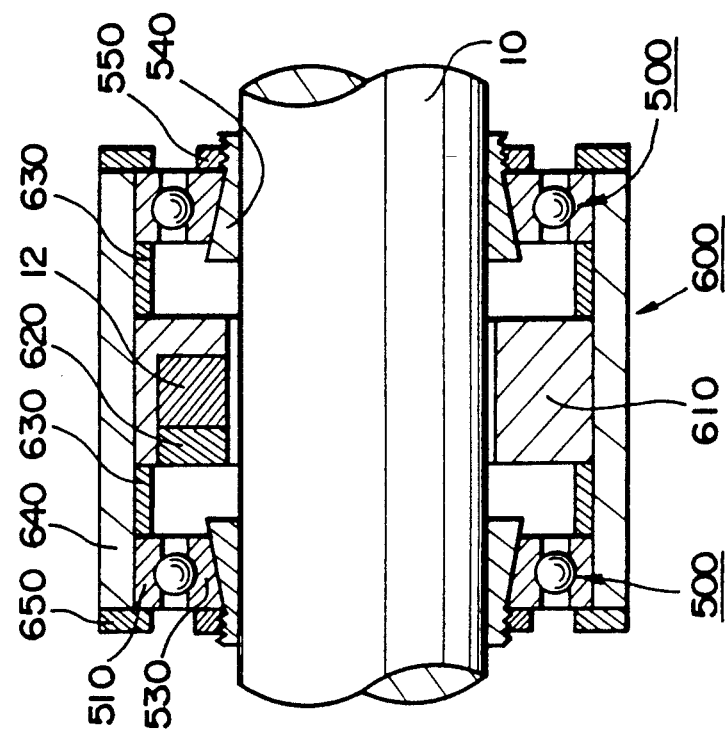

The device of this example is adaptable when the outer diameter of the torque transmitting shaft 10 is slightly smaller than the inner diameter of the inner race 530, as shown in FIG. 34, but when the outer diameter of the torque transmitting shaft 10 is considerably smaller than the inner diameter of the inner race 530, as shown in FIG. 35, there is a problem.

This problem is easily solved by using the taper adapter 540 having an inner diameter suitable to the torque transmitting shaft 10, as shown in FIG. 35. In this case, it is preferable to use the sensor holder ring 610 which is suitable to the diameter of the torque transmitting shaft 10 and has a clearance adjusting mechanism in order to adjust the clearance between the magnetic sensor 12 and the torque transmitting shaft 10.

The clearance adjusting mechanism shown in FIG. 35 is composed of an adjust screw 401, a spring 402, a nut 403 and a nut receiving portion 404 attached to the magnetic sensor 12. The magnetic sensor 12 vertically moves along the guide groove of the sensor holder ring 610 so a to set and adjust the clearance between the magnetic sensor 12 and the torque transmitting shaft 10. The spring 402 is fixed to the nut receiving portion by the nut 403 in a compressed state. As the nut, a double nut is preferably used so as to prevent loosening. Finally, the sensor holder ring 610 is firmly secured too the magnetic sensor 12 by the presser plate 620.

By virtue of this mechanism, it is possible to use the same magnetic sensor attaching device when the magnetic sensor 12 is attached to the torque transmitting shaft having a different diameter, thereby greatly enlarging the application range of the device of this example.

In this case, it is preferable to provide a groove 544 in the inner peripheral portion of the taper adapter 540 so that the taper adapter 540 is easy to deform in the central portion by the wedging force. By providing the groove 544, the taper ring 550 is tightened and the taper bearing 500 is firmly and easily secured to the torque transmitting shaft 10.

SECOND EXAMPLE

In the first example, the magnetic sensor 12 is opposed to the torque transmitting shaft 10, but the present invention is not restricted to this structure and may have a multisensor structure in which a plurality of magnetic sensors 12 are arranged around the torque transmitting shaft 10. This structure can further enhance the detecting accuracy.

FIG. 36 shows an example of a magnetic sensor attaching device which adopts such a multisensor structure. In this device, three magnetic sensors 12 are inserted in the sensor holder ring at an interval of 120° and fixed by the presser plate 620.

The excitation coils 16 and the detection coils 20 (shown in FIGS. 5 and 6) of these three sensors 12 are connected with each other in series or in parallel and connected to the detection signal processing circuit 32 shown in FIG. 9. In this way, the detecting accuracy is enhanced.

To state this concretely, when the single magnetic sensor 12 is disposed, the clearance between the magnetic sensor and the torque transmitting shaft 10 sometimes changes due to the deviation of the axis of the torque transmitting shaft caused by the rotation of the torque transmitting shaft 10. In this case when the torque detection output which is output from the magnetic sensor 12 is measured, a fluctuating waveform having the same period as the rotational frequency of the torque transmitting shaft appears, and the torque detection output changes with the rotation of the torque transmitting shaft 10 in spite of a constant applied torque.

By adopting a multisensor structure as in the second example, the fluctuations of the torque detection outputs are cancelled by each other, so that a detection output is obtained with good reproducibility.

THIRD EXAMPLE

Figure 37B:
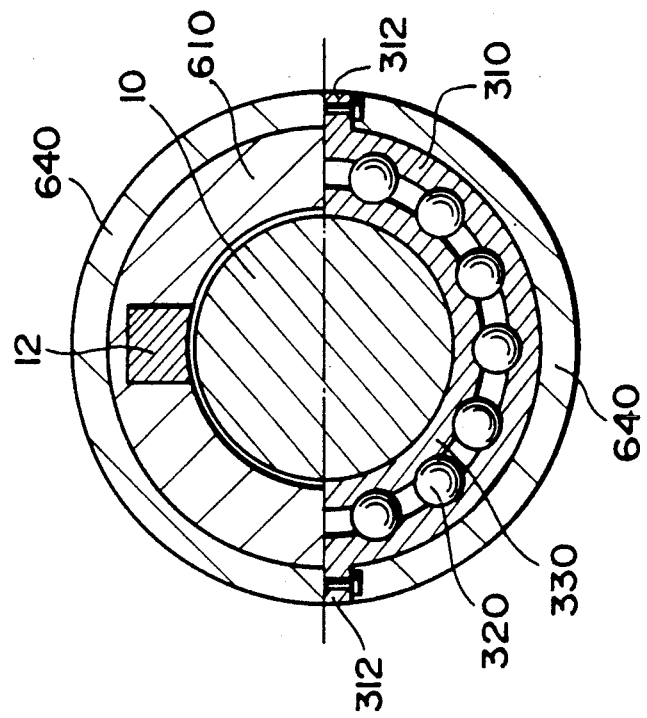
Figure 37A:
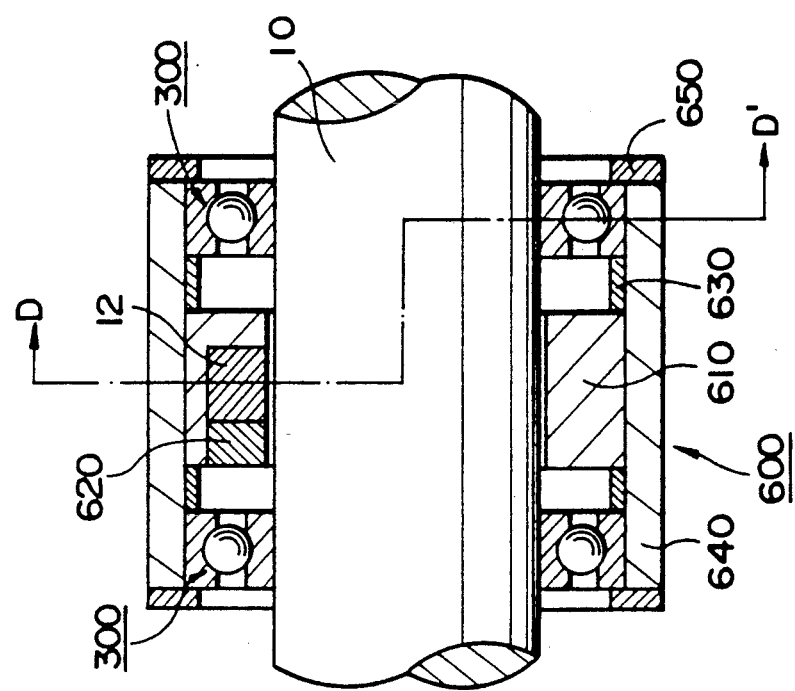
Figure 41:
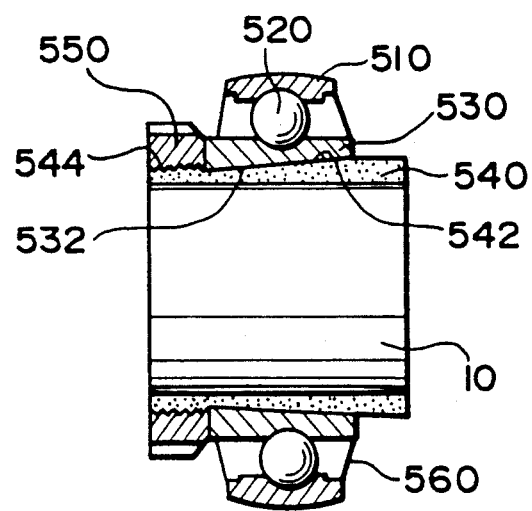
FIG. 41 is an explanatory view of a bearing used in the apparatus shown in FIG. 40.

FIG. 37 shows a third example of a magnetic sensor attaching device. This device is characterized in that a separable bearing 300 is used in place of the taper bearing 500 used in the first example. Since the other elements are the same as those in the first example, the same reference numerals are provided therefor and explanation thereof will be omitted.

FIG. 38 shows an example of the separable bearing 300 used in the third example. The separable bearing 300 includes at least two inner race divisions 330, at least two outer race divisions 310 and a plurality of balls 320 provided therebetween. As a fixing member, a fastening portion 312 is provided at both end portions of each of the outer race divisions 310, and by joining the fastening portions with each other by bolts 314, these divisions are operated as one bearing.

The end surface of the outer peripheral portion of each of the inner race divisions 330, which comes into contact with the balls 320, is chamfered so as to prevent the balls 320 from being scratched by the balls which rotate with the rotation of the shaft.

The end surface of the inner peripheral portion of each of the outer race divisions 310 is also chamfered so as to prevent the balls 320 from being scratched.

The fastening portion 312 provided on the outer race division 310 is connected with another fastening portion 312 of another outer race division 310 by the bolt 314 so as to be united into one body. The fastening portion 312 is bent in the radial direction at a large angle. It is therefore possible to adjust the clearance between the outer race 312 and the balls 330 and the clearance between the inner race 330 and the balls 330 by tightening or loosening the bolts 314, thereby reducing a loose fitting of the bearing.

The purpose of the fastening portion 312 provided as a fixing member is to fix the inner race divisions 330, the balls 320 and the outer race divisions 310 integrally with each other so that they function as a bearing. It is therefore possible to adopt a mechanism using a spring or a belt-like member for winding around the outer periphery of the outer race 310 as a fixing member in place of the fastening portion 312.

The separable bearing 300 is integrally secured to the sensor housing cylinder 640 by the sensor housing covers 650 in the same way as in the first example.

The magnetic sensor attaching device of this example enables the magnetic sensor 12 to be attached to a given position of the torque transmitting shaft 10 with high accuracy like the first example.

Especially, since the attaching device of this example, which using the separable bearing 300, as described above, enables separately manufactured bearing members to be assembled into the bearing 300, for example, even when the torque transmitting shaft 10 has on both ends thereof larger flanges than the shaft system, attachment is facilitated without being obstructed by the flanges.

When the attaching device of this example is used for the torque transmitting shaft 10 having a different diameter, attachment is facilitated by using the inner race 330 having a suitable inner diameter. In this case, in order to have a clearance of about 0.2 mm between the small-diameter torque transmitting shaft 10 and the magnetic sensor 12, a sliding type sensor holder ring which is capable of adjusting the clearance is preferably adopted as the sensor holder ring 610.

In the case of using the separable bearing 300, a ball casing (not shown) is preferably used so as to uniformly distribute the balls 320.

FIG. 39 shows another example of the separable bearing 300 used in the third example.

This bearing is different from that shown in FIG. 37 in the structures of the outer race 310 and the fastening portion 312.

In the separable bearing shown in FIG. 39, the outer race 310 is divided into two outer race divisions and no fastening portion is provided on the end surface of the division. In place of the fastening portion, a holder 360 which is divided into two holder divisions are provided on the outer periphery of the outer race 310 as a fixing member. The whole members are united into one by the bolts 314 through threaded holes provided on the end surfaces of the holder divisions 320.

In this example, the holder 360 is made of a material having a high rigidity so as to deform the outer race 310 uniformly and adjust the loose fitting of the balls 320 to be uniform. Since the separable bearing 300 of this example has a cylindrical external configuration, it is easily inserted into the sensor housing cylinder 640.

Although a clearance is provided between the opposing fastening portions 312 in the separable bearing 300 shown in FIG. 38, in this example, the margin of the holder division 360 to fasten up is preferably so determined that the loose fitting of the balls 320 is minimum when the upper and the lower holder divisions 320 are connected without any gap.

FOURTH EMBODIMENT

FIG. 40 shows a fourth example of a magnetic sensor attaching device. This device is characterized in that a single row deep groove bearing is used as the taper bearing 500.

In the double row bearing shown in FIG. 31, the balls 520 are arranged in a plurality of rows in the direction of the rotation of the bearing.

In contrast, in the taper bearing 500 of this example, balls 520 arranged in a single row in the direction of bearing rotation are tightly inserted into the groove between the inner race 530 and the outer race 510. A ball casing 560 is provided in order to uniformly distribute the plurality of balls 520 arranged in a single row.

The sensor housing covers 650 of the sensor housing 600 are integrally provided with the bearing 500.

Use of such a single row deep groove bearing also enables the loose fitting of the bearing itself 500 to be prevented and the magnetic sensor 12 to be rotatably secured to the torque transmitting shaft 10 with high accuracy in the same way as in the first example.

The single row deep groove bearing itself does not have an aligning function which the double row self aligning bearing used in the first example has. The aligning function is a function of adjusting the axis when the axis of the torque transmitting shaft or the axis of the sensor housing cylinder is slightly deviated at the two portions to which the bearings are attached, namely, a function of adjusting the axis so as to prevent load from being applied.

In order to provide such function for the bearing of this example, the outer peripheral portion of the outer race 510 of the single row deep groove bearing is machined into a curved surface having a curvature of r in the direction of thrust. The curvature r is equal to the outer diameter of the outer race 510. The inner peripheral portion of the sensor housing cover 650 which holds the single row deep groove bearing is also machined into a curved surface having a curvature of r. In this way, the aligning function similar to that in the first example is displayed.

In the first to fourth example, the ball bearing is used, but the present invention is not restricted thereto and a roller bearing using a roller, or a plain bearing may be used in place of the ball bearing.

In the case of using a plain bearing, the outer peripheral portion of the bearing is tapered so as to be connected to the sensor housing.

In a plain bearing, the shaft is rotatably supported by a plain metal through a lubricant such as oil and molybdenum inserted therebetween or a plain metal provided with a material having a low friction coefficient such as Teflon on the surface thereof. By tapering the outer peripheral portion of the plain metal itself or the outer peripheral portion of a plain metal holder, and by using a taper adapter between the sensor housing and the plain bearing, it is possible to connect the plain bearing and the sensor housing with each other. The loose fitting between the shaft and the plain bearing is adjusted by changing the degree of bond of the taper portions.

The plain bearing may also be used as a separable plain bearing.

In the present invention, in order to further reduce loose fitting due to change of temperature, all the parts of the magnetic sensor attaching device may be composed of materials having the same thermal expansion coefficient. Alternatively, a mechanism for suppressing rise in temperature, for example, a cooling mechanism may be provided on the sensor housing, or the sensor housing may be so designed as to have a large heat capacity.

Such structure further reduces the loose fitting of the magnetic sensor and enables higher-accuracy measurement.

In the present invention, the influence of disturbance magnetic field can be reduced by investigating on the material and the configuration of the sensor housing.

For example, if a non-magnetic material is used, the influence of disturbance magnetic field is reduced. An iron material, which is a ferromagnetic material, is susceptible to disturbance magnetic field. If the shaft portion, which is apt to produce loose fitting due to change of temperature, is made of an iron material and the sensor holder portion is made of a non-magnetic material, the influence of disturbance magnetic field on the detecting portion is reduced.

While there has been described what is at present considered to be a preferred embodiment of the invention, it will be understood that various modifications may be made thereto, and it is intended that the appended claims cover all such modifications as fall within the true spirit and scope of the invention.

What is claimed is:

1. A physical quantity detecting apparatus for measuring a physical quantity of an object which rotates or reciprocates at real time, said apparatus comprising:

a physical quantity sensor provided opposed to a predetermined portion of said object for detecting a physical quantity of said object at said portion wherein said physical quantity is torque;

a position detecting means for detecting the position of movement of the object which is divided into a given number of segments in advance, and for outputting the detected position as a segment detection signal for the corresponding segment;

an offset signal generating means for outputting an offset signal which corresponds to an offset component output from said physical quantity sensor in dependence on the position of movement of said object and which is set for each segment in advance;

a sensitivity signal generating means for outputting a sensitivity signal which corresponds to the sensitivity of said physical quantity sensor dependent on the position of movement of said object and which is set for each segment in advance; and a correction operation means for reading said offset signal and said sensitivity signal which correspond to said segment detection signal for the corresponding segment from said offset signal generating means and said sensitivity signal generating means, respectively, and for calculating the correction value of said offset component and said sensitivity of a detection signal output from said physical quantity sensor on the basis of a predetermined correction operation expression which has an independent coefficient group for each segment.

2. A physical quantity detecting apparatus according to claim 1, further comprising:

a temperature detecting means for detecting the temperature of said physical quantity detecting apparatus;

an offset coefficient signal generating means in which a coefficient of the temperature dependence function of said offset signal is present; and a sensitivity coefficient signal generating means in which a coefficient of the temperature dependence function of said sensitivity is preset;

said correction operation means reading coefficients from said offset coefficient signal generating means and said sensitivity coefficient generating means and correcting said offset signal and said sensitivity on the basis of the temperature dependence function of said offset signal and the temperature dependence function of said sensitivity, thereby measuring a physical quantity of said object at real time without being influenced by change of temperature.

3. A physical quantity detecting apparatus according to claim 2, wherein said correction operation means corrects said offset, said sensitivity, and said temperature components of said detection signal S(P) output from said physical quantity sensor so as to obtain the physical quantity Tq of said object by using the following correction operation expression which has temperature dependence functions $f_1(T)$, $f_2(T)$ and an independent coefficient group Sens(P), Offs(P) for each segment:

$$Tq = \frac{A(P) \cdot S(P, T)}{f_1(T)} + \frac{B(P) \cdot f_2(T)}{f_1(T)}$$

wherein $$A(P) = \frac{1}{Sens(P)}$$

$$B(P) = -\frac{Offs(P)}{Sens(P)}$$

$$f_1(T) = a_1 + b_1 \cdot T$$

$$f_2(T) = a_2 + b_2 \cdot T$$

wherein $a_1$, $b_1$, $a_2$ and $b_2$ are constants.

4. A physical quantity detecting apparatus according to claim 3, wherein said offset signal generating means presets a signal Offs(P) which corresponds to said offset component output from said physical quantity sensor in dependence on the position of movement of said object for each segment;

said sensitivity signal generating means presets a signal Sens(P) which corresponds to said sensitivity output from said physical quantity sensor in dependence on the position of movement of said object for each segment;

said offset coefficient signal generating means presets the coefficients $a_2$, $b_2$ of offset signal temperature dependence function $f_2(T)$;

said sensitivity coefficient signal generating means presets the coefficients $a_1$, $b_1$ of sensitivity signal temperature dependence function $f_1(T)$;

said correction operation means reads said coefficient group which corresponds to said segment detection signal from said offset signal generating means, said sensitivity signal generating means, said offset coefficient signal generating means and said sensitivity coefficient signal generating means and corrects said offset, said sensitivity, and said temperature components of said detection signal S(P) which is output from said physical quantity sensor on the basis of said correction operation expression so as to obtain said physical quantity Tq.

5. A physical quantity detecting apparatus according to claim 4, wherein said physical quantity sensor includes an excitation coil which is connected to a driving circuit so as to alternatingly magnetize said object, and a detection coil which is connected to a detection signal processing circuit so as to detect magnetostriction produced in said object;

said driving circuit applies a symmetric AC waveform voltage to said excitation coil so as to alternatingly magnetize said object;

said detection signal processing circuit detects the output voltage of said detection coil so as to output the DC detection signal as a physical quantity detection signal;

said physical quantity sensor measures a physical quantity of said object which rotates;

said position detecting means includes an angle detecting portion for detecting the rotational angle of said object, and a segment detecting portion for dividing the rotational angle of said object into a given number of segments in advance, conversion said rotational angle detected by said angle detecting portion into a segment detection signal and outputting said detection signal;

said correction operation means includes a first timing signal generator, a second timing signal generator and a calculator;

said first timing signal generator permits a segment detection signal output from said position detecting means to be input to said offset signal generating means and said sensitivity signal generating means at every predetermined sampling time interval;

said second timing signal generator operates in synchronization with the operation of said first timing signal generator and permits said segment detection signal output from said position detecting means to be input to said offset coefficient signal generating means and said sensitivity coefficient signal generating means at every predetermined sampling time interval; and said calculator processes correction operation on said detection signal output from said physical quantity sensor on the basis of a predetermined correction operation expression and temperature dependence functions by using said coefficient group output from said offset signal generating means, said sensitivity signal generating means, said offset coefficient signal generating means and said sensitivity coefficient signal generating means every time said segment detection signal is permitted to be input, thereby calculating and outputting the physical quantity of said object at every predetermined sampling time interval without depending on a change in the rotational or reciprocating speed of said object.

6. A physical quantity detecting apparatus according to claim 4, further comprising a correction coefficient group calculating means;

said correction coefficient group calculating means including:

a calibration signal generating means for outputting a physical quantity calibration signal for calibrating the output of said physical quantity sensor;

a waveform memory for storing said output of said physical quantity sensor, said physical quantity calibration signal output from said calibration signal generating means and the detected temperature output from said temperature detecting means for each segment every time a segment detection signal is output from said position detecting means; and a coefficient calculating means for calculating the coefficients of said temperature dependence function of said offset signal and sensitivity and calculating the coefficient group of said correction operation expression for each segment on the basis of the data stored in said waveform memory for each segment;

wherein a coefficient of said temperature dependence function of said offset signal is set in said offset coefficient signal generating means, a coefficient of said temperature dependence function of said sensitivity is set in said sensitivity coefficient signal generating means and, among said coefficient group of said correction operation expression calculated for each segment, a coefficient which corresponds to said offset component is set in said offset signal generating means and a coefficient which corresponds to said sensitivity is set in said sensitivity signal generating means.

7. A physical quantity detecting apparatus according to claim 6, wherein said object is a rotating object;

said calibration signal generating means includes a strain gauge which is pasted on said rotating object as a bridge circuit so as to detect the strain of said rotating object as a physical quantity, and a calibration signal processing circuit which is rotatably connected to said strain gauge through a rotary transformer so as to output said physical quantity measured by said strain gauge to said waveform memory as a physical quantity calibration signal;

said correction coefficient group calculating means repeats the operation of measuring plural groups of outputs of said physical quantity sensor and physical quantity calibration signals for each segment a plurality of times with an operation temperature T as a parameter;

said waveform memory stores said plural groups of data measured with said operation temperature T as a parameter; and said coefficient calculating means reads out said plural data groups stored in said waveform memory for each segment, and obtains said coefficient group which corresponds to said offset signal and said sensitivity for each segment by calculation and said coefficient group of said temperature dependence function used for correction operation by calculation so that the square sum of differences between said plural data groups on outputs of said physical quantity sensor and physical quantity calibration signals is the minimum.

8. A physical quantity detecting apparatus according to claim 2, wherein said correction operation means includes a first timing signal generator, a second timing signal generator and a calculator;

said first timing signal generator permits a segment detection signal output from said position detecting means to be input to said offset signal generating means and said sensitivity signal generating means at every predetermined sampling time interval;

said second timing signal generator permits said segment detection signal output from said position detecting means to be input to said offset coefficient signal generating means and said sensitivity coefficient signal generating means at every predetermined sampling time interval; and said calculator processes correction operation on said detection signal output from said physical quantity sensor on the basis of a predetermined correction operation expression and temperature dependence functions by using said coefficient group output from said offset signal generating means, said sensitivity signal generating means, said offset coefficient signal generating means and said sensitivity coefficient signal generating means every time said segment detection signal is permitted to be input, thereby calculating and outputting the physical quantity of said object at every predetermined sampling time interval without depending on a change in the rotational or reciprocating speed of said object.

9. A physical quantity detecting apparatus according to claim 2, further comprising a correction coefficient group calculating means;

said correction coefficient group calculating means including:

a calibration signal generating means for outputting a physical quantity calibration signal for calibrating the output of said physical quantity sensor;

a waveform memory for storing said output of said physical quantity sensor, said physical quantity calibration signal output from said calibration signal generating means and the detected temperature output from said temperature detecting means for each segment every time a segment detection signal is output from said position detecting means; and said coefficient calculating means for calculating the coefficients of said temperature dependence function of said offset signal and sensitivity and calculating the coefficient group of said correction operation expression for each segment on the basis of the data stored in said waveform memory for each segment;

wherein a coefficient of said temperature dependence function of said offset signal is set in said offset coefficient signal generating means, a coefficient of said temperature dependence function of said sensitivity is set in said sensitivity coefficient signal generating means and, among said coefficient group of said correction operation expression calculated for each segment, a coefficient which corresponds to said offset component is set in said offset signal generating means and a coefficient which corresponds to said sensitivity is set in said sensitivity signal generating means.

10. A physical quantity detecting apparatus according to claim 9, wherein said correction coefficient group calculating means repeats the operation of measuring plural groups of outputs of said physical quantity sensor and physical quantity calibration signals for each segment a plurality of times with an operation temperature T as a parameter;

said waveform memory stores said plural groups of data measured with said operation temperature T as a parameter for each segment;

said coefficient calculating means reads out said plural data groups stored in said waveform memory for each segment, and obtains said coefficients group which corresponds to said offset signal and said sensitivity for each segment by calculation and said coefficient group of said temperature dependence function used for correction operation by calculation so that the square sum of differences between said plural data groups on outputs of said physical quantity sensor and physical quantity calibration signals is the minimum;

each of said offset signal generating means, said sensitivity signal generating means, said offset coefficient signal generating means and said sensitivity coefficient signal generating means is composed of a memory; and said coefficient group of said correction operation expression calculated by said coefficient calculating means and said coefficient of said temperature dependence function are written and stored into the corresponding memory.

11. A physical quantity detecting apparatus according to claim 1, wherein said physical quantity sensor includes an excitation coil which is connected to a driving circuit so as to alternatingly magnetize said object, and a detection coil which is connected to a detection signal processing circuit so as to detect magnetostriction produced in said object;

said driving circuit applies a symmetric AC waveform voltage to said excitation coil so as to alternatingly magnetize said object; and said detection signal processing circuit detects the output voltage of said detection coil so as to output the DC detection signal as a physical quantity detection signal.

12. A physical quantity detecting apparatus according to claim 1, wherein said physical quantity sensor measures a physical quantity of said object which rotates; and said position detecting means includes an angle detecting portion for detecting the rotational angle of said object, and a segment detecting portion for dividing the rotational angle of said object into a given number of segments in advance, converting said rotational angle detected by said angle detecting portion into a segment detection signal for the corresponding segment and outputting said detection signal.

13. A physical quantity detecting apparatus according to claim 1, wherein said correction operation means corrects said offset component and said sensitivity of said detection signal S(P) output from said physical quantity sensor so as to obtain the physical quantity Tq of said object by using the following correction operation expression which has an independent coefficient group Sens(P), Offs(P) for each segment:

$$Tq = \frac{S(P)}{Sens(P)} - \frac{Offs(P)}{Sens(P)}.$$

14. A physical quantity detecting apparatus according to claim 13, wherein said offset signal generating means presets a signal Offs(P) which corresponds to said offset component output from said physical quantity sensor in dependence on the position of movement of said object for each segment;

said sensitivity signal generating means presets a signal Sens(P) which corresponds to said sensitivity output from said physical quantity sensor in dependence on the position of movement of said object for each segment; and said correction operation means reads said offset signal Offs(P) and said sensitivity signal Sens(P) which correspond to said segment detection signal from said offset signal generating means and said sensitivity signal generating means, respectively, substitutes said signals Offs(P) and Sens(P) into said correction operation expression and corrects said offset component and said sensitivity of said detection signal S(P) which is output from said physical quantity sensor on the basis of said correction operation expression.

15. A physical quantity detecting apparatus according to claim 1, wherein said correction operation means includes a first timing signal generator and a calculator;

said first timing signal generator permits a segment detection signal output from said position detecting means to be input to said offset signal generating means and said sensitivity signal generating means at every predetermined sampling time interval; and said calculator processes correction operation on said detection signal output from said physical quantity sensor on the basis of a predetermined correction operation expression by using said coefficient group output from said offset signal generating means and said sensitivity signal generating means every time said segment detection signal is permitted to be input, thereby calculating and outputting the physical quantity of said object at every predetermined sampling time interval without depending on a change in the rotational or reciprocating speed of said object.

16. A physical quantity detecting apparatus for measuring a physical quantity of an object which rotates or reciprocates at real time by using a physical quantity sensor, said apparatus comprising:

a position detecting means for detecting the position of movement of the object which is divided into a given number of segments in advance, and outputting the detected position as a segment detection signal;

an offset signal generating means for outputting an offset signal which corresponds to an offset component output from said physical quantity sensor in dependence on the position of movement of said object and which is set for each segment in advance;

a sensitivity signal generating means for outputting a sensitivity signal which corresponds to the sensitivity of said physical quantity sensor dependent on the position of movement of said object and which is set for each segment in advance;

a correction operation means for reading said offset signal and said sensitivity signal which correspond to said segment detection signal from said offset signal generating means and said sensitivity signal generating means, respectively, calculating the correction value of said offset component and said sensitivity of said detection said output from said physical quantity sensor on the basis of a predetermined correction operation expression which has an independent coefficient group for each segment; and a correction coefficient group calculating means;

said correction coefficient group calculating means including:

a calibration signal generating means for outputting a physical quantity calibration signal for calibrating the output of said physical quantity sensor;

a waveform memory for storing said output of said physical quantity sensor and said physical quantity calibration signal output from said calibration signal generating means for each segment every time a segment detection signal is output from said position detecting means; and a coefficient calculating means for calculating the coefficient group of said correction operation expression for each segment on the basis of the outputs of said physical quantity sensor and said physical quantity calibration signal stored in said waveform memory;

wherein, among said coefficient group of said correction operation expression calculated for each segment, a coefficient which corresponds to said offset component is set in said offset signal generating means and a coefficient which corresponds to said sensitivity is set in said sensitivity signal generating means.

17. A physical quantity detecting apparatus according to claim 16, wherein said waveform memory stores plural groups of outputs of said physical quantity sensor and physical quantity calibration signals for each segment with said physical quantity as a parameter; and said coefficient calculating means reads out said plural groups of outputs of said physical quantity sensor and physical quantity calibration signals stored in said waveform memory for each segment, and obtains said coefficient group for each segment by calculation so that the square sum of differences between said plural data groups on outputs of said physical quantity sensor and physical quantity calibration signals is the minimum.

18. A physical quantity detecting apparatus for measuring a physical quantity of a rotating object at real time by using a physical quantity sensor, said apparatus comprising:

a swivel bearing which is secured to a given position of said rotating object so as to allow the adjustment of position;

a sensor housing which is rotatably attached to said rotating object through said swivel bearing and which holds said physical quantity sensor in such a manner that said sensor is opposed to said rotating object with a predetermined minute clearance therebetween, thereby maintaining the positional relationship between said physical quantity sensor and said rotating object with high accuracy;

a position detecting means for detecting the rotational position of the object which is divided into a given number of segments in advance, and outputting the detected position as a segment detection signal;

an offset signal generating means for outputting an offset signal which corresponds to an offset component output from said physical quantity sensor in dependence on the rotational position of said object and which is set for each segment in advance;

a sensitivity signal generating means for outputting a sensitivity signal which corresponds to the sensitivity of said physical quantity sensor dependent on the rotational position of said object and which is set for each segment in advance; and a correction operation means for reading said offset signal and said sensitivity signal which correspond to said segment detection signal from said offset signal generating means and said sensitivity signal generating means, respectively, calculating the correction value of said offset component and said sensitivity of said detection signal output from said physical quantity sensor on the basis of a predetermined correction operation expression which has an independent coefficient group for each segment.

19. A physical quantity detecting apparatus according to claim 18, wherein said swivel bearing is a taper bearing provided with a taper portion at the inner peripheral portion of the inner race thereof, and is attached to said rotating object through a taper adapter between said taper portion and said rotating object.

20. A physical quantity detecting apparatus according to claim 18, wherein said swivel bearing is a separable bearing including at least two inner race divisions and at least two outer race divisions, and said bearing is secured to a given position of said rotating said object by fastening said outer race divisions to each other by using fixing means.

* * * * *

UNITED STATES PATENT AND TRADEMARK OFFICE
CERTIFICATE OF CORRECTION

PATENT NO. : 5,062,062
DATED : October 29, 1991
INVENTOR(S) : Yuji Nishibe, et al.

It is certified that error appears in the above-identified patent and that said Letters Patent is hereby corrected as shown below:

Column 43, line 65, change "present" to --preset--.
Column 45, line 20, change "conversion" to --converting--.
Column 47, line 34, change "said" to --a--.
Column 49, line 61, change "said" (second occurrence) to --signal--.
Column 52, line 9, before "object" delete "said".

Signed and Sealed this

Twenty-eighth Day of September, 1993

Attest:

BRUCE LEHMAN

*Attesting Officer*  *Commissioner of Patents and Trademarks*